(12) United States Patent
Asami et al.

(10) Patent No.: US 11,886,047 B2
(45) Date of Patent: Jan. 30, 2024

(54) SPECTACLE LENSES AND METHODS FOR PRODUCING THE SAME

(71) Applicants: Hiroshi Asami, Tokyo (JP); Yasunori Izawa, Tokyo (JP)

(72) Inventors: Hiroshi Asami, Tokyo (JP); Yasunori Izawa, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 22 days.

(21) Appl. No.: 17/724,113

(22) Filed: Apr. 19, 2022

(65) Prior Publication Data

US 2022/0244570 A1 Aug. 4, 2022

Related U.S. Application Data

(63) Continuation of application No. 16/648,766, filed as application No. PCT/JP2018/035824 on Sep. 19, 2018, now Pat. No. 11,598,977.

(30) Foreign Application Priority Data

Sep. 19, 2017 (EP) .................................... 17191925

(51) Int. Cl.
*G02C 7/06* (2006.01)
*G02C 7/02* (2006.01)

(52) U.S. Cl.
CPC .............. *G02C 7/065* (2013.01); *G02C 7/027* (2013.01)

(58) Field of Classification Search
CPC ................................ G02C 7/027; G02C 7/065
USPC .................................................... 351/159.42
See application file for complete search history.

(56) References Cited

U.S. PATENT DOCUMENTS

| 4,606,622 A * | 8/1986 | FueGerhard | ........... G02C 7/061 |
| | | | 351/159.42 |
| 6,412,948 B2 * | 7/2002 | Yanari | ..................... G02C 7/065 |
| | | | 351/159.42 |
| 2002/0001063 A1 * | 1/2002 | Yanari | ..................... G02C 7/063 |
| | | | 351/159.42 |

FOREIGN PATENT DOCUMENTS

| DE | 60121667 T2 * | 11/2006 | ............. G02C 7/061 |
| DE | 60121667 T2 | 11/2006 | |

OTHER PUBLICATIONS

Jan. 12, 2023 Notice of Allowance Issued in U.S. Appl. No. 16/648,766.
Jun. 1, 16, 2022 Office Action issued in U.S. Appl. No. 16/648,766.

* cited by examiner

*Primary Examiner* — James R Greece
(74) *Attorney, Agent, or Firm* — Oliff PLC

(57) ABSTRACT

A lens, system for designing, computer program for designing and a method for designing, with a computer, a progressive addition lens including a distance vision region, a near vision region, and an intermediate vision region, wherein a power gradually changes between the distance vision region and the near vision region, and wherein the progressive addition lens is based on prescription data, the method including: determining a transmission astigmatic performance parameter corresponding to a sum of a prescribed astigmatism included in the prescription data and of a predetermined amount of extra astigmatism; determining lens surface data corresponding to the determined transmission performance parameter.

8 Claims, 42 Drawing Sheets

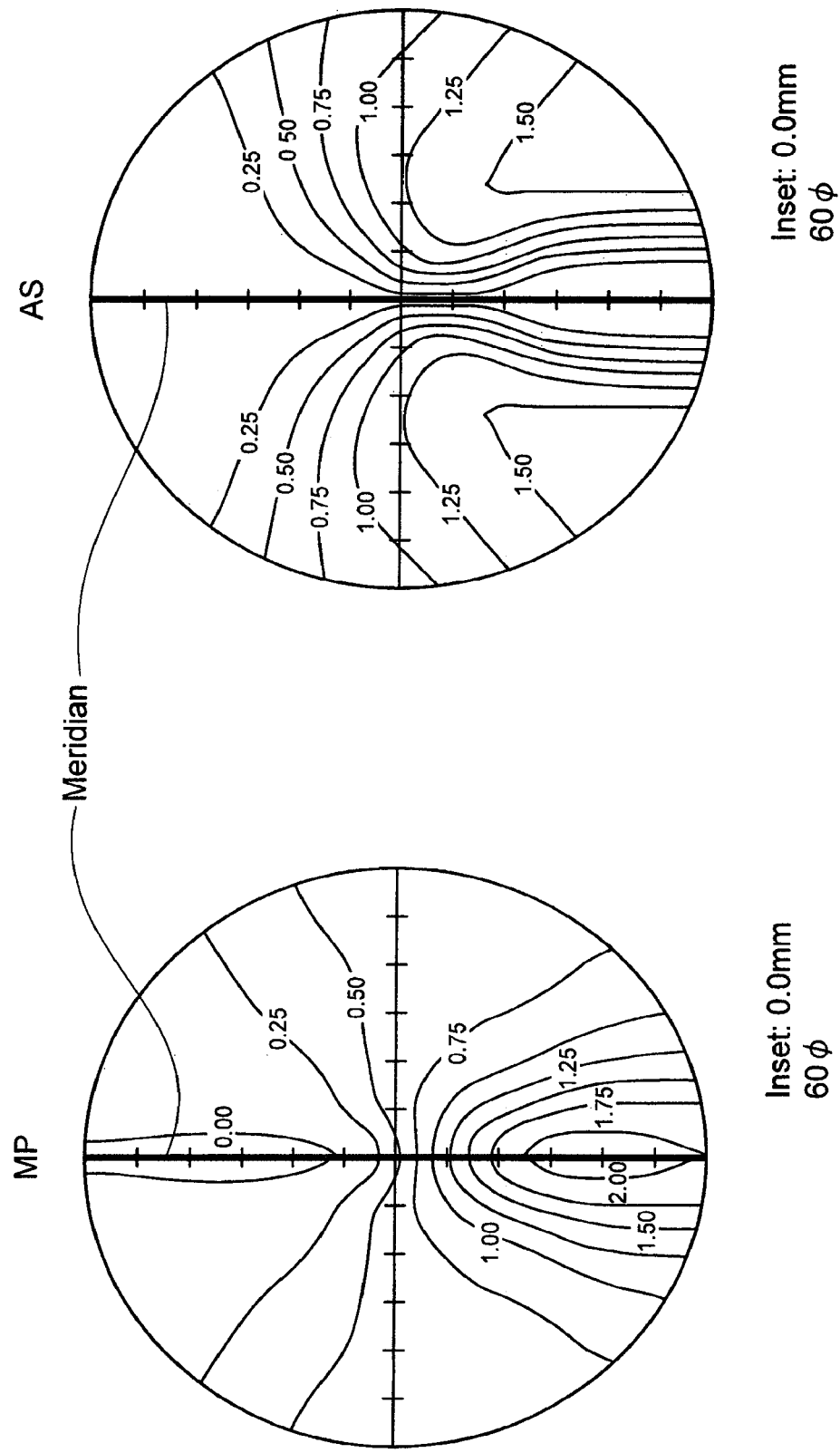

FIG.2

| Additional AS(D) (Ax180) | No.1 | No.2 | No.3 | No.4 | No.5 | No.6 | No.7 | No.8 | No.9 | No.10 |
|---|---|---|---|---|---|---|---|---|---|---|
| 0.00 | A | A | A | A | A | A | A | A | A | A |
| -0.25 | A | A | A | A | A | A | A | A | A | A |
| -0.50 | A | A | A | A | A | A | A | A | A | A |
| -0.75 | A | A | A | A | A | A | A | A | A | A |
| -1.00 | A | A | A | A | A | A | A | A | A | A |
| -1.25 | B | A | A | B | B | A | A | B | A | A |
| -1.50 | B | A | A | C | C | A | A | C | A | A |
| -1.75 | C | B | A | C | C | B | A | C | B | B |
| -2.00 | C | B | A | C | C | B | A | C | B | B |
| -2.25 | C | C | A | C | C | C | A | C | C | C |
| -2.50 | C | C | A | C | C | C | A | C | C | C |
| -2.75 | C | C | A | C | C | C | A | C | C | C |
| -3.00 | C | C | A | C | C | C | A | C | C | C |

Inset: 0.0mm
60 φ

Inset: 0.0mm
60 φ

Inset: 0.0mm
60 φ

Inset: 0.0mm
60 φ

Inset: 0.0mm
60 φ

Inset: 0.0mm
60 φ

FIG.12A
FIG.12B
Conventional
(point A)
Embodiment 2(VP>HP)
(point B)
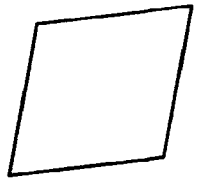
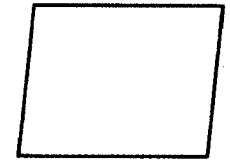
S+1.50 C-1.16 Ax.51
at the point A, (x, y ) = (-5.0,-4.0)
S+1.62 C-1.19 Ax.61
at the point B, (x, y ) = (-5.0,-4.0)

Embodiment 1

Inset: 2.5mm
60φ

Conventional

Inset: 2.5mm
60φ

Inset: 2.5mm
60 φ

Embodiment 2

Inset: 2.5mm
60 φ

Conventional

MP

Inset: 0.0mm
60 φ

AS

Inset: 0.0mm
60 φ

MP

Inset: 0.0mm
60 φ

AS

Inset: 0.0mm
60 φ

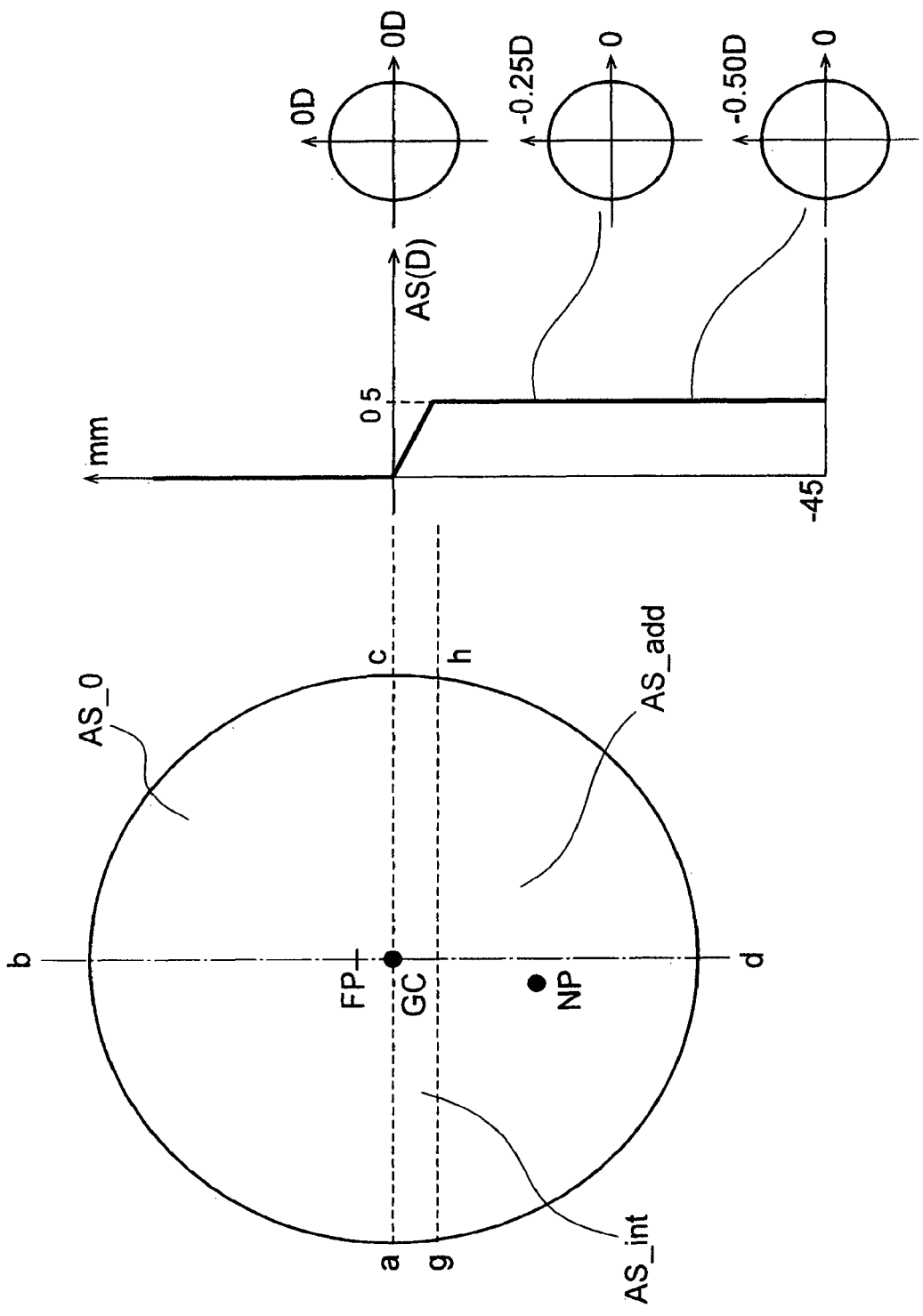

MP

Inset: 0.0mm
60φ

AS

Inset: 0.0mm
60φ

MP

Inset: 0.0mm
60 φ

AS

Inset: 0.0mm
60 φ

SPECTACLE LENSES AND METHODS FOR PRODUCING THE SAME

CROSS-REFERENCE TO RELATED APPLICATIONS

This application is a continuation application of U.S. patent application Ser. No. 16/648,766 filed Mar. 19, 2020 which is a U.S. National Stage of International Application No. PCT/JP2018/035824 filed Sep. 19, 2018, which claims the benefit of European Patent Application No. 17191925.1 filed Sep. 19, 2017. The disclosures of the prior applications are hereby incorporated by reference herein in their entirety.

TECHNICAL FIELD

The present invention relates to lenses and to methods, entities and computer program for designing lenses.

BACKGROUND

FIG. 1A shows a schematic structure of a progressive addition lens. As shown in the left hand of FIG. 1A, the progressive addition lens consists of a distance vision region with power for seeing a distant object provided at an upper part of the lens, near vision region with power for seeing a near object provided at a lower part of the lens, and an intermediate vision region whose power changes gradually from the distance vision power to the near vision power.

The region where power gradually changes is also called a corridor. A corridor length is defined as a distance between a starting point and an endpoint of progression.

The distance vision region is a region of the progressive addition lens on and above the starting point of progression. The near vision region is a region of the progressive addition lens on and under the endpoint of progression. The intermediate vision region is a region between the distance vision region and the near vision region.

In the right hand of FIG. 1A shows power change on a meridian. In the distance vision region, power for seeing a distant object is stable. In the near vision region, power for seeing a near object is also stable. In the intermediate vision region, power changes gradually. A difference between the power for seeing a distant object and the power for seeing a near object is defined as addition power, ADD (D).

FIG. 1B shows an illustrative example of meridians on the surfaces of a transmitted mean power map (left hand side. Same as FIG. 5A) and a transmitted inherent astigmatism map (right hand side. Same as FIG. 6A). The meridian being a meridian line of the lens along which a spherical power increases in correspondence of a direction towards the bottom of the progressive addition lens. In other words, the meridian is a line that connects points at which the frequency of visual lines passing through the surface when seeing from distance to near or vice versa is high.

In a simple case, the meridian lies perpendicular at the middle point of engraving marks of the progressive addition lens. In a realistic case, the meridian is not a straight line, but it is a line which slightly bends in correspondence of the area correspondent to the vicinity of the nose of a person wearing eye glasses, or in other words it bends towards nasal side. The amount of deviation toward the nose is called inset.

It is a current technological common concept that of achieving substantially zero aberration as a spherical shape as seen locally not only in the distance vision region, near vision region, but also in the intermediate vision region where power changes. In other words, there is substantially zero aberration along the meridian.

In the progressive addition lens, aberration occurs because distance vision region and near vision region having different powers are positioned in the same lens. As explained above, since the lens is designed so that aberration is removed as much as possible along the meridian, aberration (mean power error and inherent astigmatism) and distortion occur in the area except for the meridian.

The inherent astigmatism increases on the sides of the intermediate vision region and near vision region.

In order to maintain the continuity as a surface, at a side part remote from the meridian, the power in the horizontal direction may be decreased in correspondence of or at the vicinity of the distance vision power. The difference in power in the vertical direction caused in this case results in distortion of the surface specific to a progressive addition lens, and may cause narrowing of the clear vision region of the near vision region, as well as blurring, swinging (or swaying feeling) and distortion felt at the side part.

In order to reduce the above disadvantages which are inherently caused by being progressive addition lens, in these days, the concept of the transmission-based design is used in a design of the progressive addition lens. This design method is based on the concept of designing by taking into account the actual light transmitted through the lens (ray tracing). The transmission-based design places importance in aberration and power distribution of the light passing through the lens and entering the eye.

In other words, the transmission-based design is satisfactory for the "distribution of astigmatic aberration perceived by the eye." JP 5 784 418 provides an example of a transmission-based design method. However, the inventors found there was room to further reduce defects of a progressive addition lens.

An object of the present invention is therefore to provide improved optical properties of a progressive addition lens.

SUMMARY OF THE INVENTION

According to a first aspect A1, a method for designing, by means of a computer, a progressive addition lens comprising a distance vision region, a near vision region, and an intermediate vision region, wherein a power gradually changes between the distance vision region and the near vision region, and wherein the progressive addition lens is based on prescription data, the method comprising:

determining a transmission astigmatic performance parameter corresponding to a sum of a prescribed astigmatism included in the prescription data and of a predetermined amount of extra astigmatism;

determining lens surface data corresponding to the determined transmission performance parameter. Preferably, the extra astigmatism is provided in correspondence of the near vision region and/or intermediate vision region. Preferably, the amount of extra astigmatism is within an extra astigmatism threshold, which is preferably 0.5D. Preferably, the transmission astigmatic performance parameter provides an indication of an astigmatism as transmitted through the lens (in other words, it provides an indication of the actual astigmatism exhibited on the eye for light transmitted through the lens).

According to aspect A2, in the method according to A1, wherein the extra astigmatism is added in correspondence of the near vision region and the intermediate vision region, and wherein an amount of vertical power is lower than an amount of horizontal power in correspondence of at least one point of the near vision region.

According to aspect A3, in the method according to A1 or A2, wherein the extra astigmatism corresponds to a measure of a clear vision region of the near vision region.

According to aspect A4, in the method according to any of A1 to A3, wherein the extra astigmatism corresponds to an expanded clear vision region, wherein the expanded clear vision region is a clear vision region being larger than a clear vision region corresponding to a zero extra astigmatism.

According to aspect A5, in the method according to any of A1 to A4, wherein the extra astigmatism is in a relationship to an expanded clear vision region, and wherein an increase in the extra astigmatism corresponds to an increase in a width of the expanded clear vision region.

According to aspect A6, in the method according to any of A3 to A5, wherein the clear vision region is a region being characterized by an inherent astigmatism being below a predetermined threshold.

According to aspect A7, in the method according to A1, wherein the extra astigmatism is added in correspondence of the near vision region and the intermediate vision region, and wherein an amount of vertical power is higher than an amount of horizontal power in correspondence of at least one point of the near vision region.

According to aspect A8, in method according to any of A1 to A7, wherein the extra astigmatism corresponds to a horizontal width of a near vision region having a mean power equal to or above a threshold.

According to aspect A9, in method according to A8, wherein the extra astigmatism corresponds to a widening of the horizontal width, wherein the widened horizontal width is a horizontal width in a near vision region being wider than a horizontal width corresponding to a zero extra astigmatism.

According to aspect A10, in method according to A1, wherein the amount of extra astigmatism is added in correspondence of a meridian, and an amount of vertical power is different from an amount of horizontal power along the meridian, the meridian being a meridian line of the lens along which a spherical power increases in correspondence of a direction towards the bottom of the progressive addition lens.

According to aspect A11, in method according to A10, wherein the amount of extra astigmatism is added in correspondence of the intermediate vision region along the meridian.

According to aspect A12, in method according to A10 or A11, wherein the amount of extra astigmatism is constant in correspondence of the meridian in the intermediate vision region.

According to aspect A13, in method according to any of A10 to A12, wherein the amount of extra astigmatism corresponds to an inherent astigmatism change rate.

According to aspect A14, in method according to any of any of A10 to A13, wherein the amount of extra astigmatism corresponds to a reduction of the inherent astigmatism change rate, wherein the reduced inherent astigmatism change rate is an inherent astigmatism change rate being smaller than an inherent astigmatism change rate corresponding to a zero extra astigmatism.

According to aspect A15, in method according to A10 or A11, wherein the amount of extra astigmatism is monotonically increasing in correspondence of the meridian in the intermediate vision region.

According to aspect A16, in method according to any of A10 to A15, wherein the amount of extra astigmatism corresponds to an inherent astigmatism change rate, a maximum amount of inherent astigmatism, and of the skew distortion.

According to aspect A17, in method according to any of A10 to A16, wherein the amount of extra astigmatism corresponds to a reduction of the inherent astigmatism change rate, of the maximum amount of inherent astigmatism, and of the skew distortion, wherein The reduced inherent astigmatism change rate is an inherent astigmatism change rate being smaller than an inherent astigmatism change rate corresponding to a zero extra astigmatism, wherein the reduced of the maximum amount of inherent astigmatism is a maximum amount of inherent astigmatism being smaller than a maximum amount of inherent astigmatism corresponding to a zero extra astigmatism, and wherein the reduced skew distortion is a skew distortion being smaller than a skew distortion corresponding to a zero extra astigmatism.

According to aspect A18, in method according to A10 or 11, wherein the amount of extra astigmatism is monotonically decreasing in correspondence of the meridian from the top to the center of the meridian and monotonically increasing from the center to the bottom of the meridian in the intermediate vision region.

According to aspect A19, in method according to any of A18, wherein the rate of at least one of monotonically increasing and monotonically decreasing is set to control the extent of the area with low aberration around a center of the lens.

According to aspect A20, it is provided a computer program comprising code, wherein the code, when executed on processing resources, instructs the processing resources to perform a method according to any of A1 to A19.

According to aspect A21, it is provided a progressive addition lens comprising a distance vision region, a near vision region, and an intermediate vision region, wherein a power gradually changes between the distance vision region and the near vision region, and wherein the lens has a surface exhibiting transmission astigmatic performance parameter values corresponding to prescription data and to an extra astigmatism.

According to aspect A22, in the progressive addition lens according to A21, wherein the near vision region and the intermediate vision region exhibit extra astigmatism values corresponding to the extra astigmatism, and exhibit an amount of vertical power that is lower than an amount of horizontal power in at least one point of the near vision region.

According to aspect A23, in the progressive addition lens according to A22, said extra astigmatism corresponds to an expansion of said clear near vision region as exhibited by the lens, the expanded clear vision region being a clear vision region larger than a clear vision region corresponding to a zero extra astigmatism.

According to aspect A24, in the progressive addition lens according to A21, A22 and/or A23, the clear vision region is a region being characterized by exhibiting an astigmatism being below a predetermined threshold.

According to aspect A25, in the progressive addition lens according to A21, wherein the near vision region and the intermediate vision region are regions exhibiting extra astigmatism values corresponding to the extra astigmatism, and exhibiting an amount of vertical power being higher than an amount of horizontal power in correspondence of at least one point of the near vision region.

According to aspect A26, in the progressive addition lens according to A23, said extra astigmatism corresponds to a horizontal width of a near vision region having a mean power equal to or above a threshold.

According to aspect A27, in the progressive addition lens according to A21, wherein a meridian exhibits extra astigmatism values corresponding to the amount of extra astigmatism, and an amount of vertical power is different from an amount of horizontal power along the meridian, the meridian being a meridian line of the lens along which a spherical power increases in correspondence of a direction towards the bottom of the progressive addition lens.

According to aspect A28, in the progressive addition lens according to A21, a meridian exhibits extra astigmatism values corresponding to said amount of extra astigmatism, and an amount of vertical power is different from an amount of horizontal power along said meridian, said meridian being a meridian line of the lens along which a spherical power increases in correspondence of a direction towards the bottom of said progressive lens.

According to aspect A29, in the progressive addition lens according to A28 the intermediate vision region along the meridian exhibits the extra astigmatism values corresponding to said amount of additional astigmatism.

According to aspect A30, in the progressive addition lens according to A29, said amount of extra astigmatism is constant along the meridian in the intermediate vision region.

According to aspect A31, in the progressive addition lens according to any of A28 to A30, said amount of additional astigmatism corresponds to an astigmatism change rate and a skew distortion.

According to aspect A32, in the progressive addition lens according to any of A28 to A31, said amount of additional astigmatism corresponds to a reduction of the astigmatism change rate and of the skew distortion, wherein the reduced astigmatism change rate is an astigmatism change rate being smaller than an astigmatism change rate corresponding to a zero additional astigmatism and the reduced skew distortion is a skew distortion being smaller than a skew distortion corresponding to a zero additional astigmatism.

According to aspect A33, in the progressive addition lens according to aspect 24, wherein the amount of extra astigmatism is monotonically decreasing along the meridian from the top to the center of the meridian and monotonically increasing from the center to the bottom of the meridian in the intermediate vision region.

According to aspect A34, in the progressive addition lens according to A33, said amount of extra astigmatism corresponds to (at least one of) an astigmatism change rate, a maximum amount of astigmatism, and of the skew distortion.

According to aspect A35, in the progressive addition lens according to A34 said amount of extra astigmatism corresponds to a reduction of the astigmatism change rate, of the maximum amount of astigmatism, and of the skew distortion, wherein the reduced astigmatism change rate is an astigmatism change rate being smaller than an astigmatism change rate corresponding to a zero extra astigmatism, wherein the reduced of the maximum amount of astigmatism is a maximum amount of astigmatism being smaller than a maximum amount of astigmatism corresponding to a zero extra astigmatism, and wherein the reduced skew distortion is a skew distortion being smaller than a skew distortion corresponding to a zero extra astigmatism.

According to aspect A36, in the progressive addition lens according to any of A28 and A29, said amount of extra astigmatism is monotonically decreasing along the meridian from the top to the center of the meridian and monotonically increasing from the center to the bottom of the meridian in the intermediate vision region.

According to aspect A37, in the progressive addition lens according to A36, the rate of at least one of monotonically increasing and monotonically decreasing is set to control the extent of the area with low aberration around a center of the lens.

According to aspect A38, it is provided a method for designing, by means of a computer, a progressive addition lens comprising a near vision region, a far vision region, and an intermediate vision region, wherein an addition power progressively (gradually) changes between said near vision region and said far vision region, and wherein said progressive lens is based on prescription data, the method comprising:
  determining a transmission astigmatic performance parameter corresponding to a sum of a prescribed astigmatism included in said prescription data and of a predetermined amount of extra astigmatism;
  determining lens surface data corresponding to the determined transmission performance parameter;
  wherein said extra astigmatism is added in correspondence of said near vision region and said intermediate vision region, and wherein an amount of vertical power is lower than an amount of horizontal power in correspondence of at least one point of said near vision region.

According to aspect A39, it is provided a progressive addition lens comprising a near vision region, a far vision region, and an intermediate vision region, wherein a lens power progressively (gradually) changes between said near vision region and said far vision region, and wherein said lens has a surface exhibiting transmission astigmatic performance parameter values corresponding to prescription data and to an extra astigmatism;
  wherein said near vision region and said intermediate vision region exhibit additional astigmatism values corresponding to said extra astigmatism, and an amount of vertical power is lower than an amount of horizontal power in at least one point of said near vision region.

According to aspect A40, it is provided a method for designing, by means of a computer, a progressive addition lens comprising a near vision region, a far vision region, and an intermediate vision region, wherein an addition power progressively changes between said near vision region and said far vision region, and wherein said progressive lens is based on prescription data, the method comprising:
  determining a transmission astigmatic performance parameter corresponding to a sum of a prescribed astigmatism included in said prescription data and of a predetermined amount of extra astigmatism;
  determining lens surface data corresponding to the determined transmission performance parameter;
  wherein said extra astigmatism is added in correspondence of said near vision region and said intermediate vision region, and wherein an amount of vertical power is higher than an amount of horizontal power in correspondence of at least one point of said near vision region.

According to aspect A41, it is provided a progressive addition lens comprising a near vision region, a far vision region, and an intermediate vision region, wherein a lens power progressively changes between said near vision region and said far vision region, and wherein said lens has a surface exhibiting transmission astigmatic performance parameter values corresponding to prescription data and to an extra astigmatism;

wherein said near vision region and said intermediate vision region exhibit extra astigmatism values corresponding to said extra astigmatism, and wherein an amount of vertical power is higher than an amount of horizontal power in correspondence of at least one point of said near vision region.

According to aspect A42, it is provided a progressive addition lens comprising a near vision region, a far vision region, and an intermediate vision region, wherein a lens power progressively changes between said near vision region and said far vision region, and wherein said lens has a surface exhibiting transmission astigmatic performance parameter values corresponding to prescription data and to an extra astigmatism;

wherein a meridian exhibit extra astigmatism values corresponding to said amount of extra astigmatism, and an amount of vertical power is different from an amount of horizontal power along said meridian, said meridian being a meridian line of the lens along which a spherical power increases in correspondence of a direction towards the bottom of said progressive lens.

BRIEF DESCRIPTION OF THE DRAWINGS

Embodiments of the present invention, which are presented for better understanding the inventive concepts but which are not to be seen as limiting the invention, will now be described with reference to the figures in which:

FIG. 1B: shows an illustrative example of meridians on the surfaces of a transmitted mean power map and a transmitted inherent astigmatism map.

FIG. 2: shows clinical trial results of subjective assessment on comfortable near vision.

FIG. 12A and FIG. 12B: show a comparison between the embodiment 2 and a conventional design in image figures of rectangle shape perception which explains an effect of skew reduction.

FIG. 20 shows the second implementation of the present invention in which an extra astigmatism is allocated on a specific area on a design surface.

DETAILED DESCRIPTION

Figure 1A:
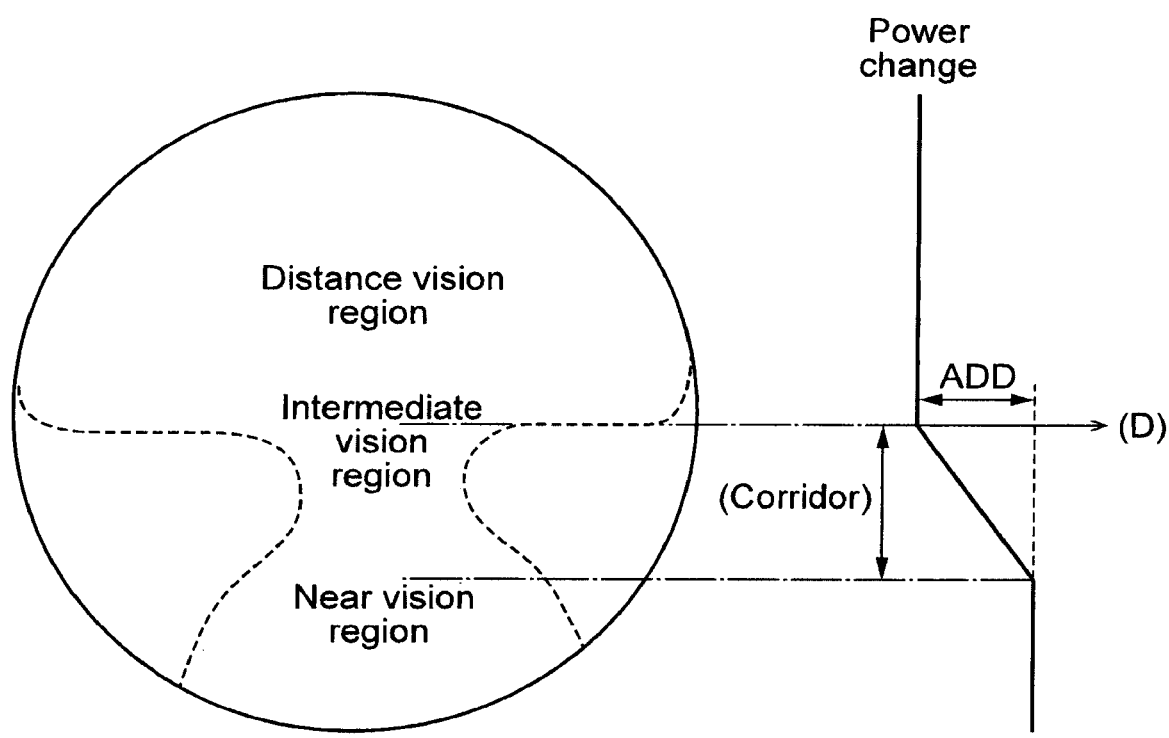
FIG. 1A: shows a schematic structure of a progressive addition lens.

In the present invention, three kinds of words "astigmatism" are used to clarify differences in meaning.

First one is "prescribed astigmatism." Prescribed astigmatism relates to prescription data for correcting eye defects (astigmatism of the eye) and corresponds to cylindrical power of the prescription data.

Second one is "inherent astigmatism." Inherent astigmatism relates to a kind of aberration of an optical lens (astigmatic aberration) and has the same meaning with the word "astigmatism" generally used in the industry of optical lens design. In the present invention, inherent astigmatism is defined as an astigmatism which is inherently caused by being progressive addition lens.

Third one is "extra astigmatism." Extra astigmatism relates to an astigmatism intentionally added separately from the prescribed astigmatism, when setting a target distribution in transmission at the early stage of designing a process for a progressive addition lens.

In a conventional concept of the transmission-based design, an ideal design was believed to make inherent astigmatism along the meridian as close to zero as possible. This means that the value of aberration for the eye (transmission aberration) along the meridian is designed to be zero substantially.

FIG. 2 shows clinical trial results of subjective assessment on comfortable near vision. The inventors have noted through the results that the eye can adapt well to a certain amount of extra astigmatism.

As the inventors recognized, it shows a totally opposite suggestion against conventional design method that an ideal design has been believed to make inherent astigmatism along the meridian as close as possible to zero. This means that the value of aberration for the eye (transmission aberration) along the meridian is designed to be substantially zero.

In the case of near vision, "accommodation", "conversion" and "miosis" are caused as the near reaction. The focal depth is deepened due to miosis, and therefore, the resistance to extra astigmatism increases compared with the case of distance vision. Hearing investigations (e.g. patient interviews) were conducted for vision in case where lenses in which astigmatism is caused intentionally are worn while a newspaper is read at the distance of 40 cm. In other words, wearers were asked to read newspapers while wearing lenses having a transmitted inherent astigmatism being intentionally higher than the prescribed astigmatism (or higher than zero for non-astigmatic wearers); the effects were then investigated and noted.

FIG. 2 shows clinical trial results of subjective assessment on comfortable near vision. The results are for 10 different wearers, and show up to which level the transmitted inherent astigmatism intentionally added was not noticed or regarded as acceptable by the respective wearer.

In detail experiment protocol, full correction of prescription of each wearer was measured and then non-prescribed cylindrical power was gradually added by 0.25D step in Ax 90 while spherical power was adjusted in order to maintain that mean power is constant. Here, we regarded the non-prescribed cylindrical power intentionally added as an estimate of a certain amount of extra astigmatism.

The table below shows full correction values of prescriptions for 10 wearers of the clinical trial.

| | R | | | | L | | | |
|---|---|---|---|---|---|---|---|---|
| No. | Sph | Cyl | AX | ADD | Sph | Cyl | AX | ADD |
| 1 | −7.75 | −1.25 | 0 | 2.00 | −7.75 | −0.75 | 0 | 2.00 |
| 2 | −1.50 | −1.25 | 180 | 0.00 | −2.00 | −1.25 | 140 | 0.00 |
| 3 | −1.50 | 0.00 | 0 | 2.00 | −1.75 | −0.25 | 40 | 2.00 |
| 4 | −1.25 | −0.50 | 95 | 2.50 | −1.75 | −0.50 | 70 | 2.50 |
| 5 | 0.25 | −1.25 | 100 | 2.50 | 2.25 | −2.50 | 80 | 2.50 |
| 6 | −4.50 | −0.75 | 170 | 0.00 | −4.00 | −0.75 | 5 | 0.00 |
| 7 | −2.50 | −0.50 | 160 | 0.00 | −3.25 | −0.75 | 10 | 0.00 |
| 8 | −2.00 | −0.25 | 5 | 1.75 | −1.50 | −0.50 | 95 | 1.75 |
| 9 | −1.75 | −0.75 | 95 | 2.00 | −2.00 | −0.50 | 90 | 2.00 |
| 10 | −11.75 | −1.75 | 175 | 0.25 | −11.75 | −0.50 | 0 | 0.25 |

In FIG. 2, level "A" means that the wearer can read the newspaper comfortable. Level "B" means that the wearer can read the newspaper with effort and feels difficulties. Level "C" means that the wearer cannot read the newspaper comfortable.

The clinical trial results on near vision show, as can be seen in FIG. 2, that in the case of extra astigmatism of approximately 0.50D, comfortable near vision can be maintained. However, according to a result of another clinical trial for the same wearers with different condition of Ax 180, it shows threshold of acceptable extra astigmatism which can maintain comfortable near vision was 0.75D.

This result suggests that when taking individual difference into consideration, the amount of extra astigmatism may not be limited to 0.50D. In embodiments of this invention described later, examples of extra astigmatism of 0.50D are adopted.

The inventors have however recognized that it is possible to "artificially" add a certain amount of extra astigmatism in the intermediate vision region or near vision region of a progressive addition lens, wherein such extra astigmatism may not be perceived by the person at all or at least as not annoying. Such extra astigmatism is the one transmitted or exhibited by the lens on the side of the eye, and as such is the one actually produced on the eye.

In other words, an extra astigmatism may be introduced in the intermediate and/or near vision regions, without impairing the vision of the person. The above recognition has been confirmed by clinical trials.

The inventors have further and surprisingly found that providing an extra astigmatism in such regions may bring a series of other advantages, like for instance: expansion of the clear vision region of the near vision region, decrease of the inherent astigmatism on the sides of the intermediate vision region and near vision region, widening of the horizontal width and decrease of the skew distortion; reduction of astigmatism change rate, reduction of skew distortion, reduction of maximum amount of inherent astigmatism. Such advantages will be explained later.

Here, in relation to the extra astigmatism in transmission, overview of the transmission-based design is explained. The transmission-based design is based on the calculation of certain transmission performance parameters like transmittance (see e.g. FIG. 3) that need to match the prescription data.

Once such parameters are determined, the surface may be determined or calculated on the basis of the determined transmission performance parameters. Then, once the surface is calculated, a lens can be produced (e.g. by machining); such lens typically exhibits the transmission performance parameters initially used for the design.

It can be said that the transmission-based design is started by imposing constraints on the desired transmission performance (e.g. desired spherical power and/or cylindrical power as exhibited on the eye), on the basis of which the surface is calculated. As also later described, the extra astigmatism may be added in correspondence of the intermediate region and/or near vision region. In the context of the transmission-based design, this implies that constraints are imposed on the desired transmission performance so that the transmission performance results in an extra astigmatism being exhibited on the eye (e.g. directly on the eye, on a surface on the side of the eye, etc.) when light passes in correspondence of the near and/or intermediate vision regions of the lens. Then, a lens surface is calculated against such constraints, so that a lens is obtained that exhibits as much as possible transmission performance including the initially given extra astigmatism. Thus, the extra astigmatism provided in correspondence of the near vision region and/or intermediate vision region may be said to represent an extra astigmatism as transmitted through the lens for light passing in the near vision region and/or intermediate vision region, respectively.

Figure 3:
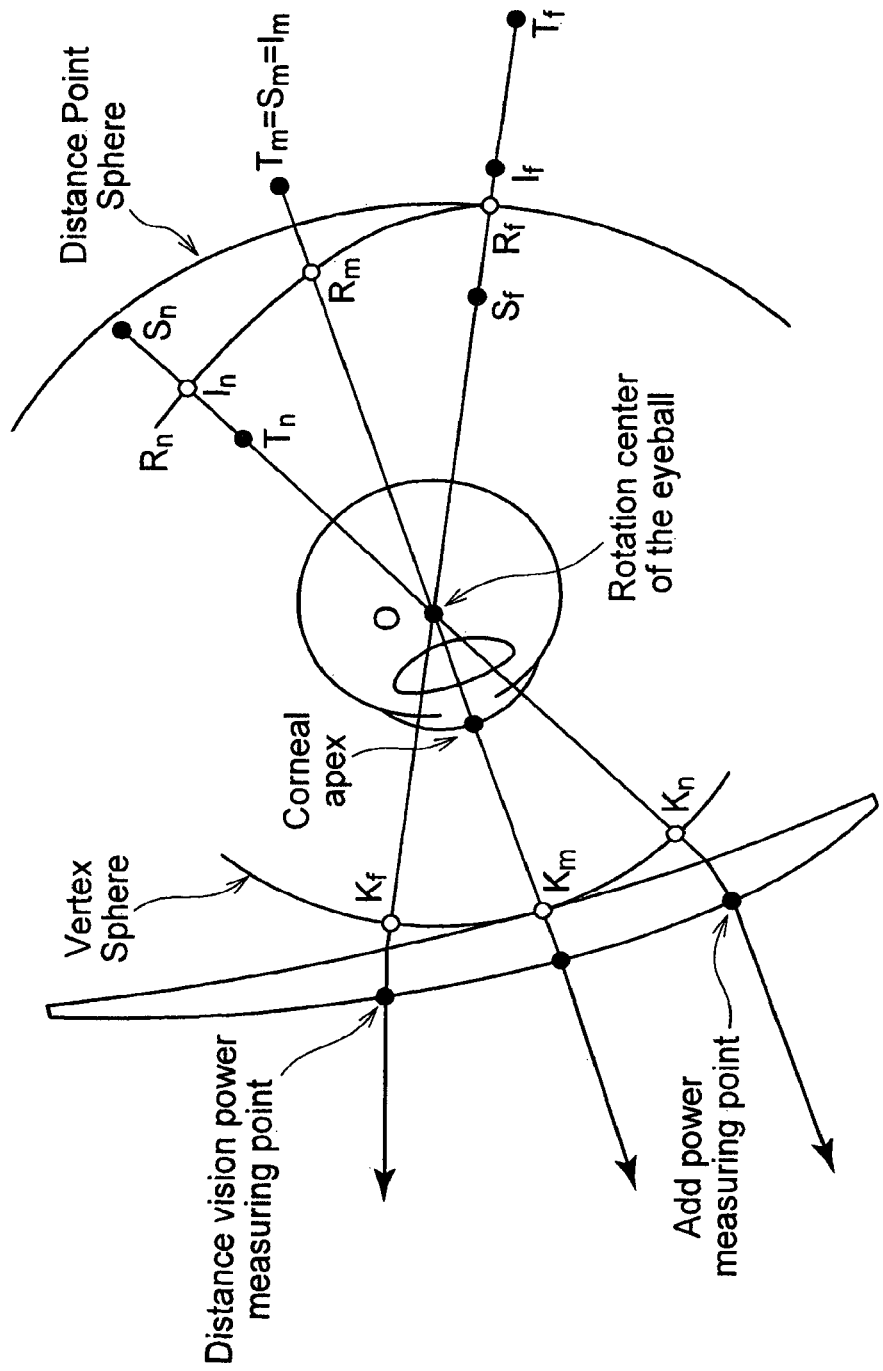
FIG. 3: shows a schematic overview for explanation of a transmission-based design.

FIG. 3 shows a schematic overview for explanation of a transmission-based design. It shows how to calculate transmitted power and transmitted inherent astigmatism. The origin point from which the focal distance of the transmission power is derived may be considered the hypothetical curved surface called the vertex sphere, with a radius equal to the distance from the rotary center of the eyeball to the back apex of the lens.

Moreover, the ideal focal location differs from that of a single vision lens. A characteristic curved surface corresponding to the progressive change of power is used because the distance point sphere in FIG. 3 cannot be used.

As can be seen from FIG. 3, a ray passing through an ideal single vision lens will be projected on the fundus of the eye on a distance point sphere; a ray passing through a progressive addition lens will be projected on a curve which is slightly turned inward (i.e. towards the lens) with respect to the distance point sphere (the curve on which points $R_n$, $R_m$, and $R_f$ lie), as a result of the radius of curvature decreasing in correspondence of an increasing addition power. Further, an ideal lens does not produce inherent, astigmatism, such that the transmitted rays will be focused on the mentioned curves.

However, a non-ideal lens (either single vision lens, or progressive addition lens) will typically produce inherent astigmatism, which is explained by tangential transmittance (T) and sagittal transmittance (S).

How to produce transmitted inherent astigmatism is indicated in FIG. 3. The difference between tangential transmittance (T) and sagittal transmittance (S) is transmitted inherent astigmatism. For instance, by set of a point Tf and a point Sf or a set of point of Tn and a point of Sn, the point Tf means tangential transmittance (T) when viewing in far distance (suffix "f" stands for far, as distance) and the point Tn means tangential transmittance (T) when viewing in near distance (suffix "n" stands for near vision).

Similarly, the point Sf means sagittal transmittance (S) when viewing in far distance (suffix "f" stands for far, as distance) and the point Sn means sagittal transmittance (S) when viewing in near distance (suffix "n" stands for near vision).

Each set includes points for representing two components of inherent astigmatism, i.e. two different points on which a point image will focus. It is further noted that a plurality (larger than two) of astigmatic components may be present, in which case tangential transmittance (T) and sagittal transmittance (S) may represent the maximum and minimum astigmatic components amongst the plurality.

Then, the inherent astigmatism when viewing distance is calculated from difference between tangential transmittance (Tf) and sagittal transmittance (Sf), and the inherent astigmatism when viewing near is calculated from difference between tangential transmittance (Tn) and sagittal transmittance (Sn).

Figure 4:
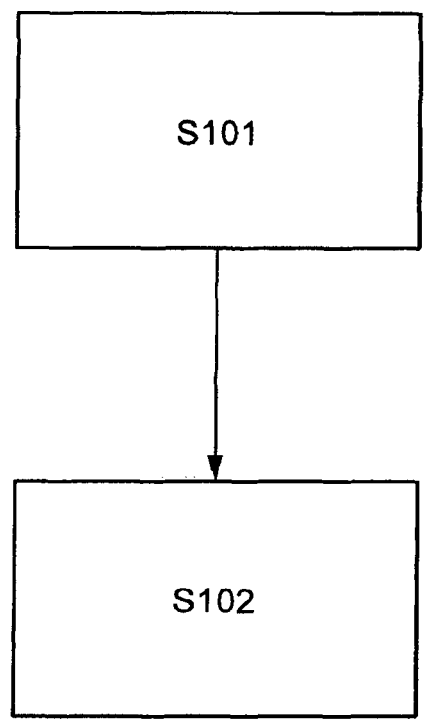
FIG. 4: shows a flowchart of a general method embodiment of the present invention.

FIG. 4 shows a flowchart of a general method embodiment of the present invention. FIG. 4 also shows a schematic overview of an exemplary method for designing, by means of a computer, a progressive addition lens. FIG. 4 consists of two steps of S101 and S102. A detailed description of S101 is shown from S101A to S101H in FIG. 25.

The progressive addition lens comprises a distance vision region, a near vision region, and an intermediate vision region, wherein a power gradually changes, and/or curvature changes gradually, between the distance vision region and the near vision region, as shown in FIG. 1A.

The progressive addition lens is based on prescription data. Further, the progressive addition lens can be based also on other parameters as, for example, wearing style, frame shape, etc. The method comprises the step S101 of determining a transmission astigmatic performance parameter.

This parameter may give an indication of the inherent astigmatism produced on the eye, i.e. the inherent astigmatism as actually perceived by the eye, or as transmitted through the lens, etc. The parameter can be the inherent astigmatism itself, or a parameter indirectly indicating the inherent astigmatism. The transmission astigmatic performance parameter may correspond to a sum of a prescribed astigmatism included in the prescription data and of a predetermined amount of extra astigmatism. Preferably the predetermined amount of extra astigmatism is 0.5D.

Introduction of the transmission astigmatic performance parameter in step S101 is an approach which has not been adopted in conventional optical design method. With the introduction, several kinds of optical performance of a progressive addition lens are improved than when applying conventional optical design method.

Examples of improvements are expansion of the clear vision region of the near vision region, decrease of the inherent astigmatism on the sides of the intermediate vision region and near vision region, widening of the horizontal width and decrease of the skew distortion; reduction of inherent astigmatism change rate, reduction of skew distortion, reduction of maximum amount of inherent astigmatism.

The transmission astigmatic performance parameter may comprise tangential transmittance (T) and sagittal transmittance (S); or in general two representative components of inherent astigmatism: for instance, a maximum value (T) and, respectively, a minimum value (S) amongst a plurality of astigmatic components transmitted by the lens.

The values of the parameter T and the parameter S (short notation for sagittal transmittance and tangential transmittance, having in mind that these terms encompass the several examples herein described) may be calculated by taking into account the sum of prescribed astigmatism and the extra astigmatism.

Or vice versa, the values of the parameter T and the parameter S can be set in order to obtain a desired inherent astigmatism corresponding to the sum of prescribed astigmatism and the extra astigmatism. The above applies also in case the prescribed astigmatism is zero, or where prescription data contains no prescribed astigmatism.

The extra astigmatism may be simply added to the one prescribed, and is exhibited in at least one point of the eye. The extra astigmatism is an extra astigmatism as—it should be—perceived by the eye, but not annoying, and thus different from surface inherent astigmatism. For example, providing extra astigmatism as perceived on the eye, or making horizontal and vertical power different from each other as a result of an intended transmittance, etc.

The invention does not exclude the use of other parameters like wearing style, etc. for the calculation of the transmission asigmatic performance parameter.

The method further comprises the step S102 of determining lens surface data corresponding to the determined transmission performance parameter. The step S102 corresponds to a step S102A in FIG. 25. In one example, once values of the parameter T and the parameter S are determined, a software may calculate the curvatures on the surface that provide the determined tangential and sagittal transmittances.

In another example, lens surface data corresponds to a distribution of height data of the lens, "z value" or also called as "sag value".

In another example, the surface is designed by a given software, and the transmitted inherent astigmatism for the lens surface is verified by measurements, or simulations, etc.; if the transmitted inherent astigmatism is not corresponding to sum of a prescribed astigmatism included in the prescription data and of a predetermined amount of extra astigmatism, the surface is changed until a satisfactory result is obtained. In other words, it can be said that step S102 determines the lens surface data by taking the transmission astigmatic performance parameter (taking into account the extra astigmatism) as an initial condition or constraint that the surface to be obtained has to meet. In other words, step S102 determines lens data for a lens exhibiting an astigmatism satisfying the requirement of the predetermined amount of extra astigmatism (in addition to the prescribed astigmatism, if prescribed). In general, by adding the extra astigmatism (in particular, within the predetermined amount of extra astigmatism as explained herein), it is possible to maintain a conformable intermediate or near vision regions by varying components of the power while maintaining the mean power constant or unchanged. In fact, as also herein explained, the power of the lens can be seen as having different components (e.g. horizontal and vertical, without limitation to horizontal and vertical as other components would work); thus, it is possible to vary the value of two components of the power while maintaining the mean power unchanged or constant (in the sense that the mean power is unchanged or constant when compared to the value of mean power expected (or determined) on the basis of prescription data). In this example, a comfortable vision is reached. Embodiments and later examples further describe how this can be further applied without limitations to the invention. In one example, not limiting the invention: let us consider the case wherein an extra astigmatism of 0.50D is added in the intermediate vision region and/or in the near vision region; it is then possible to reduce the vertical power by 0.25D and to increase the horizontal power by 0.25D while maintaining the mean power value unchanged (i.e. the same as the original value before modifying the vertical and horizontal components). This can be also expressed as follows (also here, without limitations to other ways of obtaining a comfortable vision as further below explained):

$$MP = (P_h + P_v)/2 = ((P_h + 0.25) + (P_v - 0.25))/2 = (P_h + P_v)/2 = MP$$

AS=difference between $P_h$ and $P_v$
Where: $P_h$ is the horizontal power, $P_v$ is the vertical power, AS is astigmatism, and MP is the mean power. As above explained, the vertical and horizontal powers can thus be varied relative to each other (i.e. not being set to the same values). In other example(s), the comfortable vision can be achieved by having different vertical and horizontal powers in the meridian, e.g. by having extra astigmatism constant in an intermediate regions, and/or extra astigmatism monotonically increasing at the meridian, and/or extra astigmatism monotonically decreasing at the meridian, etc.

Such a software may be any conventional software for designing lenses. The input of the software may be the prescribed astigmatism and the predetermined amount of extra astigmatism (optionally, a threshold of extra astigmatism may represent the predetermined amount of extra astigmatism). The lens is then machined on the basis of the lens surface data. The surface of the lens is designed such that the transmitted inherent astigmatism is as close as possible to a sum of a prescribed astigmatism amount and a predetermined extra astigmatism amount. The lens is then machined on the basis of the lens surface data. The lens thereby produced has an improved performance.

(Conventional Design)

Figure 5A:
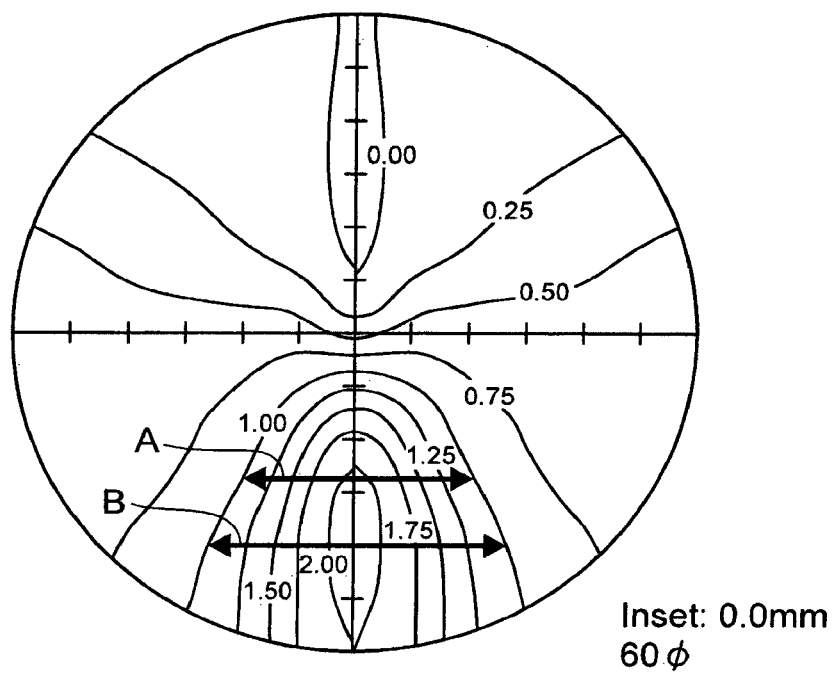
FIG. 5A: shows a transmitted mean power map corresponding to a conventional progressive addition lens.
Figure 6A:
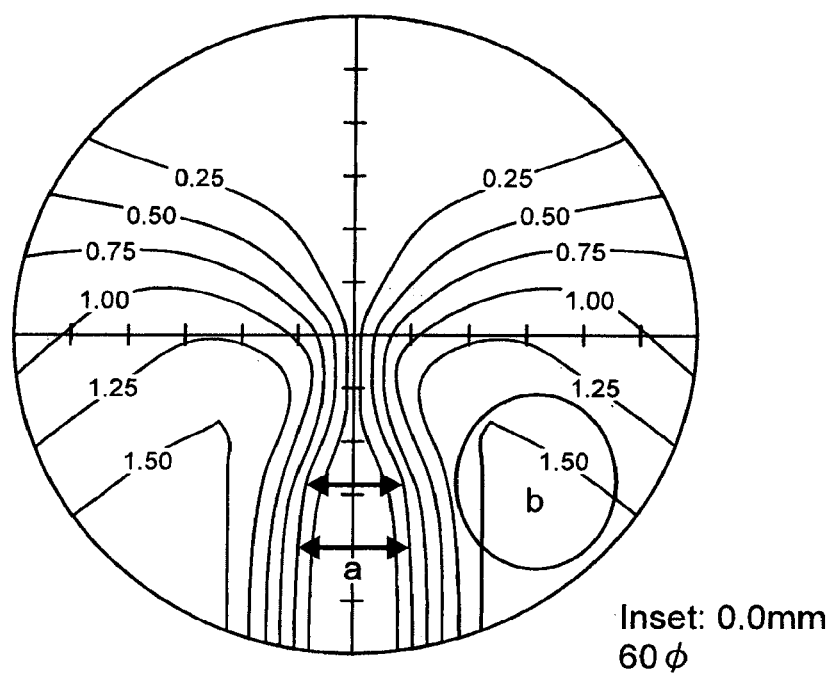
FIG. 6A: shows a transmitted inherent astigmatism map corresponding to a conventional progressive addition lens.

FIG. 5s and FIG. 6s (in the following, 6s means that reference is made to all FIGS. 6A, 6B, etc.; similar considerations apply to the other figures) show results of a conventional transmitted-based design.

FIG. 5A to FIG. 5D show a surface characterized by the transmitted mean power and, change of the transmitted mean power along the meridian and horizontal cross sections of the surface.

FIG. 6A to FIG. 6D show a surface characterized by the transmitted inherent astigmatism, and change of the transmitted inherent astigmatism along the meridian and horizontal cross sections of the surface.

Such surface may be intended as an imaginary surface on the side of the eye onto which the light rays passing through the lens are transmitted. The word "imaginary" means that the surface is not real surface of the lens. The transmitted mean power and the transmitted inherent astigmatism may be intended as the mean power and the inherent astigmatism exhibited on the side of the eye, which are different from the surface mean power (in the sense of the inverse of the radius of curvature) and the surface inherent astigmatism.

In the following, more detailed explanation is given to FIG. 5s and FIG. 6s.

FIG. 5A shows a transmitted mean power map corresponding to a conventional progressive addition lens. Diameter of the map is 60 mm and the inset is 0.0 mm. The prescription data is S +0.00 ADD 2.00. The arrows "A" and "B" correspond to horizontal widths at y=-14 mm as the arrow "A" and y=-20 mm as the arrow "B". Two arrows are at y=-14.0 mm (representative of the near vision region) and y=-20.0 mm (representative of lower part of the near vision region. y=-20.0 mm seems to be quite enough to secure the near vision region as lower limit, when taking into account a lens dispensing conditions into a frame) respectively. These arrows are referred later when comparing between the conventional design and embodiments of the present invention.

Figure 5B:
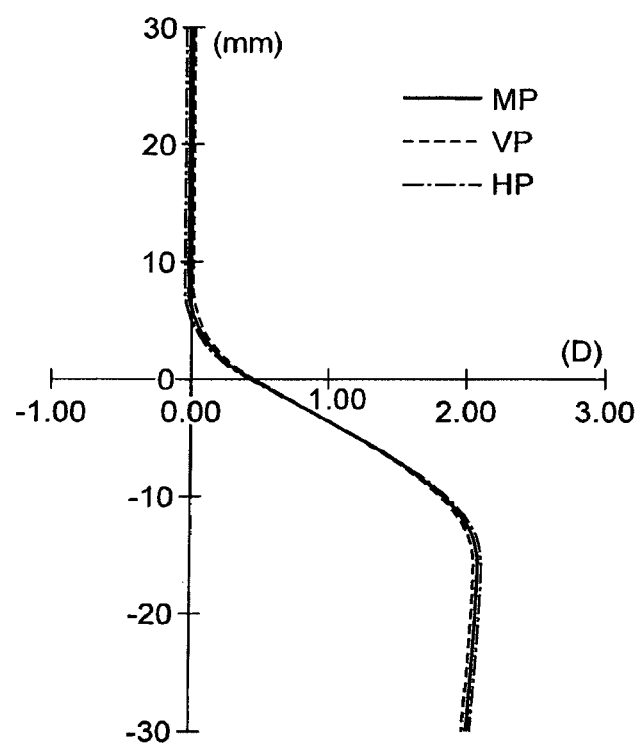
FIG. 5B: shows a transmitted power change along the meridian in vertical power, horizontal power, and mean power corresponding to a conventional progressive addition lens.

FIG. 5B shows a transmitted power change along the meridian in vertical power, horizontal power, and mean power corresponding to the conventional progressive addition lens. Vertical axis shows a position (mm) in y direction and horizontal axis shows addition power, ADD (D). In FIG. 5B, a vertical power (VP) line is in dotted, a horizontal power (HP) line is in dashed, and a mean power (MP) line is in solid. MP is average of VP and HP. According to the MP line in FIG. 5B, corridor length shows 18 mm, from the starting point of progression at y=4.0 mm to the end of progression at y=-14.0 mm where the mean power reaches addition power (ADD) of 2.00D.

Figure 5C:
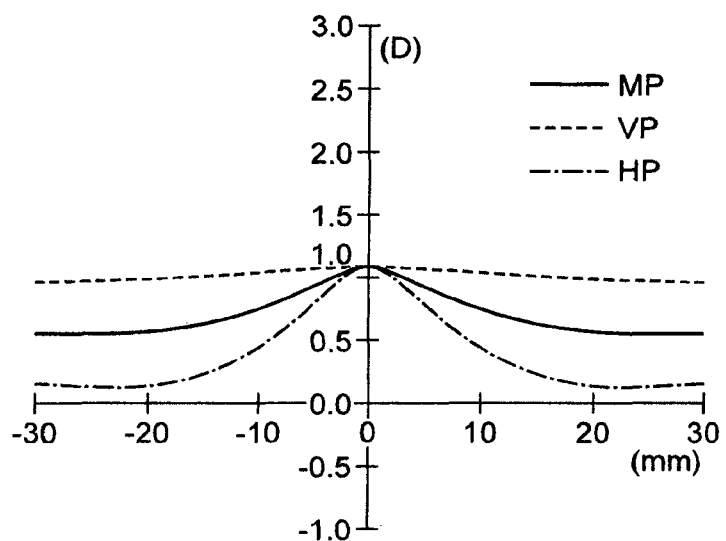
FIG. 5C: shows a schematic overview of a transmitted power change at horizontal cross section (y=−4.0 mm) corresponding to a conventional progressive addition lens.
Figure 5D:
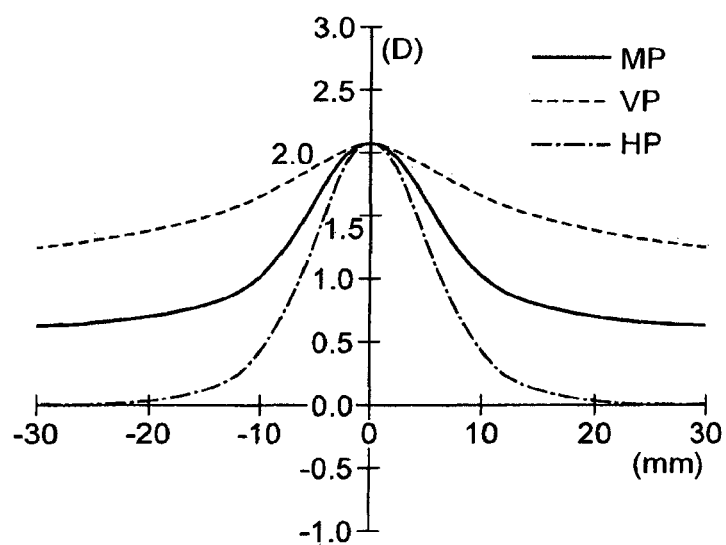
FIG. 5D: shows a schematic overview of a transmitted power change at horizontal cross section (y=−14.0 mm) corresponding to a conventional progressive addition lens.

FIG. 5C and FIG. 5D show a schematic overview of a transmitted power change on horizontal cross section corresponding to a conventional progressive addition lens in y=-4.0 mm in FIG. 5C and y=-14.0 mm in FIG. 5D respectively. Vertical axis shows power (D) and horizontal axis shows a position (mm) in x direction. Y=-4.0 mm is set as representative of the intermediate vision region and y=−14.0 mm is set as representative of the near vision region respectively.

FIG. 5B to FIG. 5D show there is almost no transmitted inherent astigmatism along the meridian. The transmitted inherent astigmatism is defined as a difference between the transmitted vertical power and the transmitted horizontal power, provided that these powers are orthogonal each other, and as FIG. 5B shows, the transmitted vertical power and the transmitted horizontal power are almost same from the top to the bottom along the meridian. Also, in FIG. 5C and FIG. 5D, VP and HP at x=0.0 mm are almost same, therefore transmitted inherent astigmatism is almost zero along the meridian.

FIG. 6A shows a transmitted inherent astigmatism map corresponding to a conventional progressive addition lens. Diameter of the map is 60 mm and the inset is 0.0 mm. Prescription data is S +0.00 ADD 2.00.

An area "a" corresponds to a measure of a clear vision region. The clear vision region is the region where a wearer can see the sight clear through the progressive addition lens. The clear vision region is defined as a region surrounded by specific contour lines of inherent astigmatism (in other words, a closed region defined by a contour line having one constant value for a property/parameter, in this case a line having a constant value for the inherent astigmatism). In this example, a value of inherent astigmatism is 0.50D. The value is not limited to 0.50D, for instance 0.25D is more preferable, however, it would be better not to exceed 0.50D.

Two arrows in the area "a" are at y=−14.0 mm (representative of the near vision region) and y=−20.0 mm (representative of lower part of the near vision region. Y=−20.0 mm seems to be quite enough to secure the near vision region as lower limit, when taking into account a lens dispensing conditions into a frame) respectively.

A circled area with sign "b" in FIG. 6A corresponds to an area where maximum inherent astigmatism exists and a value of the inherent astigmatism in the area "b" is maximum. These arrows, the area "a" and the area "b" are referred later when comparing with the embodiment of the present invention.

Figure 6B:
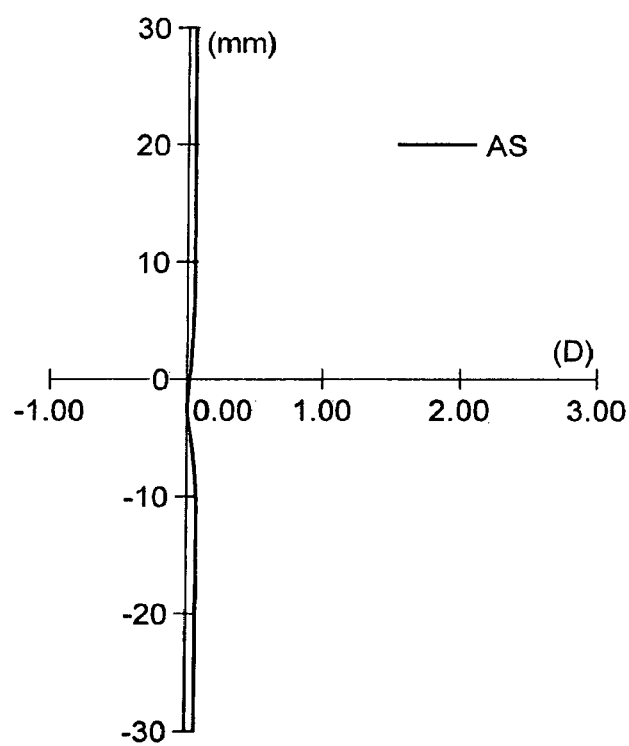
FIG. 6B: shows a transmitted inherent astigmatism change along the meridian corresponding to a conventional progressive addition lens.

FIG. 6B shows a transmitted inherent astigmatism change along the meridian corresponding to a conventional progressive addition lens. Vertical axis shows a position (mm) in y direction and horizontal axis shows a transmitted inherent astigmatism (D). FIG. 6B also shows inherent astigmatism along the meridian is substantially zero in relation to FIG. 5B.

Figure 6C:
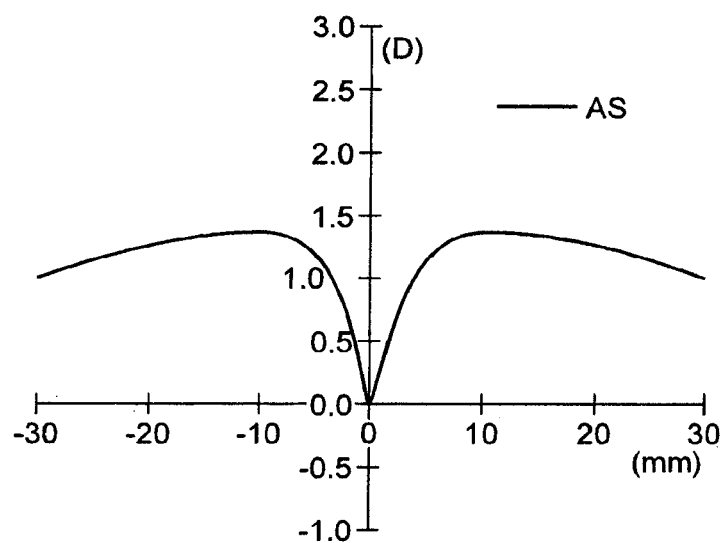
FIG. 6C: shows a schematic overview of a transmitted inherent astigmatism change on horizontal cross section (y=−4.0 mm) corresponding to a conventional progressive addition lens.
Figure 6D:
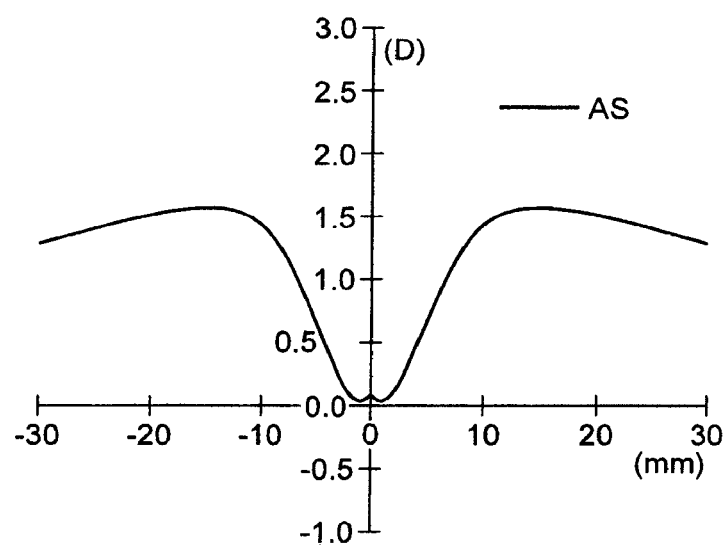
FIG. 6D: shows a schematic overview of a transmitted inherent astigmatism change on horizontal cross section (y=−14.0 mm) corresponding to a conventional progressive addition lens.

FIG. 6C and FIG. 6D show a schematic overview of a transmitted inherent astigmatism change on horizontal cross section corresponding to a conventional progressive addition lens at y=−4.0 mm in FIG. 6C and y=−14.0 mm in FIG. 6D respectively. Vertical axis shows a transmitted inherent astigmatism. (D) and horizontal axis shows a position (mm) in x direction. Y=−4.0 mm is set as representative of the intermediate vision region and y=−14.0 mm is set as representative of the near vision region respectively. According to FIG. 6C and FIG. 6D, the values of the inherent astigmatism along the meridian (x=0.0 mm) are almost zero.

Embodiment 1

FIG. 7s and FIG. 8s show an embodiment 1 where the extra astigmatism is added in correspondence of the near vision region and the intermediate vision region, and an amount of vertical power is lower than an amount of horizontal power.

FIG. 7A to FIG. 7D show a surface characterized by the transmitted mean power, and change of the transmitted mean power along the meridian and horizontal cross sections of the surface.

FIG. 8A to FIG. 8D show a surface characterized by the transmitted inherent astigmatism, and change of the transmitted inherent astigmatism along the meridian and horizontal cross sections of the surface.

Such surfaces may be intended as an imaginary surface on the side of the eye onto which the light rays passing through the lens are transmitted. The word "imaginary" means that the surface is not real surface of the lens (The imaginary surface is a reference surface set for calculating aberration; it does not need to be on the cornea, retina, etc. The transmitted mean power and the transmitted inherent astigmatism may be intended as the mean power and the inherent astigmatism exhibited on the side of the eye, which are different from the surface mean power (in the sense of the inverse of the radius of curvature) and the surface inherent astigmatism.

In the following, more detailed explanation is given to FIG. 7s and FIG. 8s.

Figure 7A:
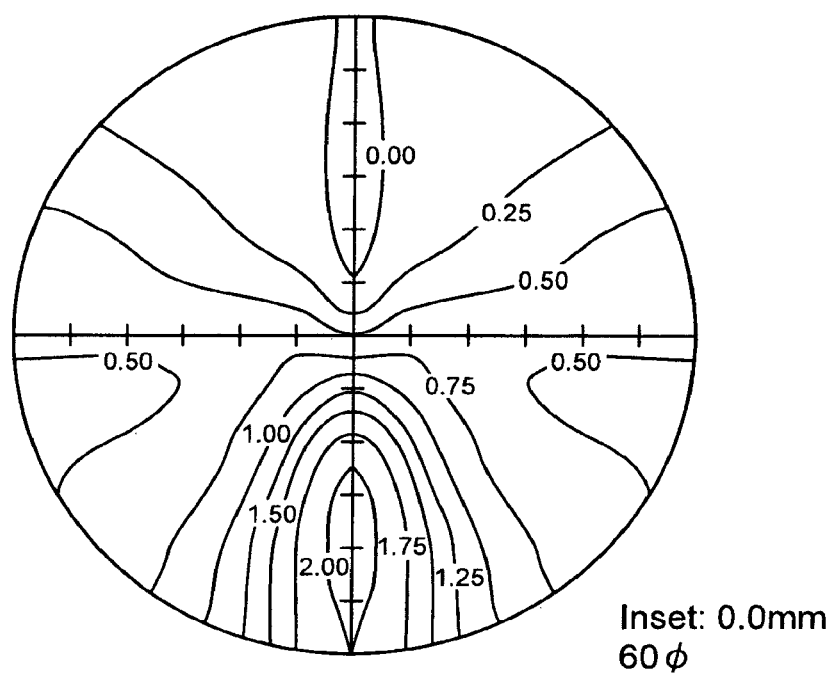
FIG. 7A: shows a transmitted mean power map corresponding to the embodiment 1.

FIG. 7A shows a transmitted mean power map corresponding to the embodiment 1. Diameter of the map is 60 mm and the inset is 0.0 mm. The prescription data is S +0.00 ADD 2.00.

Figure 7B:
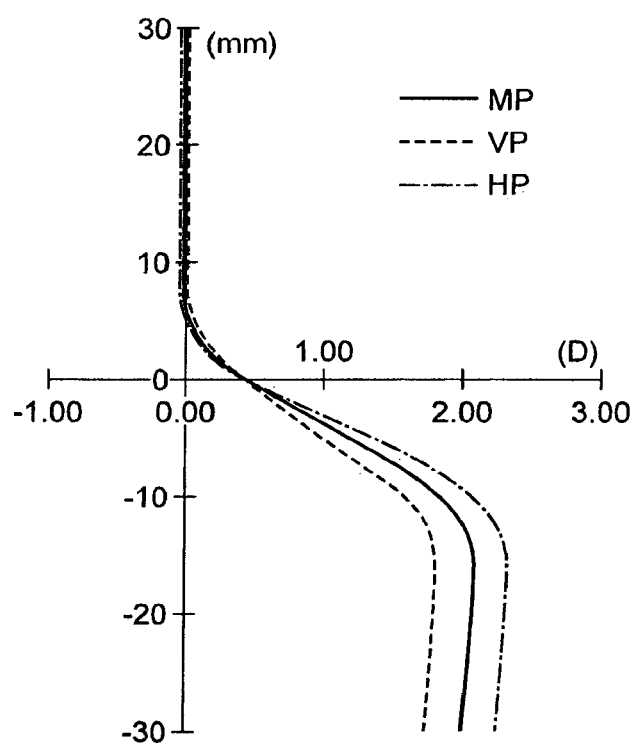
FIG. 7B: shows a transmitted power change along the meridian in vertical power, horizontal power, and mean power corresponding to the embodiment 1.

FIG. 7B shows a transmitted power change along the meridian in vertical power, horizontal power, and mean power corresponding to the embodiment 1. Vertical axis shows position (mm) in y direction and horizontal axis shows addition power, ADD (D). In FIG. 7B, a vertical power (VP) line is in dotted, a horizontal power (HP) line is in dashed, and a mean power (MP) line is in solid. MP is average of VP and HP. According to the MP line in FIG. 7B, corridor length shows 18 mm, from the starting point of progression at y=4.0 mm to the end point of progression at y=−14.0 mm where the mean power reaches addition power (ADD) of 2.00D.

The region where between the starting point and the endpoint in progression corresponds to the intermediate vision region. The region where above the starting point of progression corresponds to the distance vision region. The region where under the endpoint of progression corresponds to the near vision region.

In FIG. 7B, the vertical power line, the horizontal power line, and the mean power line further show that the extra astigmatism of 0.50D is added in the intermediate vision region and in the near vision region by reducing vertical power by 0.25D and by increasing horizontal power by 0.25D while mean power value maintains. Also, FIG. 7B shows that an amount of vertical power is lower than an amount of horizontal power.

The extra astigmatism works in the direction of canceling astigmatism that originally exists and inherent to a progressive surface, and therefore the clear vision region of the near vision region is expanded.

Figure 7C:
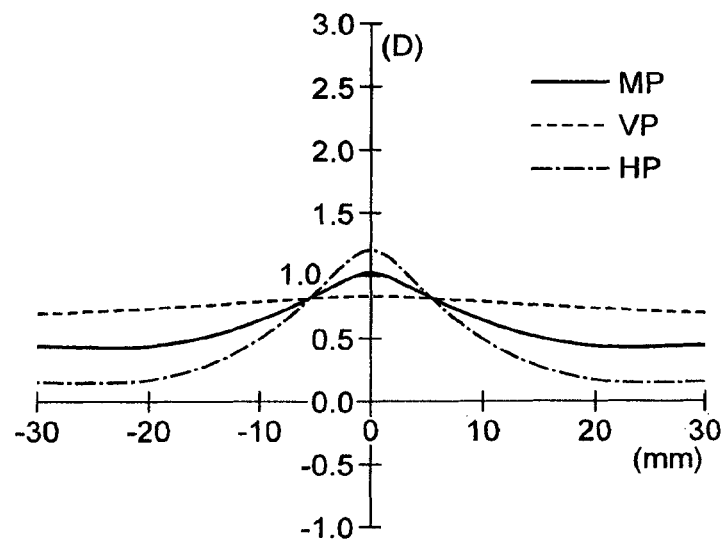
FIG. 7C: shows a schematic overview of a transmitted power change on horizontal cross section (y=−4.0 mm) corresponding to the embodiment 1.
Figure 7D:
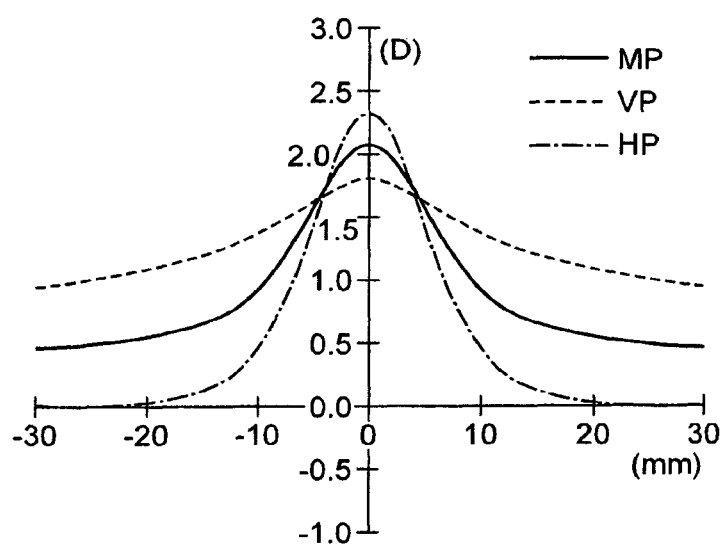
FIG. 7D: shows a schematic overview of a transmitted power change on horizontal cross section (y=−14.0 mm) corresponding to the embodiment 1.

FIG. 7C and FIG. 7D show a schematic overview of a transmitted power change on horizontal cross sections at y=−4.0 mm in FIG. 7C and y=−14.0 mm in FIG. 7D respectively. Vertical axis shows power (D) and horizontal axis shows a position (mm) in x direction. Y=−4.0 mm is set as representative of the intermediate vision region and y=−14.0 mm is set as representative of the near vision region respectively. FIG. 7D shows that an amount of vertical power is lower than an amount of horizontal power at least one point of the near vision region.

In FIG. 7C and FIG. 7D, the amount of vertical power is lower than an amount of horizontal power in the vicinity of the meridian, approximately from x=−5.0 mm to X=5.0 mm, while toward the peripheral of the lens, the amount of vertical power is higher than the amount of horizontal power.

Since vertical power is reduced toward the peripheral of the lens in FIG. 7D, the inherent astigmatism on the peripheral of the near vision region decreases. Reduction of the inherent astigmatism on the sides of the near vision region is explained later, in comparison between FIG. 6A and FIG. 8A.

In other words, the extra astigmatism is caused at 0.50 D so that the power in the vertical direction is lower than the power in the horizontal direction along the meridian in the intermediate vision region and the near vision region. This is a direction in which distortion specific to a progressive surface is resolved.

Figure 8A:
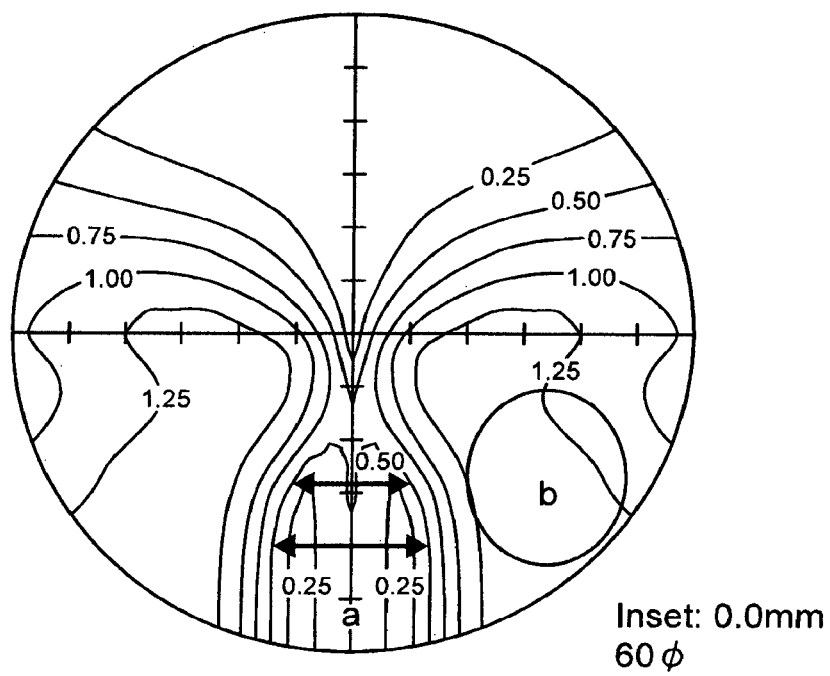
FIG. 8A: shows a transmitted inherent astigmatism map corresponding to the embodiment 1.

FIG. 8A shows a transmitted inherent astigmatism map corresponding to the embodiment 1. Diameter of the map is 60 mm and the inset is 0.0 mm. Prescription data is S +0.00 ADD 2.00.

An area "a" corresponds to a measure of a clear vision region. The clear vision region is the region where a wearer can see the sight clear through the progressive addition lens. The clear vision region is defined as a region surrounded by specific contour lines of inherent astigmatism with a predetermined threshold. In this example, a value of inherent astigmatism is 0.50D. The value is not limited to 0.50D, for instance 0.25D is more preferable, however, it would be better not to exceed 0.50D.

Two arrows in the area "a" are at y=−14.0 mm (representative of the near vision region) and y=−20.0 mm (representative of lower part of the near vision region. y=−20.0 mm seems to be quite enough to secure the near vision region as lower limit, when taking into account a lens dispensing conditions into a frame) respectively.

A circled area with sign "b" in FIG. 8A corresponds to an area where maximum inherent astigmatism exists and a value of the inherent astigmatism in the area "b" is maximum. These arrows, the area "a" and the area "b" are referred later when comparing with the conventional design.

Figure 8B:
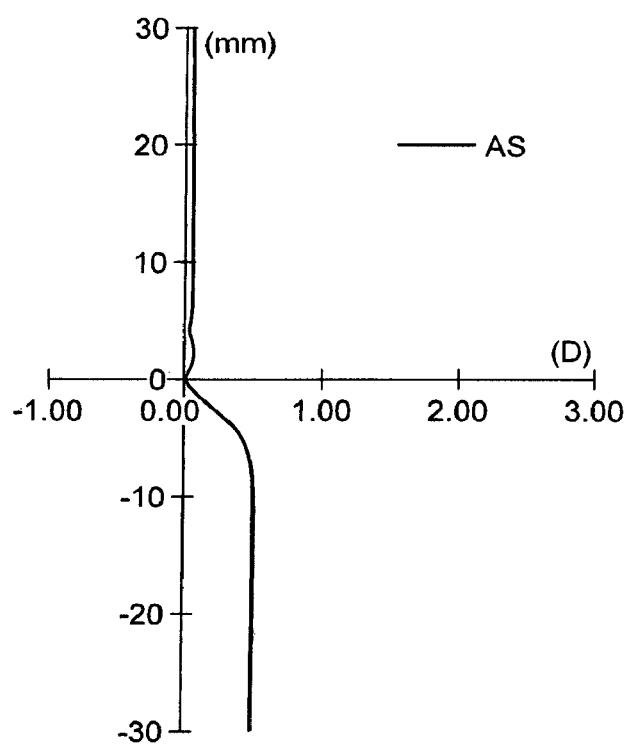
FIG. 8B: shows a transmitted inherent astigmatism change along the meridian corresponding to the embodiment 1.

FIG. 8B shows a transmitted inherent astigmatism change along the meridian corresponding to the embodiment 1. Vertical axis shows a position (mm) in y direction and horizontal axis shows a transmitted inherent astigmatism (D). FIG. 8B also shows a predetermined amount of extra astigmatism of 0.50D is intentionally added along the meridian in the intermediate vision region and the near vision region in comparison to FIG. 7B. The transmission performance parameter corresponding to a sum of the prescribed astigmatism included in the prescription data and of a predetermined amount of extra astigmatism is 0.50D.

Figure 8C:
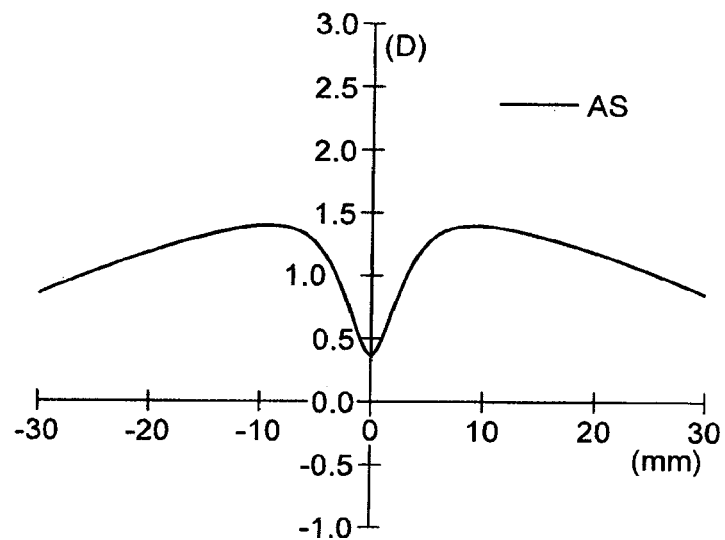
FIG. 8C: shows a schematic overview of a transmitted inherent astigmatism change on horizontal cross section (y=−4.0 mm) corresponding to the embodiment 1.
Figure 8D:
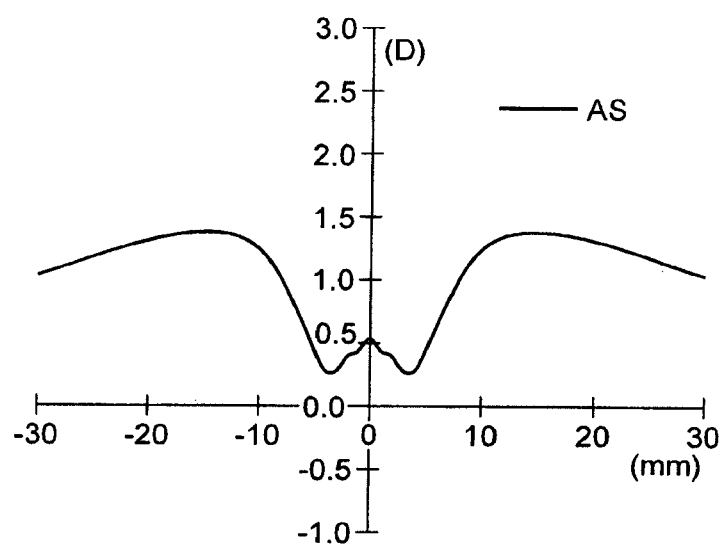
FIG. 8D: shows a schematic overview of a transmitted inherent astigmatism change on horizontal cross section (y=−14.0 mm) corresponding to the embodiment 1.

FIG. 8C and FIG. 8D show a schematic overview of a transmitted inherent astigmatism change on horizontal cross section at y=−4.0 mm in FIG. 8C and y=−14.0 mm in FIG. 8D respectively. Vertical axis shows a transmitted inherent astigmatism (D) and horizontal axis shows a position (mm) in x direction. Y=−4.0 mm is set as representative of the intermediate vision region and y=−14.0 mm is set as representative of the near vision region respectively.

In FIG. 8C and FIG. 8D, the extra astigmatism of around 0.50D is added along the meridian. At y=−14.0 mm, where a near point (NP) in the near vision region is set, the extra astigmatism reaches 0.50D.

Description of Embodiment 1

The embodiment 1 shows that the extra astigmatism is added such that it is produced on the eye and in correspondence of the near and intermediate vision regions. Further, in one example, the amount of vertical power is lower than the amount of horizontal power in correspondence of at least one point of the near vision region.

In other words, the extra astigmatism is added such that the amount of vertical power is lower than the amount of horizontal power so that the extra astigmatism may be obtained on the eye. The vertical and horizontal powers may be those perceived or produced on the eye, i.e. the transmitted vertical power and transmitted horizontal power.

More in general, the vertical and horizontal powers are two power components when a plurality larger than two components is present. Also, horizontal and vertical is not limited to a specific reference system, as long as there are two components on the basis of which inherent astigmatism can be described. An expanded near vision region can thereby be obtained.

Optionally in the embodiment 1, the extra astigmatism corresponds to a measure of a clear vision region of the near vision region. In other words, the extra astigmatism is associated or is determined on the basis of a measure of a clear vision region of the near vision region. The measure may include a width of a clear vision region, the width optionally being the width of an area characterized by an inherent astigmatism value being below a predetermined threshold; in another example, the measure may be (a measure of) an area of the clear vision region; in another example, it is a combination of an enlarged width and enlarged area.

In further other words, the extra astigmatism is set in association to a width of a region having an inherent astigmatism below (or equal to) a given threshold. In this way, the extra astigmatism can be imparted so, as to control the width of the clear vision region in the near vision region.

Optionally in the embodiment 1, the extra astigmatism corresponds to an expanded clear vision region, wherein the expanded clear vision region is a clear vision region being larger than a clear vision region corresponding to substantially zero extra astigmatism. Namely, the amount of extra astigmatism may be calculated taking into consideration an expansion of the clear vision region with respect to the case of substantially zero addition.

Optionally in the embodiment 1, the extra astigmatism is in relationship to an expanded clear vision region, and an increase in the extra astigmatism corresponds to an increase in a width of the expanded clear vision region.

In conventional optical design, it was thought that the meridian must be umbilical, so there were restrictions when an optical lens designer tried to expand the clear vision region. However, contrary to the conventional optical design, by providing extra astigmatism to make the meridian not to be umbilical, the restrictions become less. The effect of expansion is proportional to an amount of extra astigmatism, even although there is an upper limit.

Thus, by varying the extra astigmatism, it is possible to control the width of the expanded clear vision region in the near vision region. In one example, the clear vision region is a region being characterized by the extra astigmatism being below a predetermined threshold.

(Comparison Between Conventional Design and Embodiment 1 as the State of Target Distribution)

The conventional design using conventional transmission-based design (FIG. 6A) and the embodiment 1 (FIG. 8A) is compared in transmitted inherent astigmatism maps. These maps are used as target distributions for the transmitted inherent astigmatism that are set as a reference when producing actual surfaces of finally obtained lens.

FIG. 6A and FIG. 8A show a comparison for the transmitted inherent astigmatism maps between a conventional design (FIG. 6A) and the embodiment 1 (FIG. 8A). The comparison shows that the clear vision region of the near vision region of the embodiment 1 is expanded than that of conventional one. See the area "a" on the both transmitted inherent astigmatism maps.

Widths of the clear vision region by image measurement in the transmitted inherent astigmatism map of the embodiment 1 are 10.65 mm and 13.55 mm at y=−14.0 mm (upper "a") and y=−20.0 mm (lower "a") respectively. For the conventional design, in the same manner, 8.71 mm and 10.64 mm at y=−14.0 mm (upper "a") and y=−20.0 mm (lower "a") respectively.

Also, the peripheral area in FIG. 8A does not show high inherent astigmatism value, i.e. the area having an inherent astigmatism equal to 1.50D on the side area in FIG. 6A does not appear in the corresponding map of FIG. 8A. See the circled area with sign "b" on the transmitted inherent astigmatism maps. The inherent astigmatism value of the circled area "b" of conventional design is over 1.50D, while that of the present embodiment is less than 1.50D. An improved lens is thereby obtained.

(Comparison Between Conventional Design and Embodiment 1 as the State of Finally Obtained Lens)

Figure 13A:
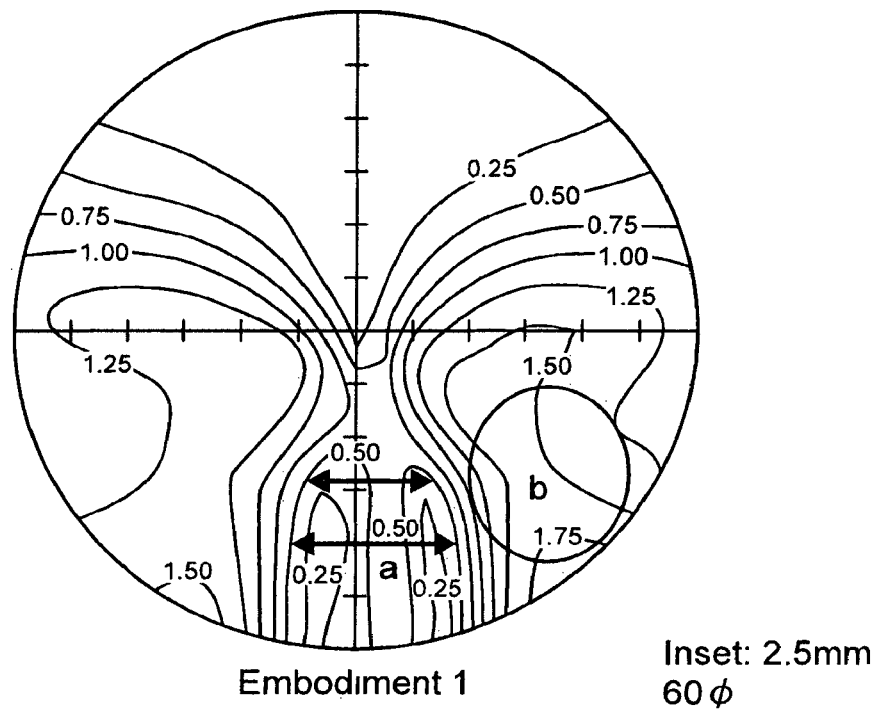
FIG. 13A and FIG. 13B: show a comparison of finally obtained transmitted inherent astigmatism maps between the embodiment 1 and a conventional design.
Figure 13B:
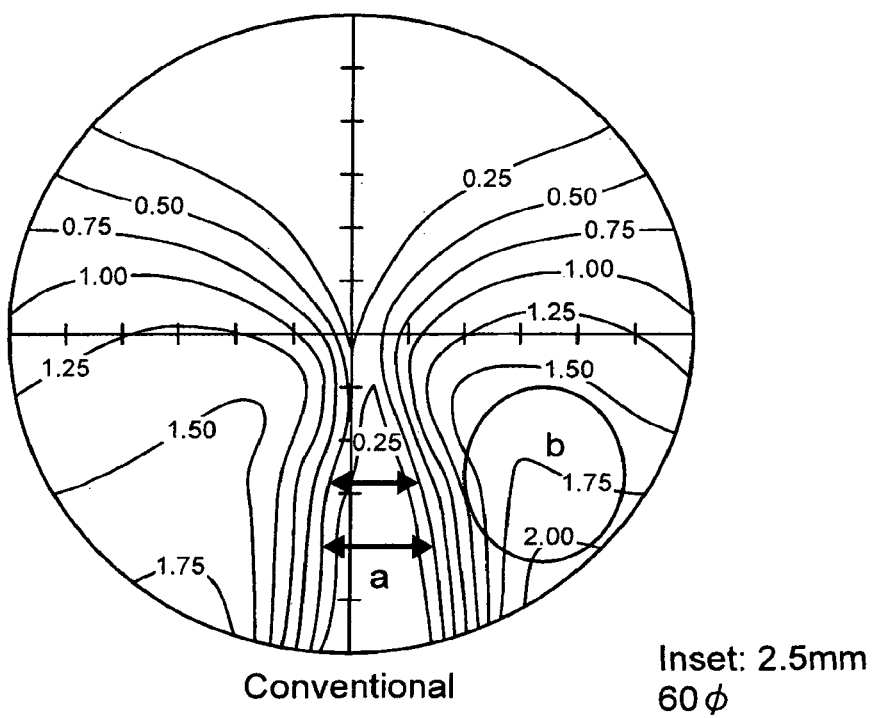

Next, in the following, a design flow to the finally obtained lens based on a set of the transmitted mean power map and the transmitted inherent astigmatism map as the target distribution is described. Then make a comparison between the conventional design and the embodiment 1 in transmitted inherent astigmatism naps of finally obtained lens are shown in FIG. 13A and FIG. 13B later.

After the target distribution is determined, an outer surface and inner surface are designed so that the target distribution in transmission is actually obtained. (See the step S102 of FIG. 4 or the step S102A of FIG. 25.)

Figure 25:
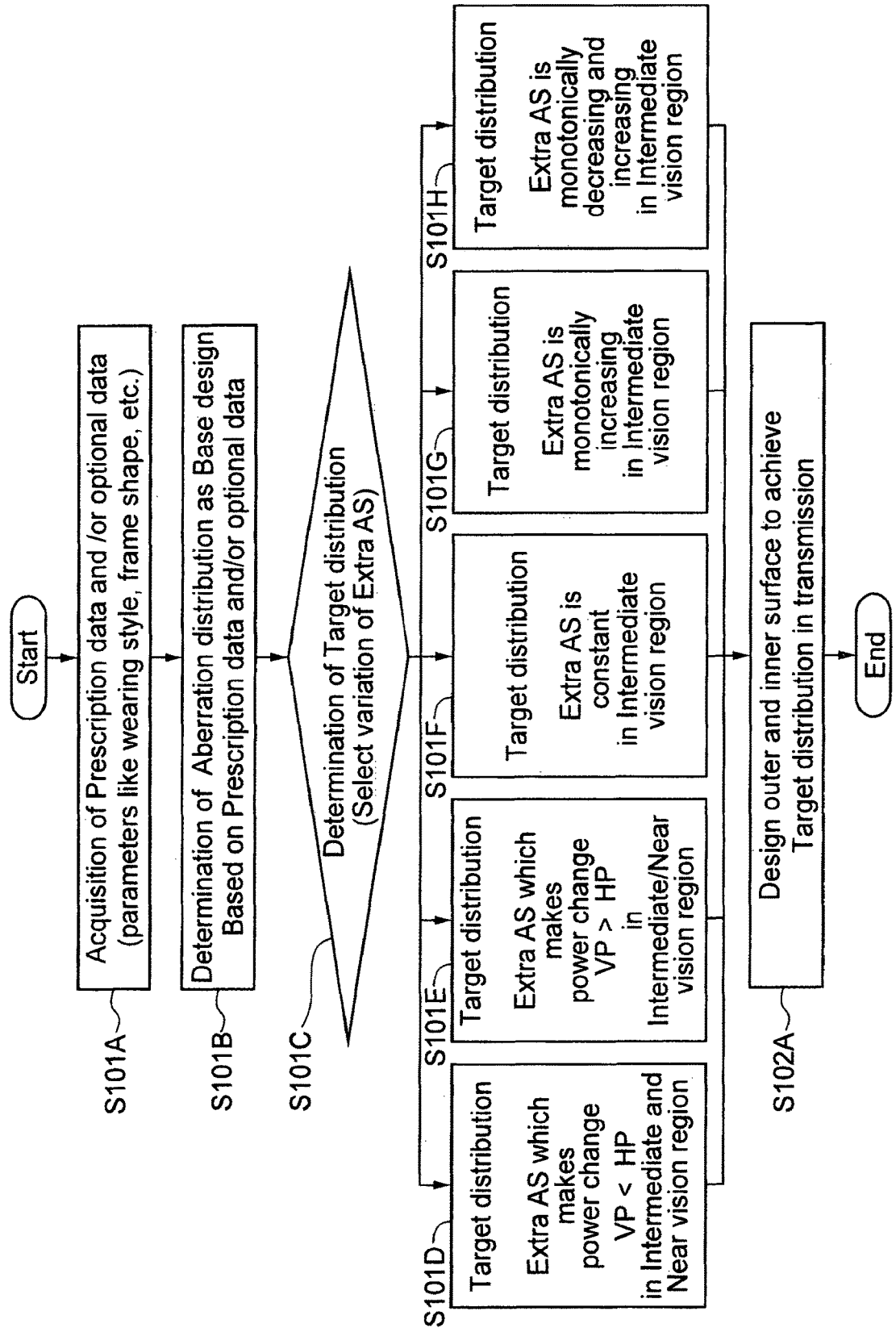
FIG. 25: shows a flowchart of the steps of designing a spectacle lens for realizing a method for designing a spectacle lens according to embodiments of the present invention.

Herein, design processes are followed referring FIG. 25.

First, parameters suitable for eye glasses specifications and wearers are obtained. For instance, prescription data. Prescription data is the same for both conventional and the embodiment of the present invention cases, for instance, S +0.00D ADD 2.00D. (See the step S101A in FIG. 25)

Next, a base design may be designed newly or selected from arbitral existing design line up of progressive addition lenses. Here we use sample design A as the base design. (See a step S101B in FIG. 25) Corridor length of the sample design A is 18 mm as lens design, inner surface progressive addition lens as surface structure, inset is 2.5 mm, and refractive index equal to 1.60. The base design is common for both conventional and the embodiment of the present invention.

The base design is designed or selected, though similar results would be obtained with other designs available in the industry. The base design for the present embodiment can be obtained for instance as in the conventional art.

Next, the target distribution is determined. (See a step S101C in FIG. 25) For the embodiment 1, the amount of extra astigmatism is set at 0.50D along the meridian where the vertical power is lower than the horizontal power. (See a step S101D in FIG. 25). The amount of extra astigmatism and relationship between vertical power and horizontal power can be set preferably by a lens manufacturer, but may be set also by the optician in advance in S101A. While, the target distribution of conventional design, it is as same as base design, because of zero extra astigmatism.

Then, an outer surface and inner surface are designed so that a power distribution after light transmitted these two surfaces will match the target distribution in transmission (See a step S102A in FIG. 25). In this embodiment, the inner surface is the progressive surface, and the inner surface side has been designed optimally (the so-called aspheric correction has been performed; however, other techniques would lead to similar results).

An outer surface and inner surface are designed so that a target distribution in transmission is actually obtained. In other word, the target distribution can be said to correspond to the determined transmission performance parameters. The effects above described can be recognized also from a comparison between FIG. 13A (the embodiment 1) and FIG. 13B (conventional design).

Parameters for transmission calculation are, for instance, the corneal to vertex distance (CVD) is 12.0 mm, vertex to center of rotation of the eye is 25.0 mm, pansophic angle is 10.0 degree, pupil distance (PD) is 64.0 mm, and frame face form angle is 0.0 degree.

The example of these figures of parameters is based on the transmission-based design above discussed; while this is preferable, similar results can be obtained with other methods as long as the extra astigmatism is intentionally added so as to have the extra astigmatism provided on the eye.

FIG. 13A and FIG. 13B show a comparison of finally obtained transmitted inherent astigmatism maps between the embodiment 1 and the conventional design. The comparison shows that the clear vision region in the near vision region of the embodiment 1 is expanded than that of conventional one. See the area "a" on the both transmitted inherent astigmatism maps.

Widths of the clear vision region by image measurement in the transmitted inherent astigmatism-map of the embodiment 1 are 11.13 mm and 15.00 mm at y=−14.0 mm (upper "a") and y=−20.0 mm (lower "a") respectively. For the conventional design, in the same manner, 7.74 mm and 10.16 mm at y=−14.0 mm (upper "a") and y=−20.0 mm (lower "a") respectively.

Also, the peripheral area in FIG. 13A does not show high inherent astigmatism value, i.e. the area having an inherent astigmatism equal to 1.75D on the side area in FIG. 13B almost does not appear in the corresponding map of FIG. 13A. See a circled area with sign "b" on the transmitted inherent astigmatism maps. The inherent astigmatism value of the circled area "b" of conventional design is over 1.75D, while that of the embodiment 1 is almost less than 1.75D.

Embodiment 2

FIG. 9s and FIG. 10s show an embodiment 2 where the extra astigmatism is added in correspondence of the near vision region and the intermediate vision region, and an amount of vertical power is higher than an amount of horizontal power.

FIG. 9A to FIG. 9D show a surface characterized by the transmitted mean power, and change of the transmitted mean power along the meridian and horizontal cross sections of the surface.

FIG. 10A to FIG. 10D show a surface characterized by the transmitted inherent astigmatism, and change of the transmitted inherent astigmatism along the meridian and horizontal cross sections of the surface.

Such surfaces may be intended as an imaginary surface on the side of the eye onto which the light rays passing through the lens are transmitted. The word "imaginary" means that the surface is not real surface of the lens. The transmitted mean power and the transmitted inherent astigmatism may be intended as the mean power and the inherent astigmatism exhibited on the side of the eye, which are different from the surface mean power (in the sense of the inverse of the radius of curvature) and the surface inherent astigmatism.

In the following, more detailed explanation is given to FIG. 9s and FIG. 10s.

Figure 9A:
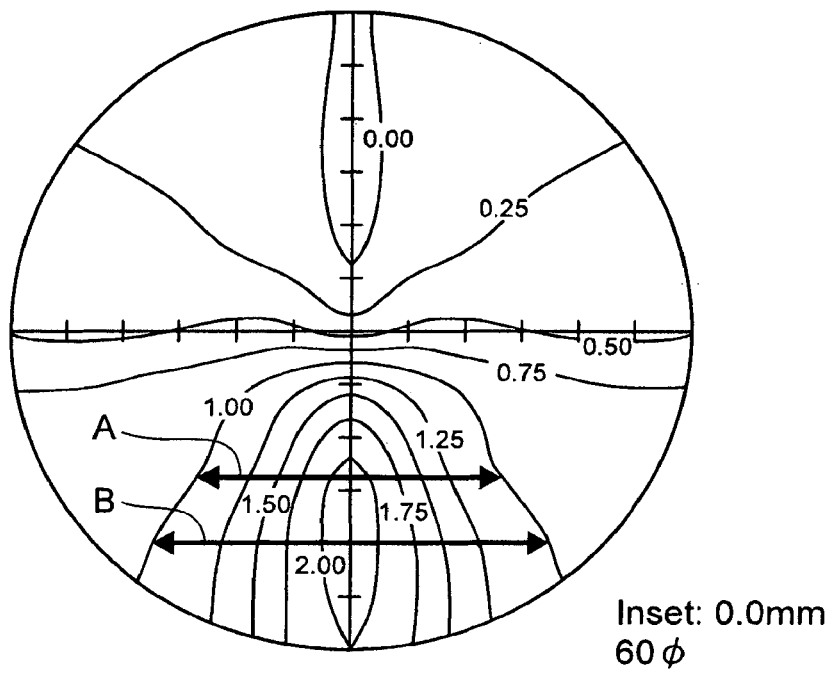
FIG. 9A: shows a transmitted mean power map corresponding to the embodiment 2.

FIG. 9A shows a transmitted mean power map corresponding to the embodiment 1. Diameter of the map is 60 mm and the inset is 0.0 mm. Prescription data is S +0.00 ADD 2.00. The arrows "A" and "B" correspond to horizontal widths at y=–14 mm as the arrow "A" and y=–20 mm as the arrow "B". Two arrows are at y=–14.0 mm (representative of the near vision region) and y=–20.0 mm (representative of lower part of the near vision region. y=–20.0 mm seems to be quite enough to secure the near vision region as lower limit, when taking into account a lens dispensing conditions into a frame) respectively. These arrows are referred later when comparing with conventional design.

Figure 9B:
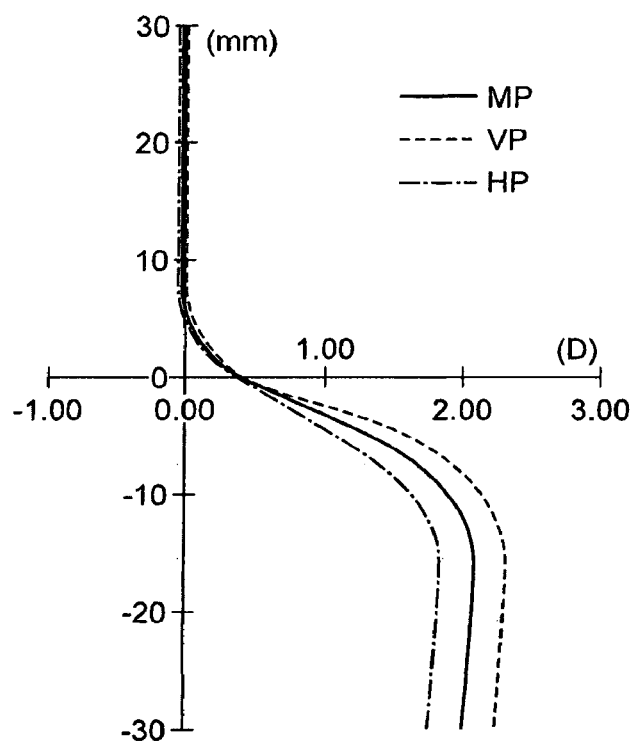
FIG. 9B: shows a transmitted power change along the meridian in vertical power, horizontal power, and mean power corresponding to the embodiment 2.

FIG. 9B shows a transmitted power change along the meridian in vertical power, horizontal power, and mean power corresponding to the embodiment 2. Vertical axis shows position (mm) in y direction and horizontal axis shows addition power, ADD (D). In FIG. 9B, a vertical power (VP) line is in dotted, a horizontal power (HP) line is in dashed, and a mean power (MP) line is in solid. MP is average of VP and HP. According to the MP line in FIG. 9B, corridor length shows 18 mm, from the starting point of progression at y=4.0 mm to the end of progression at y=–14.0 mm where the mean power reaches addition power (ADD) of 2.00D.

The region where between the starting point and the endpoint in progression corresponds to the intermediate vision region. The region where above the starting point of progression corresponds to the distance vision region. The region where under the endpoint of progression corresponds to the near vision region.

In FIG. 9B, the vertical power line, the horizontal power line, and the mean power line further show that the extra astigmatism of 0.50 D is added in the intermediate vision region and in the near vision region by reducing horizontal power by 0.25D and by increasing vertical power by 0.25D while mean power value maintains. Also, the FIG. 9B shows that the amount of vertical power is higher than the amount of horizontal power.

Figure 9C:
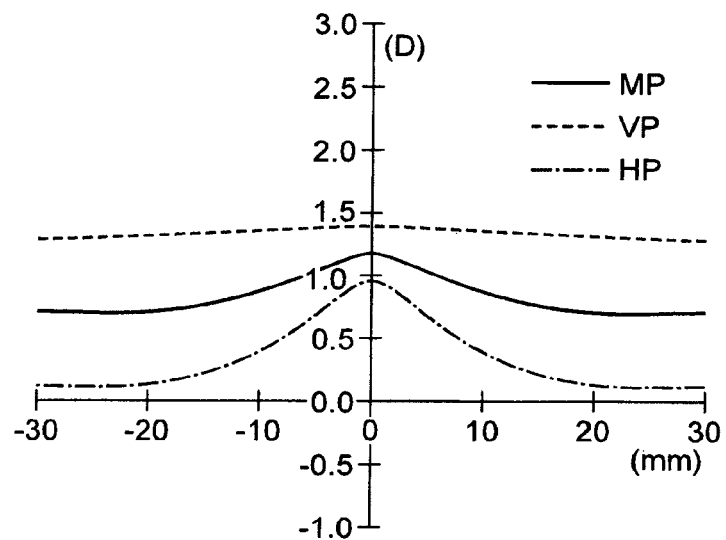
FIG. 9C: shows a schematic overview of a transmitted power change on horizontal cross section (y=−4.0 mm) corresponding to the embodiment 2.
Figure 9D:
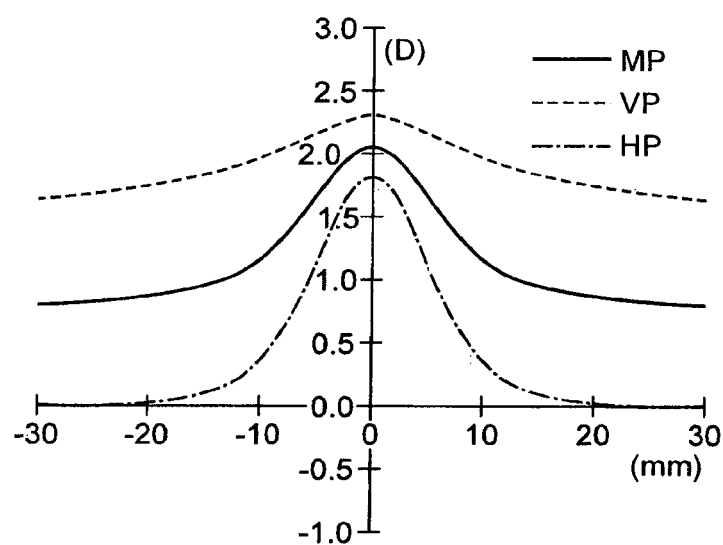
FIG. 9D: shows a schematic overview of a transmitted power change on horizontal cross section (y=−14.0 mm) corresponding to the embodiment 2.

FIG. 9C and FIG. 9D show a schematic overview of a transmitted power change on horizontal cross sections at y=–4.0 mm in FIG. 9C and y=–14.0 mm in FIG. 9D respectively. Vertical axis shows power (D) and horizontal axis shows a position (mm) in x direction. Y=–4.0 mm is set as representative of the intermediate vision region and y=–14.0 mm is set as representative of the near vision region respectively. FIG. 9D shows that an amount of vertical power is higher than an amount of horizontal power at least one point of the near vision region.

Figure 10A:
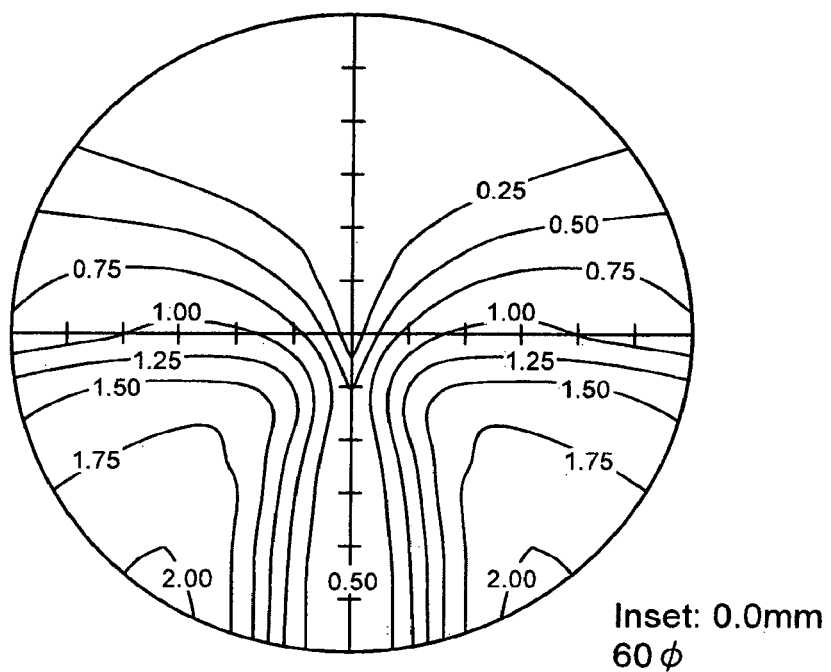
FIG. 10A: shows a transmitted inherent astigmatism map corresponding to the embodiment 2.

FIG. 10A shows a transmitted inherent astigmatism map corresponding to the embodiment 2. Diameter of the map is 60 mm and the inset is 0.0 mm. Prescription data is S +0.00 ADD 2.00.

Figure 10B:
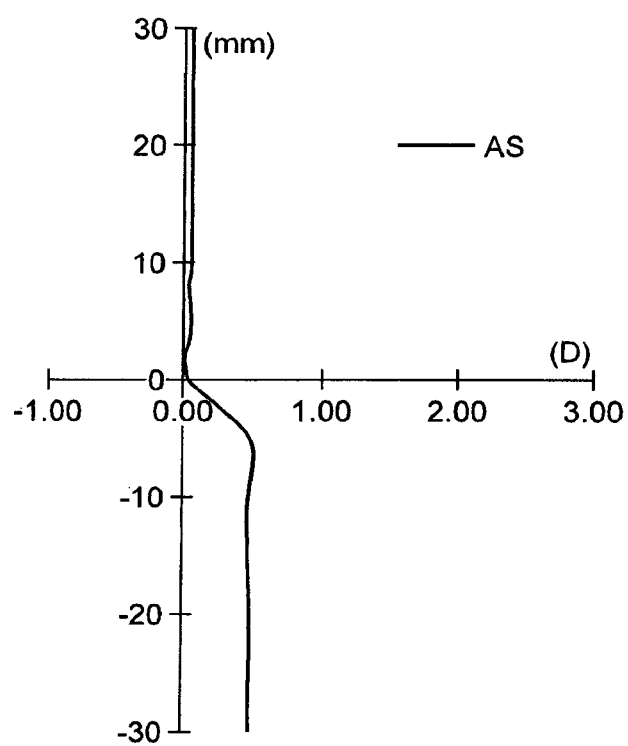
FIG. 10B: shows a transmitted inherent astigmatism change along the meridian corresponding to the embodiment 2.

FIG. 10B shows a transmitted inherent astigmatism change along the meridian corresponding to the embodiment 2. Vertical axis shows a position (mm) in y direction and horizontal axis shows a transmitted inherent astigmatism (D). FIG. 10B also shows a predetermined amount of extra astigmatism of 0.50D is intentionally added along the meridian in the intermediate vision region and the near vision region in comparison to FIG. 9B. The transmission performance parameter corresponding to a sum of the prescribed astigmatism included in the prescription data and of a predetermined amount of extra astigmatism is 0.50D.

Figure 10C:
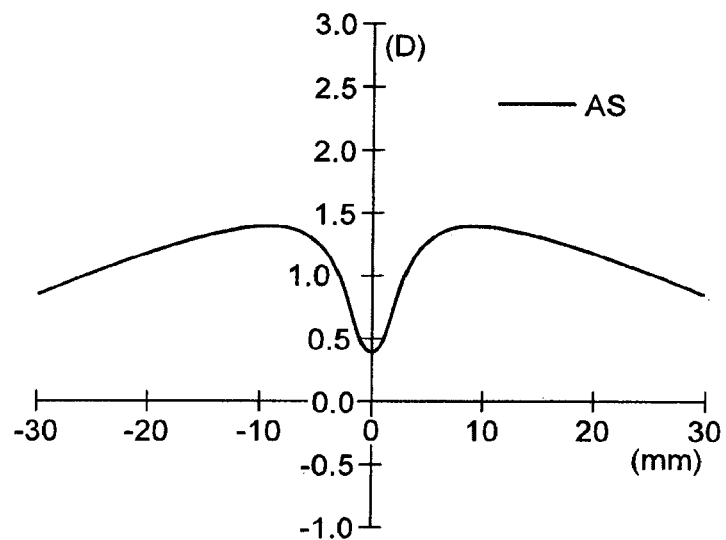
FIG. 10C: shows a schematic overview of a transmitted inherent astigmatism change on horizontal cross section (y=−4.0 mm) corresponding to the embodiment 2.
Figure 10D:
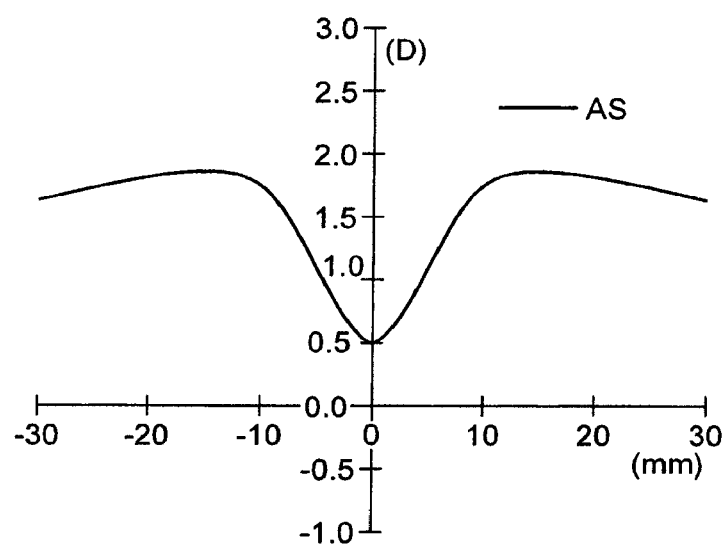
FIG. 10D: shows a schematic overview of a transmitted inherent astigmatism change on horizontal cross section (y=−14.0 mm) corresponding to the embodiment 2.

FIG. 10C and FIG. 10D show a schematic overview of a transmitted inherent astigmatism change on horizontal cross section at y=–4.0 mm in FIG. 10C and y=–14.0 mm in FIG. 10D respectively. Vertical axis shows a transmitted inherent astigmatism (D) and horizontal axis shows a position (mm) in x direction. Y=–4.0 mm is set as representative of the intermediate vision region and y=–14.0 mm is set as representative of the near vision region respectively.

In FIG. 10C and FIG. 10D, the extra astigmatism of around 0.50D is added along the meridian. At y=–14.0 mm, where a near point (NP) in the near vision region is set, the extra astigmatism reaches 0.50D.

Description of Embodiment 2

The embodiment 2 shows that the extra astigmatism is added such that it is produced on the eye and in correspondence of the near and intermediate vision regions. Further, in one embodiment, the amount of vertical power is higher than the amount of horizontal power in correspondence of at least one point of the near vision region.

In other words, the extra astigmatism is added such that the amount of vertical power is higher than the amount of horizontal power so that the extra astigmatism may be obtained on the eye. The vertical and horizontal powers may be those perceived or produced on the eye, i.e. the transmitted vertical power and transmitted horizontal power.

More in general, the vertical and horizontal powers are two power components when a plurality larger than two components is present. Also, horizontal and vertical is not limited to a specific reference system, as long as there are two components on the basis of which inherent astigmatism can be described. A widening of the horizontal width can thereby be obtained.

The horizontal width is a width of an area where stable and sufficient mean power for a certain visual distance can be obtained. In other words, the horizontal width is a horizontal distance between intersection points of a mean power threshold contour line in the mean power map at a certain position in the near vision region. The horizontal width is parallel to the line which through two engraving marks on the lens.

The arrow "A" and arrow "B" are used for reference of the horizontal width in FIG. 9A, wherein the threshold is represented by the contour line for 1.00D and delimits a corresponding area. The delimited area has a width that is in relationship to the extra astigmatism, such that it can be said that the extra astigmatism can be used to control the width of or the expansion of such area.

In the embodiment 2, the extra astigmatism corresponds to the horizontal width of a near vision region having a mean power equal to or above a mean power threshold.

Optionally in the embodiment 2, the extra astigmatism corresponds to a widening (or expansion) of the horizontal width. The widened horizontal width is a horizontal width in a near vision region being wider than a horizontal width corresponding to a zero extra astigmatism.

FIG. 9s shows an example where the extra astigmatism is added in correspondence of the near vision region and the intermediate vision region, and an amount of vertical power is higher than an amount of horizontal power. In this case, the extra astigmatism may be caused at 0.50D so that the power in the vertical direction is higher than the power in the horizontal direction along the meridian in the intermediate vision region and in a near vision region.

The extra astigmatism of 0.50D is added in the intermediate vision region and in the near vision region by reducing the horizontal power by 0.25D and by increasing the vertical power by 0.25D while mean power maintains.

By providing the extra astigmatism may be caused with combination of higher vertical power and lower horizontal power, a power change in the vicinity of the meridian becomes gradual, and the width of horizontal power becomes wider accordingly. Because a horizontal power in peripheral areas on the progressive addition lens is maintained in order to connect the distance vision region and the corridor smoothly.

(Comparison Between Conventional Design and Embodiment 2 as the State of Target Distribution: Horizontal Width)

The conventional design using conventional transmission-based design (FIG. 5A) and the embodiment 2 (FIG. 9A) is compared in transmitted mean power maps. These maps are used as target distributions for the transmitted mean power that are set as a reference when producing actual surfaces of finally obtained lens.

FIG. 5A and FIG. 9A show a comparison for transmitted inherent mean power maps between a conventional design (FIG. 5A) and the embodiment 2 (FIG. 9A). The comparison shows that the horizontal width of the near vision region is expanded. (Mean power is on and over 1.00D, see also the arrows "A" and "B" on the transmitted inherent mean power map.)

The horizontal width by image measurement in the transmitted inherent mean power map of the embodiment 2 are as follows. This is highlighted by the arrows in the transmitted inherent mean power maps. Arrow "A" at the y=−14 mm in the conventional design (FIG. 5A) and the embodiment 2 (FIG. 9A) are 20.32 mm and 27.10 mm respectively. Arrow "B" at the y=−20 mm in the conventional design (FIG. 5A) and the embodiment 2 (FIG. 9A) are 26.61 mm and 34.84 mm respectively. It can be seen that such width has expanded, i.e. it is wider or larger, for lenses according to this embodiment.

(Comparison Between Conventional Design and Embodiment 2 as the State of Finally Obtained Lens: Horizontal Width)

After the target distribution is determined, an outer surface and inner surface are designed so that a target distribution in transmission is actually obtained. (See the step S102 of FIG. 4 or the step S102A of FIG. 25)

Figure 14A:
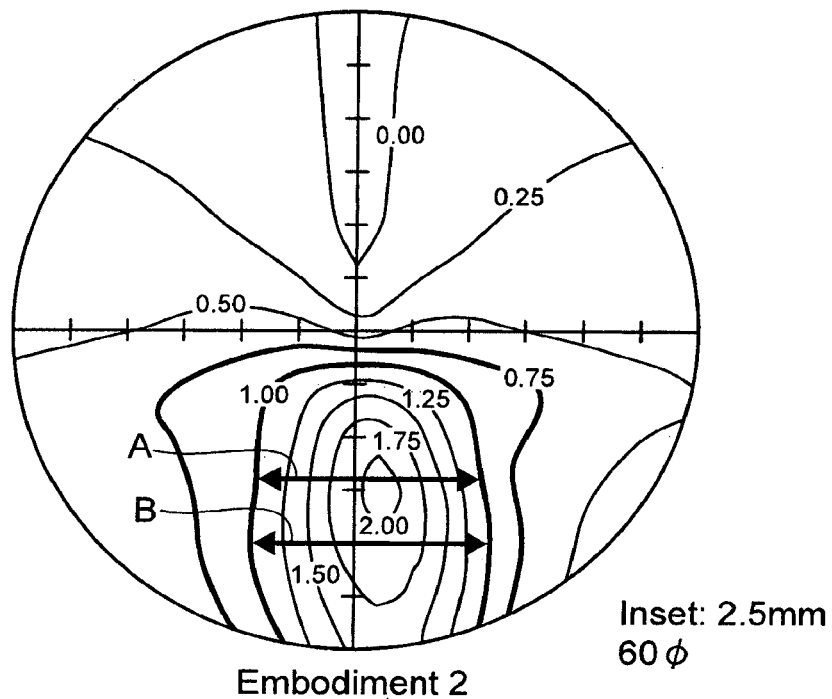
FIG. 14A and FIG. 14B: show a comparison of finally obtained transmitted mean power maps between the embodiment 2 and a conventional design.
Figure 14B:
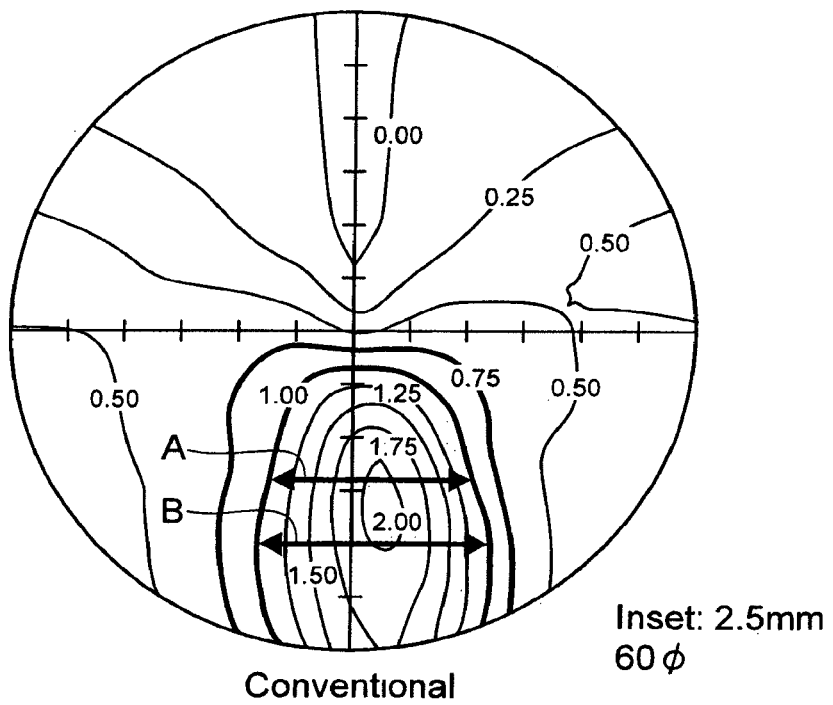

FIG. 14A and FIG. 14B show finally obtained transmitted mean power maps of further comparisons between surfaces exhibiting mean power values in a lens according to the embodiment 2 of the present invention (FIG. 14A) and in a conventional progressive addition lens (FIG. 14B).

Herein, processes that finally obtained transmitted inherent astigmatism maps is provided is followed referring FIG. 25.

First, parameters suitable for the eye glasses specifications and wearers are obtained. For instance, prescription data. The prescription data is the same for both conventional and the embodiment of the present invention cases, and in particular with S +0.00D ADD 2.00. (See the step S101A in FIG. 25)

Next, a base design may be designed newly or selected from arbitral existing design line up of progressive addition lenses. Here we use sample design A as the base design. (See a step S101B in FIG. 25) Sample design A's corridor length is 18 mm as lens design, inner surface progressive addition lens as surface structure, inset is 2.5 mm, and refractive index equal to 1.60. The base design is common for both conventional and the embodiment of the present invention.

The base design is designed or selected, though similar results would be obtained with other designs available in the industry. The base design for the present embodiment can be obtained for instance as in the conventional art.

Next, the target distribution is determined. (See a step S101C in FIG. 25) For the embodiment 2, the amount of extra astigmatism is set at 0.50D along the meridian where the vertical power is higher than the horizontal power. (See a step S101E in FIG. 25). The amount of extra astigmatism and relationship between vertical power and horizontal power can be set preferably by the lens manufacturer, but may be set also by or together with the optician. While, the target distribution of conventional design, it is as same as base design, because of zero extra astigmatism.

Then, an outer surface and inner surface are designed so that a power distribution after light transmitted these two surfaces will match the target distribution in transmission (See a step S102A in FIG. 25). In this embodiment, the inner surface is the progressive surface, and the inner surface side has been designed optimally (the so-called aspheric correction has been performed; however, other techniques would lead to similar results).

An outer surface and inner surface are designed so that the target distribution in transmission is actually obtained. In other word, the target distribution can be said to correspond to the determined transmission performance parameters. The effects above described can be recognized also from a comparison between FIG. 14A (embodiment 2) and FIG. 14B (conventional design).

Parameters for transmission calculation are, for instance, the corneal to vertex distance (CVD) is 12.0 mm, vertex to center of rotation of the eye is 25.0 mm, pantoscopic angle is 10.0 degree, pupil distance (PD) is 64 mm, and frame face form angle is 0.0 degree.

The example of these figures of parameters is based on the transmission-based design above discussed; while this is preferable, similar results can be obtained with other methods as long as the extra astigmatism is intentionally added so as to have the extra astigmatism provided on the eye.

FIG. 14A and FIG. 14B show a comparison of finally obtained transmitted mean power maps between a conventional design (FIG. 14B) and the embodiment 2 (FIG. 14A). The comparison shows that the horizontal width of the near vision region is expanded.

The horizontal widths shown in the arrows "A" at y=−14.0 mm (representative of the near vision region) between the embodiment 2 and the conventional design are 20.32 mm and 17.90 mm respectively. The horizontal widths shown in the arrows B at y=−20.0 mm (representative of lower position of the near vision region) between the embodiment 2 and the conventional design are 20.81 mm and 20.32 mm respectively. The figures of the widths are based on image measurement of the transmitted inherent mean power maps.

The embodiment 2 has another effect which relates to reduction of skew distortion.

(Comparison Between Conventional Design and Embodiment 2 as the State of Target Distribution: Skew Distortion)

Figure 11A:
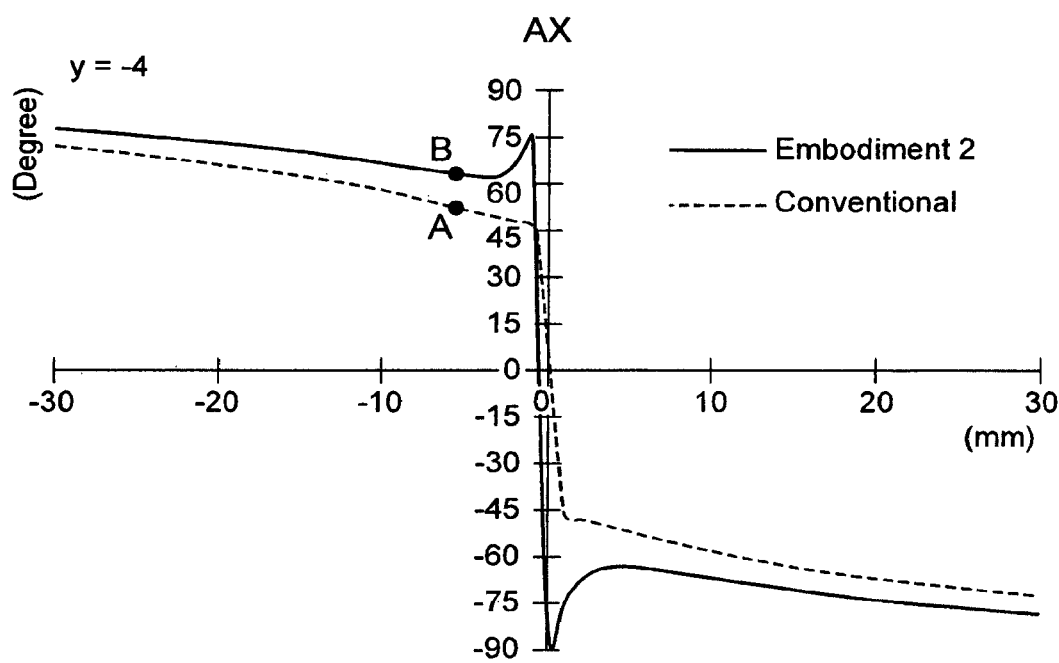
FIG. 11A: shows a comparison between the embodiment 2 and conventional design in behavior of cylindrical axis on horizontal cross section (y=−4.0 mm).
Figure 11B:
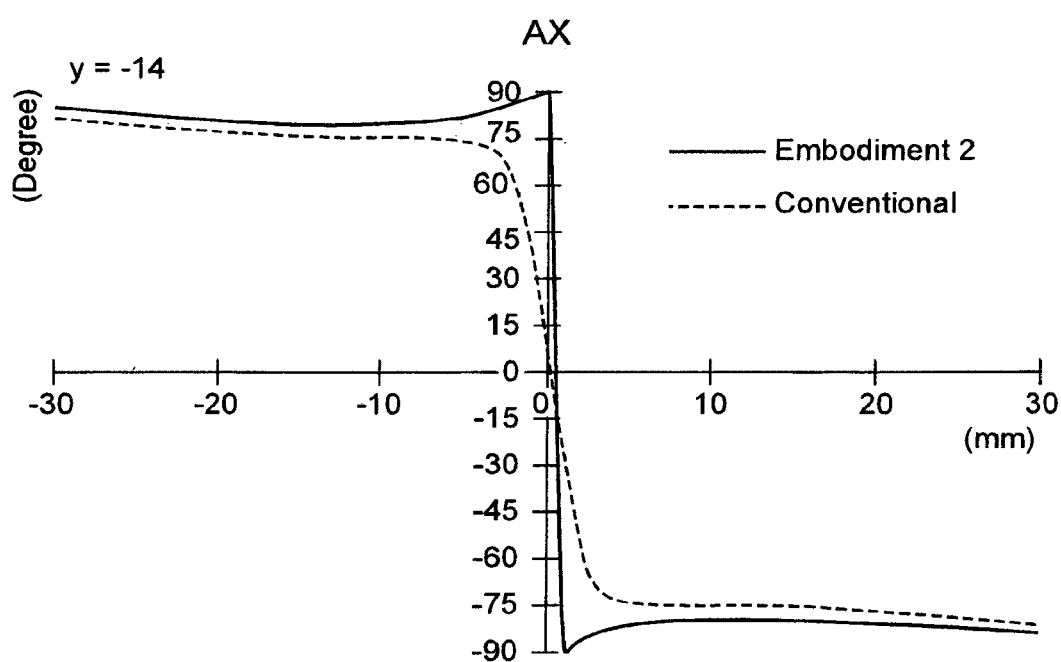
FIG. 11B: shows a comparison between the embodiment 2 and a conventional design in behavior of cylindrical axis on horizontal cross section (y=−14.0 mm).

FIG. 11A and FIG. 11B show a comparison between the embodiment 2 and conventional design in behavior of cylindrical axis on horizontal cross sections at y=−4.0 mm in FIG. 11A and y=−14.0 mm in FIG. 11B respectively. Vertical axis shows cylindrical axis, AX (degree) and horizontal axis shows a position (mm) in x direction. Y=−4.0 mm is set as representative of the intermediate vision region and y=−14.0 mm is set as representative of the near vision region respectively.

When comparing dotted line of conventional design (zero extra astigmatism case) and solid line of applying extra astigmatism case, in the latter case, cylindrical axis changes from oblique direction to vertical direction. For example, 45 degree to 90 degree direction. The more cylindrical axis approaches 90 degree, perception of skew distortion decreases.

FIG. 12A and FIG. 12B which relate to FIG. 11s are used for visual understanding for effect of skew distortion reduction with four-sided shape which represents image figures of difference in rectangle shape perception. When comparing cylindrical axis value at (x, y)=(−5.0, −4.0) between the embodiment 2 and the conventional design, Ax is 62 degree in the embodiment 2 at point B and Ax is 51 degree in the conventional design at point A in FIG. 11A. This means cylindrical axis changes toward 90 degree direction by applying the extra astigmatism. Four-sided shape in FIG. 12A comes closer rectangle shape shown in FIG. 12B.

(Comparison Between Conventional Design and Embodiment 2 as the State of Finally Obtained Lens: Skew Distortion)

Next, in the following, comparison between the conventional design and the embodiment 2 in behavior of cylindrical axis on horizontal cross sections as the state of finally obtained lens.

Figure 15A:
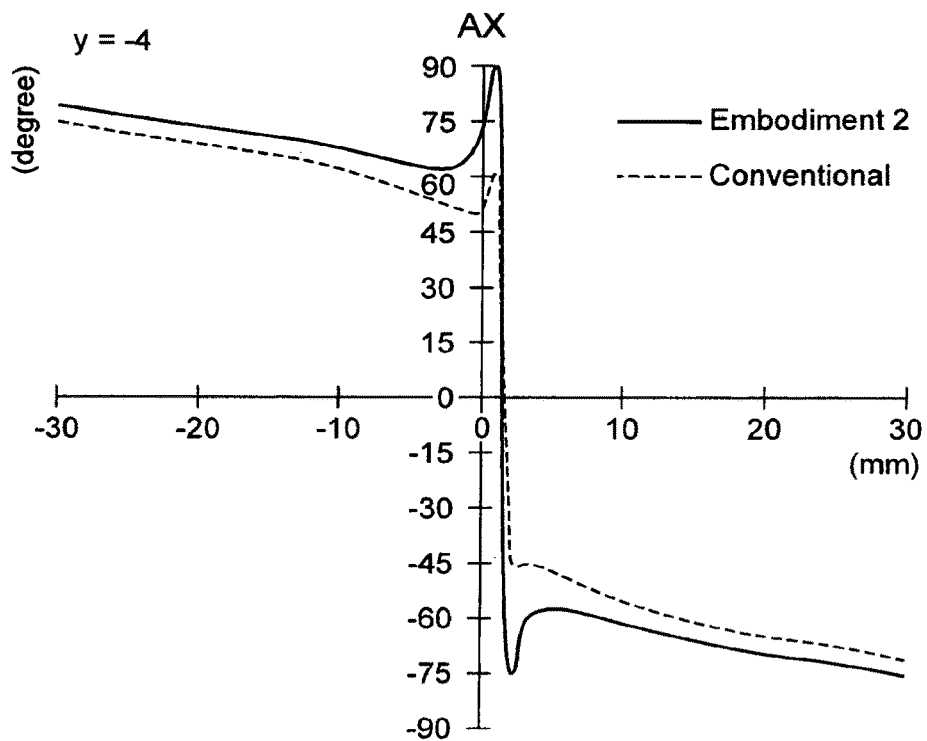
FIG. 15A: shows a comparison between the embodiment 2 and a conventional design in behavior of cylindrical axis on horizontal cross section (y=−4.0 mm) in the transmitted state of finally obtained lens.
Figure 15B:
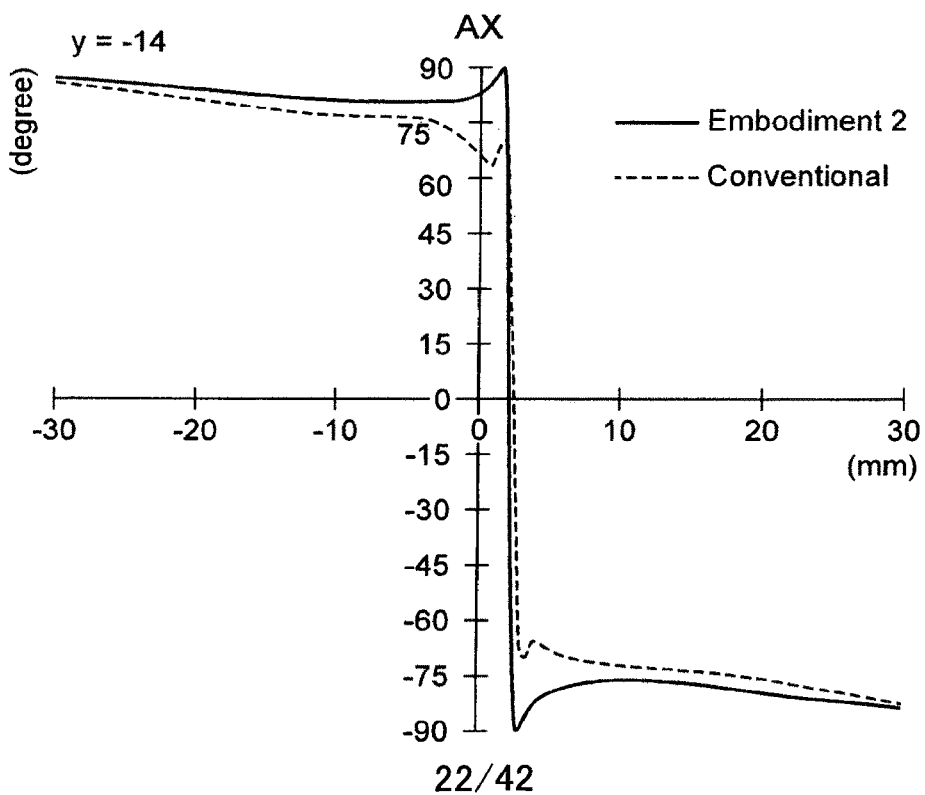
FIG. 15B: shows a comparison between the embodiment 2 and conventional design in behavior of cylindrical axis on horizontal cross section (y=−14.0 mm) in the transmitted state of finally obtained lens.

FIG. 15A and FIG. 15B indicate behavior of cylindrical axis on horizontal cross section in the intermediate vision region in the transmitted state of finally obtained lens, at y=−4.0 mm (representative of the intermediate vision region, FIG. 15A), and the near vision region, at y=−14.0 mm (representative of the near vision region, FIG. 15B) respectively. The horizontal axis of FIG. 15A and FIG. 15B represents horizontal position x (mm) and the vertical axis represent cylindrical axis, Ax (degree). The embodiment 2 is shown in solid line and the conventional design is shown in dotted line.

Conditions for calculation for transmission are same as embodiment 1. A base design is adopted as sample design A. Sample design A's corridor length is 18 mm as lens design, inner surface progressive addition lens as surface structure, inset is 2.5 mm, and refractive index equal to 1.60. Parameters for transmission calculation are, for instance, the corneal to vertex distance (CVD) is 12.0 mm, vertex to center of rotation of the eye is 25.0 mm, pantoscopic angle is 10 degree, pupil distance (PD) is 64 mm, and frame face form angle is 0.0 degree.

In FIG. 15A and FIG. 15B, it can be seen that the skew distortion decreases. In particular, when comparing to a conventional design lens, it can be seen that the curves are moved towards the 90° direction, thus reducing or cancelling the skew distortion.

Embodiment 3

According to an embodiment 3 of the present invention, the amount of extra astigmatism is added in correspondence of (at least one point of) a meridian and an amount of vertical power is different from an amount of horizontal power along the meridian.

The meridian is a meridian line of the lens along which a spherical power increases (or curvature gradually changes) in correspondence of a direction towards the bottom of the progressive addition lens.

Embodiment 3 shows progressive addition lens with shorter corridor length than that of embodiment 1 and embodiment 2. The corridor length of embodiment 3 is 10 mm, while that of embodiment land embodiment 2 are 18 mm.

The shorter the corridor length, the quicker the power changes along the meridian. Therefore, the shorter corridor length makes inherent astigmatism and skew distortion higher. Such large astigmatism and skew distortion cause uncomfortable wearing feeling to wearers.

However, the embodiment 3 can be applied not only shorter corridor length but for common corridor length, so, is not limited to shorter corridor length.

Figure 16A:
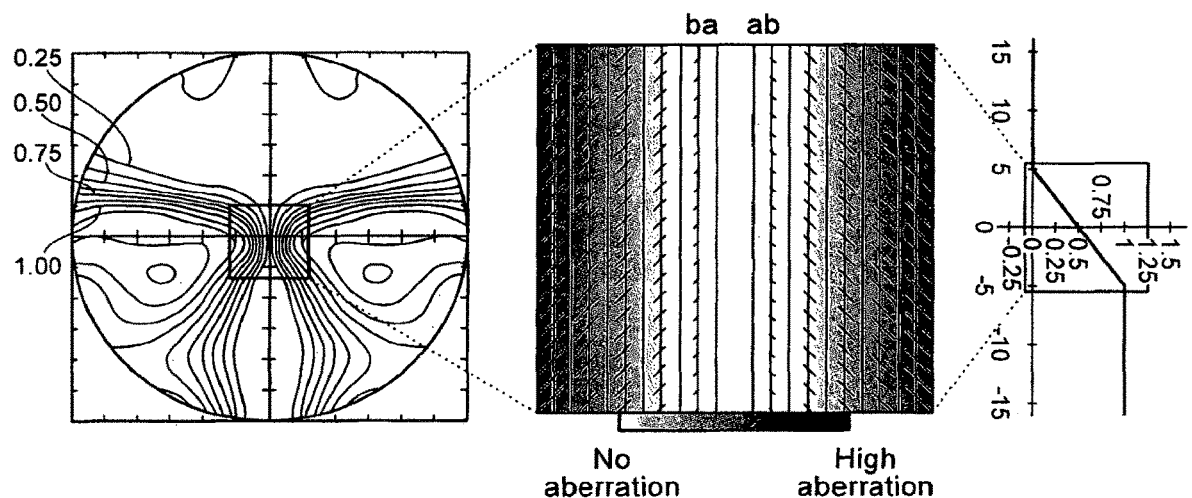
FIG. 16A: shows a transmitted inherent astigmatism map corresponding to a conventional progressive addition lens

FIG. 16A shows a transmitted inherent astigmatism map corresponding to a conventional progressive addition lens in the leftmost. In the middle figure of FIG. 16A, it shows an enlarged area in the vicinity of the meridian in an intermediate vision region. In the rightmost figure of FIG. 16A, it shows normalized addition power curve.

Figure 16B:
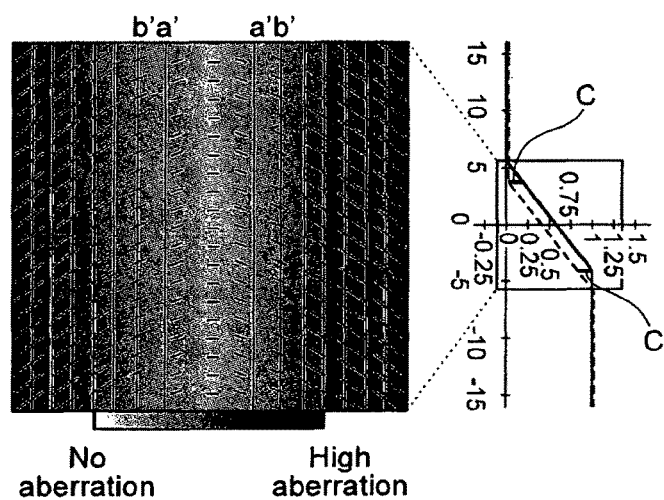
FIG. 16B to FIG. 16D: show how to provide extra astigmatism with the intermediate vision region of the progressive addition lens as the embodiment 3.
Figure 16C:
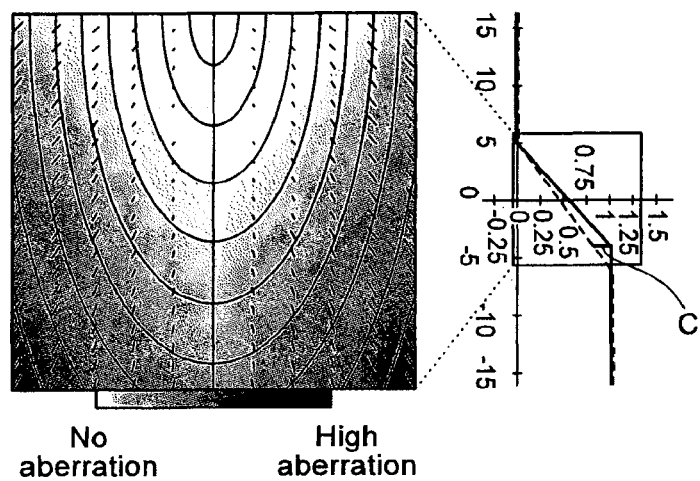
Figure 16D:
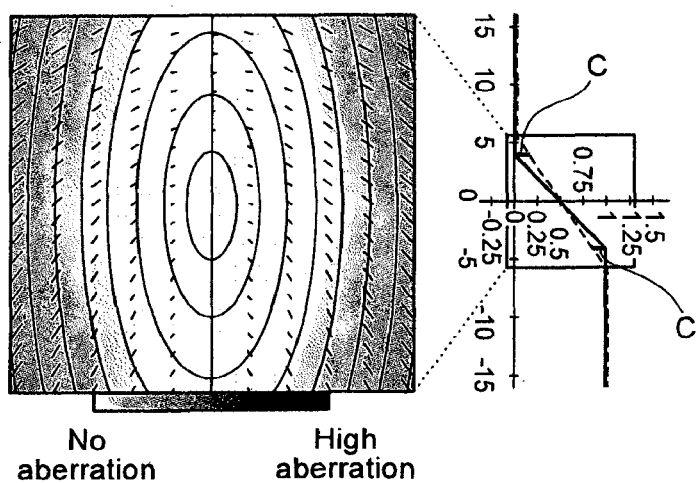

FIG. 16B to FIG. 16D show how to provide extra astigmatism with the intermediate vision region of the progressive addition lens as the embodiment 3.

The leftmost figure of FIG. 16A shows an transmitted inherent astigmatism map. Diameter of the transmitted inherent astigmatism map is 60 mm and the inset is 0.0 mm. Comparing to the embodiment 1 and the embodiment 2 with a common corridor length such as 18 mm, the density of contour lines of the inherent astigmatism is very high. This causes uncomfortable visual feeling to wearers.

One of the solutions for obtaining a comfortable wearing feeling is to increase the interval between contour lines, that is, decrease the change rate of astigmatic aberration. In the leftmost figure of FIG. 16A, there are two areas with high density of contour lines of the inherent astigmatism. One is the area where the astigmatic aberration is dense around the boundary between the distance vision region and the intermediate vision region. The other is the area where the astigmatic aberration is dense in the horizontal direction in the vicinity of the meridian in the intermediate vision region In order to reduce the density of contour lines of the inherent astigmatism for the area where the astigmatic aberration is dense in vertical direction, it can be supported by using the conventional design method.

However, for the area where the astigmatic aberration is dense in horizontal direction, there are no effective measures in the existing design method. This is because, in the conventional design method, a meridian is designed as a group of umbilic points. This means that Minkwitz's Law governs. According to Minkwitz's Law, the inherent astigmatism caused around a meridian is two times the increase rate of the addition, therefore, the shorter the corridor length, the higher the inherent astigmatism.

In order to avoid this limitation, we considered to make the meridian in the intermediate vision region have a shape which is not umbilical. The concrete examples are shown in FIG. 16B to FIG. 16D.

In the middle figure of FIG. 16A, it is shown an enlarged area in the vicinity of the meridian in an intermediate vision region. The size of the enlarged area is 10 mm by 10 mm square, for instance. In this case, a value of 10 mm is adopted refer to the corridor length, however, the value does not necessarily have to be matched. The middle figure of FIG. 16A shows there are very high inherent astigmatism in the vicinity of the meridian.

The middle figure of FIG. 16A shows schematic contour lines of inherent astigmatism which are drawn based on actual contour lines in the leftmost figure of FIG. 16A. (here and after, these schematic contour lines are also called "contour lines".) The contour lines in the middle figure of FIG. 16A are calculated by mathematical function that is effective locally near the meridian. The mathematical function follows Minkwitz's Law, if the meridian is umbilical.

In the middle figure of FIG. 16A, the amount of inherent astigmatism is expressed in gray scale. The more shades of gray is light, the lower value of inherent astigmatism becomes. The more shades of gray is dark, the higher value of inherent astigmatism becomes. The minimum amount of inherent astigmatism is 0.00D and the maximum amount of inherent astigmatism is 4.00D in this gray scale.

In the middle figure of FIG. 16A, a vertical central area along the midline of the enlarged area is lightest in gray scale, since the meridian passes on the midline. That is, there is very low, almost no, inherent astigmatism in the vertical central area, because the meridian is umbilical due to conventional deign. In contrast, at the left and right ends of the enlarged area, shades of gray is very dark. Not only the left and right ends area, but also both sides area in the vicinity of the meridian become rapidly dark. That is, the values of astigmatic aberration in the intermediate vision region of the progressive addition lens with shorter corridor length are generally high.

In the rightmost figure of FIG. 16A, it shows a normalized addition power curve. The vertical axis shows a distance in y direction (mm) and the horizontal axis shows the normalized addition power (D). Since addition power is normalized, if an actual addition power is 2.00D, the value on the horizontal axis is doubled and is an actual addition power is 3.00D, it can be tripled.

According to a line of the normalized addition power in FIG. 5B, corridor length shows 10 mm, from the starting point of progression at y=5.0 mm to the end of progression at y=−5.0 mm where the mean power reaches normalized addition power of 1.00D.

The solid line in the right hand figure of FIG. 16A shows a mean power which is an average of a vertical power and a horizontal power. In this case, since a difference of the vertical power and the horizontal power is zero, lines for the vertical power and the horizontal power is overlapped.

FIG. 16 B to FIG. 16D show the transmitted inherent astigmatism maps inside the enlarged area in which an extra astigmatism of 0.25D is applied along the meridian while mean power is maintained respectively. A shape of the enlarged area, where an extra astigmatism is applied, is not limited to a square. Rectangle, circle, or ellipse shape may be also possible. The number of the area where the extra astigmatism applied is not limited to one. Two or more areas may possible.

Figures in right hand side of FIG. 16 B to FIG. 16D are normalized addition power curves. A solid line shows a vertical power change and a dotted line shows horizontal power change.

In the case of a conventional progressive addition lens, a meridian is a group of umbilic points, therefore, theoretically, there is no astigmatic aberration in this part (central part of the middle figure of in FIG. 16A) and the astigmatic aberration increases when moving towards the periphery.

Small strokes shown in FIG. 16A to FIG. 16D indicate skew (inherent astigmatism in oblique direction). More in detail, the length of the stroke indicates strength of skew (the amount of cylindrical power) at a certain point, and inclination indicates cylindrical axis.

The amount of extra astigmatism is added in correspondence of the intermediate vision region along the meridian. The meridian line is not necessarily vertical, and can be in fact a line bending towards the nose when moving towards the bottom of the lens.

Case 1 of the Embodiment 3

In a first case of the embodiment 3 of the present invention shown in FIG. 16B, the amount of extra astigmatism is constant in correspondence of (at least one point of) the intermediate vision region along the meridian.

A predetermined amount of extra astigmatism is 0.25D in the basis of normalized notation. Refer to a power difference shown in a length of line segment with a letter "c" which corresponds 0.25D. The length of line segment corresponds a difference between vertical power and horizontal power. The transmission performance parameter corresponding to a sum of the prescribed astigmatism included in the prescription data and of the predetermined amount of extra astigmatism is 0.25D in the basis of normalization notation.

In one example of the embodiment 3 and/or its first case (FIG. 16B), the amount of extra astigmatism is constant in correspondence of the meridian in the intermediate vision region. While superfluous, it is noted that the intermediate vision region has the usual meaning given in progressive addition lenses, as also discussed further above also in the introductory part.

In one example of the embodiment 3 and/or its first case (FIG. 16B), the amount of extra astigmatism corresponds to an inherent astigmatism change rate and preferably (but not necessarily) of a skew distortion. The inherent astigmatism change rate is a rate at which inherent astigmatism changes for instance according to a predetermined function of at least one space variable (e.g. distance on one surface from a reference point). In this example, the amount of extra astigmatism is calculated on the basis of an inherent astigmatism change rate.

According to another example of the first case of the embodiment 3 (FIG. 16A), the amount of extra astigmatism corresponds to a reduction of the inherent astigmatism change rate and preferably (but not necessarily) of the skew distortion. The reduced inherent astigmatism change rate is an inherent astigmatism change rate being smaller than an inherent astigmatism change rate corresponding to a zero extra astigmatism.

In this case, the maximum value and minimum value of the inherent astigmatism come closer; therefore, the density of the contour of the inherent astigmatism becomes moderate. To what extent the density of the contour becomes moderate can be compared between the middle figure of FIG. 16A and central part in FIG. 16B. The interval "a-a" of the contour lines in FIG. 16A expands to "a'-a'" in FIG. 16B. Also, the intervals "a(b)-b(a)" and "a'(b')-b'(a')" of the contour lines, the first and second contour lines next to each other from the central part to the peripheral, also expand.

FIG. 16B shows the density of the inherent astigmatism is decreasing in the vicinity of the meridian and its surroundings. Since the rapid change of the inherent astigmatism (astigmatic aberration) is reduced, the wearing feeling is improved.

Namely, the amount of extra astigmatism is calculated on the basis of a reduction of the inherent astigmatism change rate and preferably of the skew distortion. In other words, it can be said that the amount of extra astigmatism is used to control the reduction of the inherent astigmatism change rate.

In other words, in the first case of the embodiment 3 of the present invention, as shown in FIG. 16B, a fixed amount of extra astigmatism is added along the meridian in the intermediate vision region, namely the amount of vertical power and the amount of horizontal power along the meridian in the intermediate vision region are different (do not overlap as it can be seen in the figure). This may result in a reduction of inherent astigmatism change rate.

Thus, by varying the extra astigmatism the reduction of the inherent astigmatism can be controlled so that they fall within certain values. In other words, the extra astigmatism controls or is in association with the reduction of the inherent astigmatism (commonly with or similarly to other embodiments, wherein the extra astigmatism is associated or used to control characteristic of the lens). According to the case herein described, and shown in FIG. 16B, a reduction of inherent astigmatism change rate can be achieved.

However, the maximum amount of the inherent astigmatism does not change in this case. The decrease of the inherent astigmatism in oblique direction produced (the oblique line or stroke in the figure) is not so sufficiently; therefore, distortion is not improved so much.

Case2 of the Embodiment 3

In a second case of the embodiment 3 of the present invention shown in FIG. 16C, the amount of extra astigmatism is monotonically increasing in correspondence of the meridian from the top to the bottom of the enlarged area of the meridian in the intermediate vision region.

A predetermined amount of extra astigmatism is 0.25D in the basis of normalized notation. Refer to a power difference shown in a length of line segment with a letter "c" which corresponds 0.25D. The transmission performance parameter corresponding to a sum of the prescribed astigmatism included in the prescription data and of the predetermined amount of extra astigmatism is 0.25D in the basis of normalization notation.

The second case of the embodiment 3 (FIG. 16C) improves the above mentioned remained problem of the first case of the embodiment 3.

In one example of the second case of the embodiment 3 (FIG. 16C), the amount of extra astigmatism corresponds to an inherent astigmatism change rate, an amount of inherent astigmatism, and preferably a skew distortion. Namely, the amount of extra astigmatism is calculated on the basis of at least one of an inherent astigmatism change rate, an amount of inherent astigmatism, and a skew distortion.

In other words, the amount of extra astigmatism is used to control values for at least one of an inherent astigmatism change rate, an inherent amount of astigmatism, and a skew distortion.

In another example of the second case of the embodiment 3 (FIG. 16C), the amount of extra astigmatism corresponds to a reduction of the inherent astigmatism change rate, of the maximum amount of inherent astigmatism, and preferably of the skew distortion. The reduced inherent astigmatism change rate is an inherent astigmatism change rate being smaller than an inherent astigmatism change rate corresponding to a zero extra astigmatism, and the reduced maximum amount of inherent astigmatism is the maximum amount of inherent astigmatism being smaller than a maximum amount of inherent astigmatism corresponding to a zero extra astigmatism.

Namely, the amount of extra astigmatism is calculated on the basis of a reduction of the inherent astigmatism change rate and of the maximum amount of inherent astigmatism, and the reduced skew distortion is a skew distortion being smaller than a skew distortion corresponding to a zero extra astigmatism. In other words, the amount of extra astigmatism is used to control values respectively for a reduction of the inherent astigmatism change rate and of the maximum amount of inherent astigmatism.

In other words, in the second case of the embodiment 3 of the present invention (FIG. 16C), a monotonically increasing amount of inherent astigmatism is added along the meridian in the intermediate vision region, i.e. the amount of vertical power and the amount of horizontal power along the meridian in the intermediate vision region increase at a different rate.

This difference, the monotonically increasing amount of extra astigmatism, generates inherent astigmatism in oblique direction in the direction orthogonal to currently existing inherent astigmatism in oblique direction around the intermediate vision region, as a result, the currently existing inherent astigmatism in oblique direction can be canceled.

Therefore, it is possible to reduce not only the rapid change of the inherent astigmatism, but also the skew distortion and the amount of the maximum inherent astigmatism.

The monotonically increasing amount of extra astigmatism results in a reduction of inherent astigmatism change rate, reduction of a skew distortion, and a reduction of maximum amount of inherent astigmatism. According to the case herein described, and shown in FIG. 16C, a reduction of inherent astigmatism change rate, a reduction of skew distortion, and a reduction of maximum amount of inherent astigmatism can be achieved.

The reduction of inherent astigmatism change rate can be shown in the fact that intervals of the contour lines are expanded overall in FIG. 16C comparing to those of FIG. 16A and FIG. 16B.

The reduction of skew distortion can be shown from the fact that lengths of the strokes are shorter and the inclination of the strokes are close to vertical in FIG. 16C than in FIG. 16A and FIG. 16 B.

The reduction of maximum amount of inherent astigmatism can be shown in the fact that the shades of gray of FIG. 16C are lighter in whole than that of FIG. 16A and FIG. 16B.

In FIG. 16C, a part where shade of gray is lightest, in other words, the part where the inherent astigmatism is lowest is at the center of the upper edge of the enlarged area, y=5.0 mm in the right hand figure of FIG. 16C. Here, the power difference between the horizontal direction and the vertical direction is almost zero.

Case 3 of the Embodiment 3

In a third case of the embodiment 3 of the present invention shown in FIG. 16D, the amount of extra astigmatism is monotonically decreasing in correspondence of the meridian from the top to the center of the enlarged area along the meridian and monotonically increasing from the center to the bottom of the enlarged area along the meridian. The enlarged area may be coincident with the intermediate vision region or may be at least a part of the intermediate vision region.

In this case, the center of the meridian corresponds to the center of the enlarged area. In general, the center of the meridian corresponds to the center of the lens.

The corridor length described in the enlarged area may seem to be shorter than that of zero extra astigmatism case, especially for length of the solid line.

In other words, in the third case of the embodiment 3 of the present invention (FIG. 16D), a monotonically decreasing and then monotonically increasing amount of inherent astigmatism is added along the meridian in the intermediate vision region, namely the amount of vertical power and the amount of horizontal power along the meridian in the intermediate vision region start increasing at different points and increase at a different rate.

According to the case herein described, and shown in FIG. 16D, a large low aberration area can be achieved. In fact, the part where shades of gray are lighter in gray scale in the map on FIG. 16D shows that most of the area around the center is characterized by low astigmatic aberration.

Optionally in the third case of the embodiment 3 of the present invention (FIG. 16D), the rate of at least one of the monotonically increasing and the monotonically decreasing (see above) is set to control the extent of the area with low aberration around a center of the lens. Thus, by varying the monotonic increase and/or decrease (i.e. the rate of the monotonic function) and/or the combination of both, it is possible to control how positioned the low-aberration area is.

This configuration can be useful for those wearers having small astigmatic tolerances, i.e. whose eye easily perceives difference of astigmatism from the one prescribed (e.g. a wearer being annoyed by an astigmatic tolerance of 0.5D, against a wearer being annoyed by an astigmatic tolerance of 1.0D).

In FIG. 16D, first, the extra astigmatism is decreased monotonously and then increased monotonously. The effect is similar as that of the second case, but the amount of extra astigmatism added can be halved; therefore, it is effective for a person whose allowable amount of extra astigmatism is small.

As shown in a length of upper line segment with a letter "c" and a length of lower line segment with a letter "c" in FIG. 16D respectively, the amount of extra astigmatism is smaller than that of FIG. 16B and FIG. 16C, since the lengths of line segments show approximately half value of 0.25D.

Therefore, a predetermined amount of extra astigmatism is 0.13D in the basis of normalization notation. The transmission performance parameter corresponding to a sum of the prescribed astigmatism included in the prescription data and of a predetermined amount of extra astigmatism is 0.13D in the basis of normalization notation.

The reduction of inherent astigmatism change rate can be shown in the fact that intervals of the contour lines are expanded overall in FIG. 16D comparing to those of FIG. 16A and FIG. 16B.

The reduction of skew distortion can be shown from the fact that lengths of the strokes are shorter and the inclination of the strokes are close to vertical in FIG. 16D than in FIG. 16A and FIG. 16 B.

The reduction of maximum amount of inherent astigmatism can be shown in the fact that the shades of gray of FIG. 16D are lighter in whole than that of FIG. 16A and FIG. 16B.

In FIG. 16D, a part where shades of gray are lightest, in other words, the part where the inherent astigmatism is lowest is at the center of the enlarged area, y=0.0 mm in the right hand figure of FIG. 16D. Here, the power difference between the horizontal direction and the vertical direction is almost zero.

Next, how to provide extra astigmatism to the enlarged area and its optical effects in the embodiment 3 are explained. Followings shown below are description of the enlarged area of the embodiment 3 (FIG. 16D) in mathematical expressions. These equations are only applied inside of the enlarged area, not for outside of the area.

$$f(x, y) = f_{prog}(x, y) + f_{comp}(x, y) \quad (1)$$

$$f_{comp}(x, y) = C_1(x^2 - (y - y_0)^2) + C_2(3x^2(y - y_0) - (y - y_0)^3) \quad (2)$$

In equation (1), f(x,y) expresses a shape data of a progressive surface of a progressive addition lens. Namely, a distribution of height data, "z value" or also called as "sag value" of the progressive surface.

The first item of the equation (1), f_prog (x,y), corresponds to an progressive surface before applying surface correction. The f_prog (x, y) corresponds to a middle figure of FIG. 16A, surface of the conventional design. The second item of the equation (1), f_comp, corresponds to a correction surface. The suffix "comp" stands for compensation. Therefore f(x,y) is sum of f_prog (x,y) and f_comp, and can be said as a final progressive surface obtained after correction.

For further explanation of f_comp, C1, C2, and y0 are constant coefficients. The y0 shows an amount of shift between an progressive surface and a correction surface in y direction. This amount of shift is related to which position of the progressive surface to place the origin of the correction surface. In this case, the correction surface is composited at a position lower by y0 than the progressive surface.

Next, the way of expand extra astigmatism to the out of the enlarged area, in other words, to a whole progressive surface, is explained. How to provide extra astigmatism is executed in such a manner similar to previous example of inside of the enlarged area, that is, a correction surface is added to an original progressive surface to be applied. Here, instead of equation (2), equation (3) in applied.

Mathematical expression of a shape data for the whole progressive surface is shown below. In equation (1), f(x,y) expresses a shape data of a progressive surface of a progressive addition lens. Namely, a distribution of height data, "z value" or also called as "sag value" of the progressive surface. The distribution of height data is, in other words, lens surface data corresponding to the determined transmission performance parameter.

The first half of the equation (3) is the same as the equation (2), and the equation (3) is multiplied by the exponential function as weight in the equation (2).

$$f(x, y) = f_{prog}(x, y) + f_{comp}(x, y) \quad (1)$$

$$f_{comp}(x, y) = [C_1(x^2 - (y - y_0)^2) + C_1(3x^2(y - y_0) - (y - y_0)^3)] \quad (3)$$
$$\exp\left(-\frac{x^2}{2\sigma_x}\right)\exp\left(-\frac{(y - y_1)^2}{2\sigma_y}\right)\frac{c}{1 + \exp(a(y - b))}$$

C1, C2, y0, σx, σy, a, b, and c are constant values.

Multiplying exponential function increases the degree of freedom of surface control. In this embodiment, the area mainly to be corrected is in the vicinity of the meridian in the intermediate vision region. Multiplying the exponential function makes correction effect be smaller as going toward the peripheral area of the progressive surface from the center part.

Figure 17A:
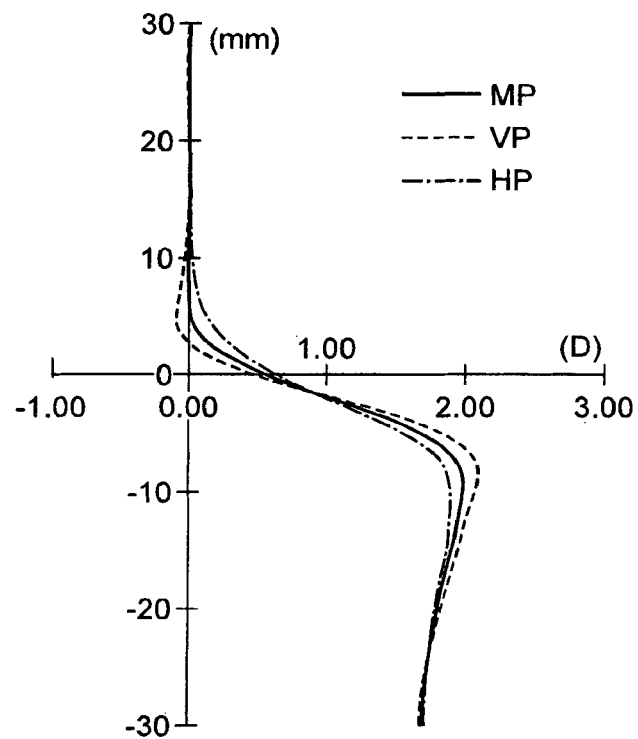
FIG. 17A: shows a transmitted power change along the meridian in vertical power, horizontal power, and mean power corresponding to the third case of the embodiment 3.
Figure 17B:
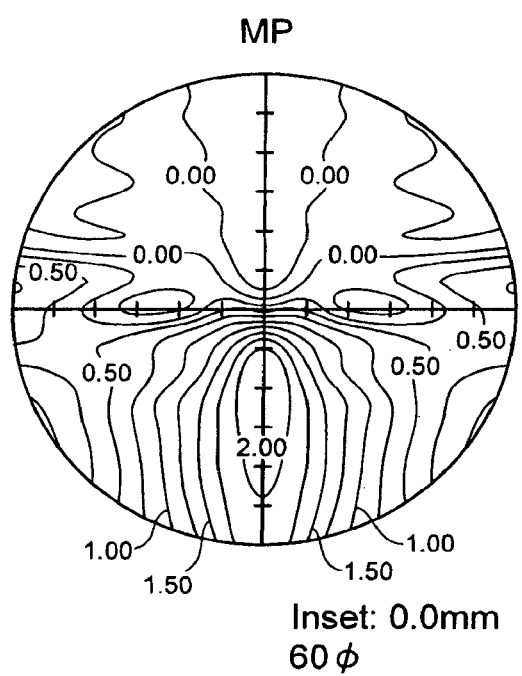
FIG. 17B: shows a finally obtained transmitted mean power map of the embodiment 3.
Figure 17C:
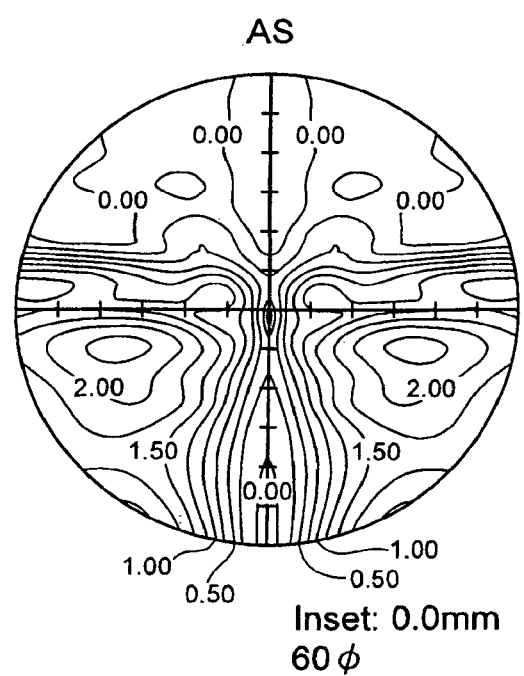
FIG. 17C: shows a finally obtained transmitted inherent astigmatism map of the embodiment 3.

FIG. 17A to FIG. 17C' are the result of designing by applying equation (1) and equation (3) to the third case of the embodiment 3 of the present invention (FIG. 16D). The prescription data is S +0.00D ADD 2.00D. (See the step S101A in FIG. 25) The amount of extra astigmatism is 0.30D, approximately half of 0.50D.

FIG. 17A shows a transmitted power change along the meridian in vertical power, horizontal power, and mean power corresponding to the third case of the embodiment 3.

Vertical axis shows a position (mm) in y direction and horizontal axis shows addition power, ADD (D). In FIG. 17A, a vertical power (VP) line is in dotted, a horizontal power (HP) line is in dashed, and a mean power (MP) line is in solid. According to the MP line in FIG. 17A, corridor length shows 12 mm, from the starting point of progression at y=4.0 mm to the end of progression at y=−8.0 mm where the mean power reaches prescribed addition power (ADD) of 2.00D.

The region where between the starting point and the endpoint in progression corresponds to the intermediate vision region. The region where above the starting point of progression corresponds to the distance vision region. The region where under the endpoint of progression corresponds to the near vision region.

In the area where y is positive, the amount of vertical power is lower than an amount of horizontal power and in the area where y is negative, the amount of vertical power is higher than an amount of horizontal power.

FIG. 17B and FIG. 17C show a finally obtained transmitted mean power map and a finally obtained transmitted inherent astigmatism of the embodiment 3. Diameter, of the maps is 60 mm and the inset is 0.0 mm.

Here we use sample design B as the base design. (See a step S101B in FIG. 25) Sample design B's corridor length is 12 mm as lens design, inner surface progressive addition lens as surface structure, inset is 0.0 mm, and refractive index equal to 1.60. Note that although we use corridor length of 10 mm in the first to the third cases of the embodiment 3 to explain how to provide extra astigmatism, here we use corridor length of 12 mm practically. Corridor length of 12 mm can be regard rather shorter than that of 18 mm.

Next, the target distribution is determined. (See a step S101C in FIG. 25) For the third case of the embodiment 3, the amount of extra astigmatism is set at 0.30D along the meridian monotonically decreasing and monotonically increasing. (See a step S101H in FIG. 25).

After the target distribution is determined, an outer surface and inner surface are designed so that the target distribution in transmission is actually obtained. (See the step S102 of FIG. 4 or the step S102A of FIG. 25.)

Parameters for equation (3) are; C1=−0.00012, C2=−0.000002, y0=−1.0, σx=4.0, σy=2.5, y1=1.0, a=0.0, b=0.0, c=2.0.

Parameters for transmission calculation are, for instance, the corneal to vertex distance (CVD) is 12.0 mm, vertex to center of rotation of the eye is 25.0 mm, pansophic angle is 10.0 degree, pupil distance (PD) is 64.0 mm, and frame face form angle is 0.0 degree.

In FIG. 17B, here focusing on a contour line of 1.00D. The behavior of a contour line of 1.00D as a reference has the same tendency as the embodiment 2 (FIG. 14A). Namely, when comparing between the conventional design and the embodiment 3 in horizontal width of contour line of mean power (MP) of 1.00D at y=0.0 mm (representative of the intermediate vision region), such horizontal width is wider than that of zero extra astigmatism case. (The figure of zero extra astigmatism case is omitted here.)

In FIG. 17C, here focusing on intervals of contour lines on the sides of the intermediate vision region. The intervals of contour lines on the sides of the intermediate vision region are expanded, when comparing to zero extra astigmatism case. In addition, the position of the maximum inherent astigmatism becomes far from the meridian toward the peripheral area of the lens, when comparing to zero extra astigmatism case.

Further to the above, in this embodiment, high astigmatism over 1.50D exists in the bottom half of the lens, in other words, under the line of y=0.0 mm, while in the result of zero extra astigmatism case, high inherent astigmatism over 2.00D exists in both the upper and lower areas across the line of y=0.0 mm and exists near to the intermediate vision region. (The figure of zero extra astigmatism case is omitted here.)

Conventionally, when corridor length becomes shorter, a high inherent astigmatism is caused due to rapid power change. Even in a case of shorter corridor length, FIG. 17B and FIG. 17C show that comfortable intermediate vision is achieved by applying the present invention.

Optionally in the present invention, the transmission astigmatic performance parameter disclosed herein comprises sagittal transmittance and tangential transmittance. The sagittal transmittance and tangential transmittance refer to at least one point on the lens.

Figure 18:
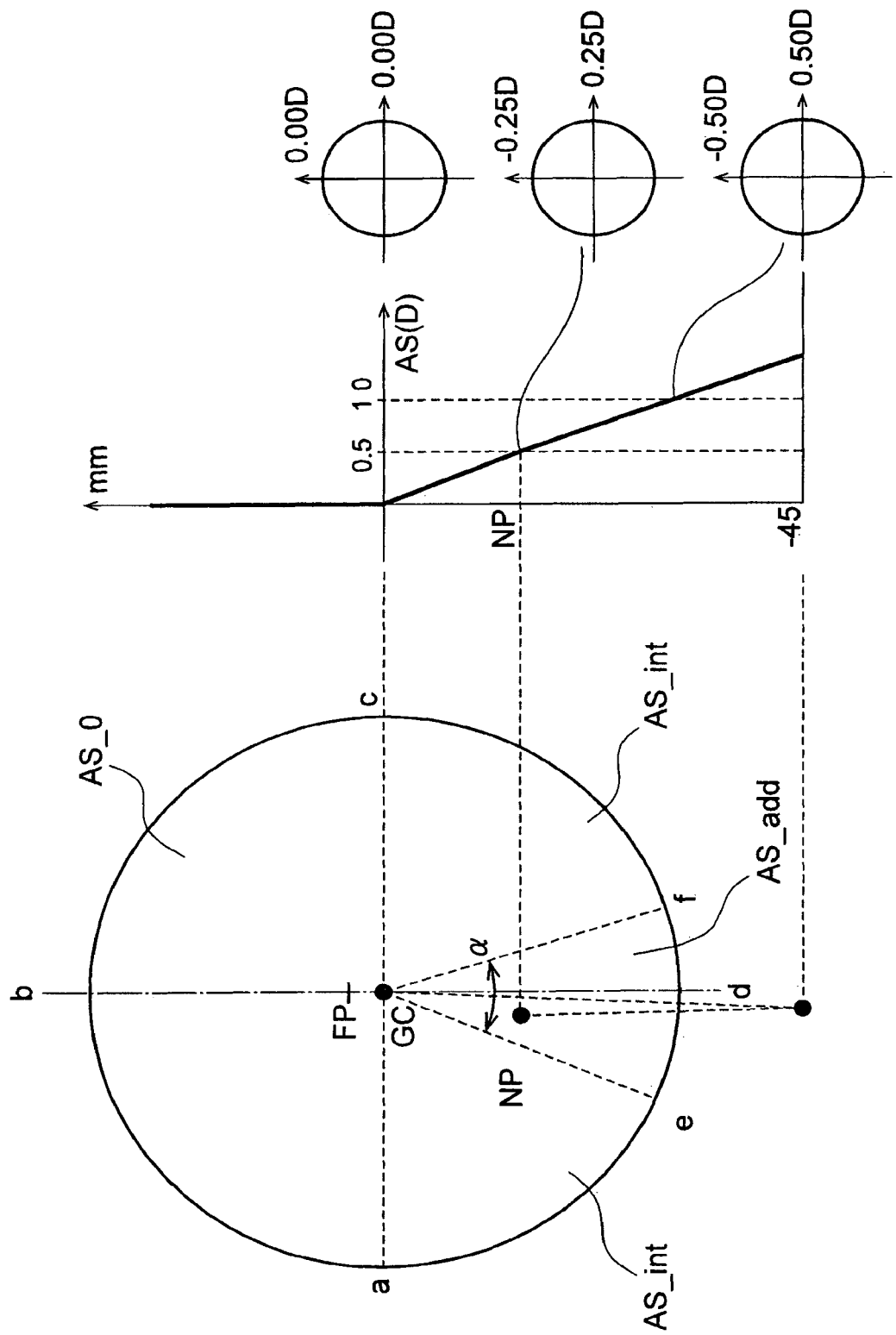
FIG. 18: shows the first implementation of the present invention in which an extra astigmatism is allocated on a specific area on a design surface.
Figure 22:
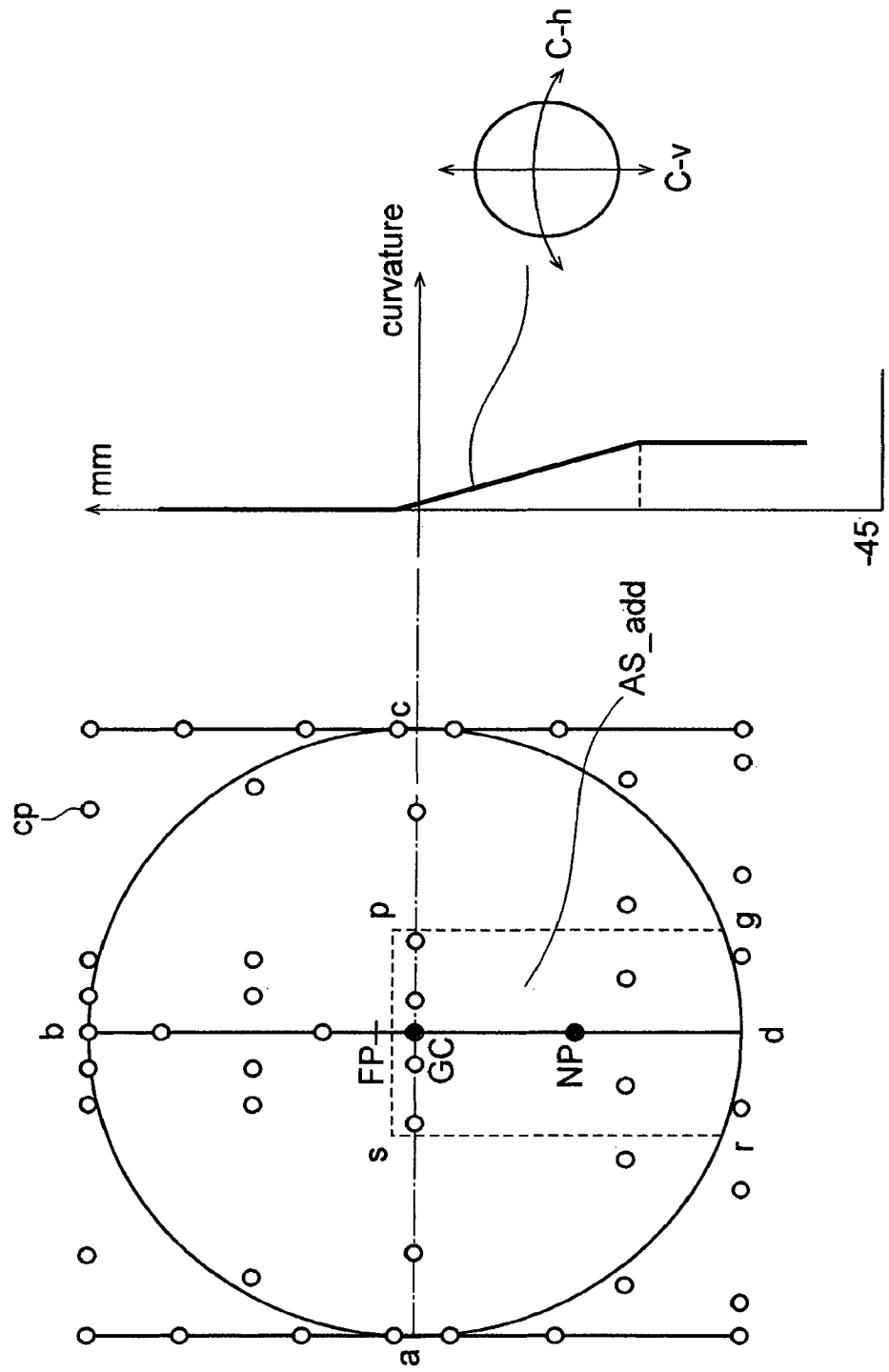
FIG. 22 shows the third implementation of the present invention in which an extra astigmatism is allocated on a specific area on a design surface.

Here, the way of expand extra astigmatism not only along the meridian but also for whole design surface is described in 3 patterns, in FIG. 18, FIG. 20, and FIG. 22.

(Pattern 1)

FIG. 18 shows the first implementation of the present invention in which an extra astigmatism is allocated on a specific area on a design surface. In FIG. 18, the extra astigmatism can be achieved to just only one point NP (e.g. providing an extra astigmatism of 0.50D in correspondence of a point NP on the lens). (See the right hand figure of FIG. 18.)

The left hand figure of FIG. 18 shows a design surface of 60 mm in diameter. FP means for fitting point (or eye point); GC means geometric center; NP means near point. The right hand figure of FIG. 18 shows the change of the extra astigmatism in transmission along the meridian, and its positional correlation corresponds to the left hand figure. The vertical axis of the right hand figure of FIG. 18 shows position (mm) of y direction, and the horizontal axis shows amount of extra astigmatism (D). When y is in the positive area, the extra astigmatism is not added, but when y is in the negative area, the extra astigmatism begins to increase and reaches 0.50D at NP and continues to increase.

The extra astigmatism is allocated to a sectorial area "AS_add" surrounded by an arc e-d-f, a line segment e-GC and a line segment f-GC. An area "AS_add" is controlled by an angle α that the line segment e-GC and the line segment f-GC make.

The extra astigmatism is not allocated to an area "AS_0" of a top half the lens (semicircle surrounded by an arc a-b-c and a line segment a-c).

There are two sectorial areas "AS_int". One "AS_int" is surrounded by an arc a-e, a line segment a-GC and a line segment e-GC and the other "AS_int" is surrounded by an arc c-f, a line segment c-GC and a line segment f-GC.

In other words, by putting one constraint on the transmitted inherent astigmatism on one single point, it is possible to obtain a sector of a circle showing extra astigmatism on the eye. Of course, the extra astigmatism may be given to more than one point, as in fact it can be provided to an arbitrary number of point in the areas (or also lines) above discussed.

The parameters in FIG. 18 is an amount of extra astigmatism and an angle α that controls a range of an area where extra astigmatism is allocated. The amount of extra astigmatism is 0.50D and angle α is 30 degrees. The value of angle α may be any of within 15 degrees to 45 degrees.

FIG. 19A to FIG. 19D show results that the pattern 1 was applied to the condition of embodiment 1 (S101D of FIG. 25).

FIG. 19E to FIG. 19H show results that the pattern 1 was applied to the condition of embodiment 2 (S101E of FIG. 25).

Figure 19A:
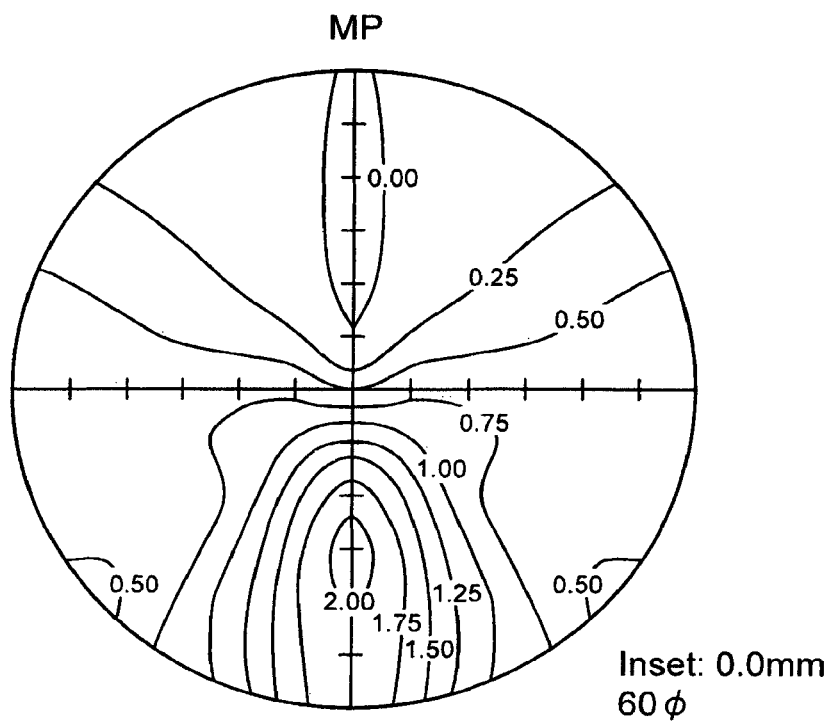
FIG. 19A: shows a transmitted mean power map corresponding to the first implementation of the present invention when power change in the intermediate and near vision regions is VP<HP.

FIG. 19A shows a transmitted mean power map corresponding to the first implementation of the present invention when power change in the intermediate and near vision regions is VP<HP. Diameter of the map is 60 mm and the inset is 0.0 mm.

Figure 19B:
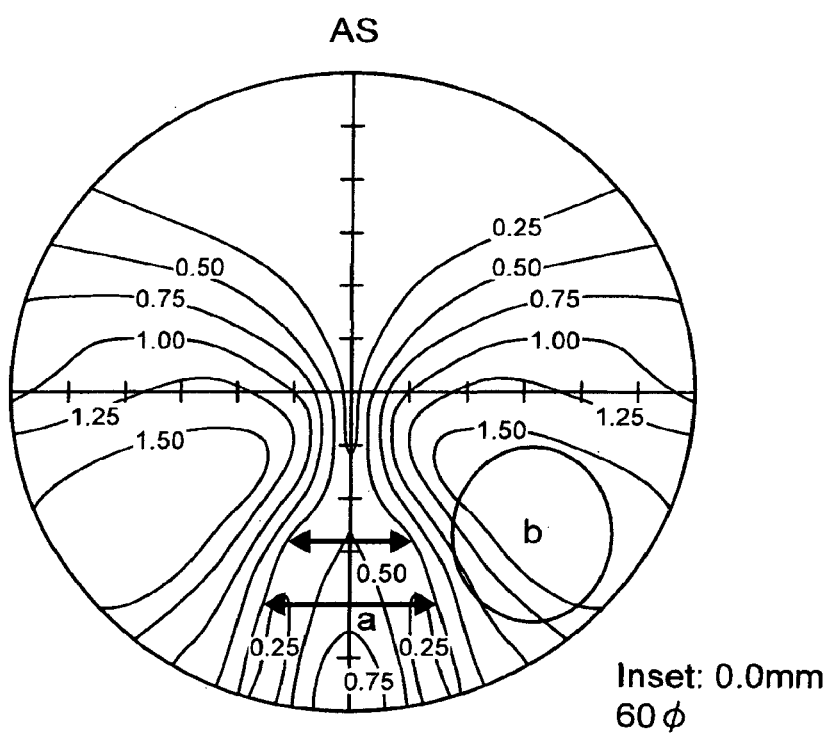
FIG. 19B: shows a transmitted inherent astigmatism map corresponding to the first implementation of the present invention when power change in the intermediate and near vision regions is VP<HP.

FIG. 19B a transmitted inherent astigmatism map corresponding to the first implementation of the present invention when power change in the intermediate and near vision regions is VP<HP. Diameter of the maps is 60 mm and the inset is 0.0 mm.

In FIG. 19B, an area "a" corresponds to a measure of a clear vision region. Two arrows are at y=−14 mm and y=−20 mm respectively. A circled area with sign "b" corresponds to an area where maximum inherent astigmatism exists and a value of the inherent astigmatism in the area "b" is maximum.

The comparison between a conventional design (FIG. 6A) and the present embodiment (FIG. 19B) shows that the clear vision region of the near vision region in the present embodiment is expanded than that of conventional design. See the area "a" on the both transmitted inherent astigmatism maps; and the inherent astigmatism on the peripheral decreases, although the region having an inherent astigmatism of 1.50D exists in the present embodiment transmitted inherent astigmatism map, however the proportion occupied by the region having the inherent astigmatism of 1.50D is smaller than that of conventional; see the circled area with sign "b" in both transmitted inherent astigmatism maps.

Widths of the clear vision region by image measurement in the transmitted inherent astigmatism map of the embodiment 1 are 10.65 mm and 15.97 mm at y=−14.0 mm (upper "a") and y=−20.0 mm (lower "a") respectively. For the conventional design, in the same manner, 9.97 mm and 11.13 mm at y=−14.0 mm (upper "a") and y=−20.0 mm (lower "a") respectively.

Figure 19C:
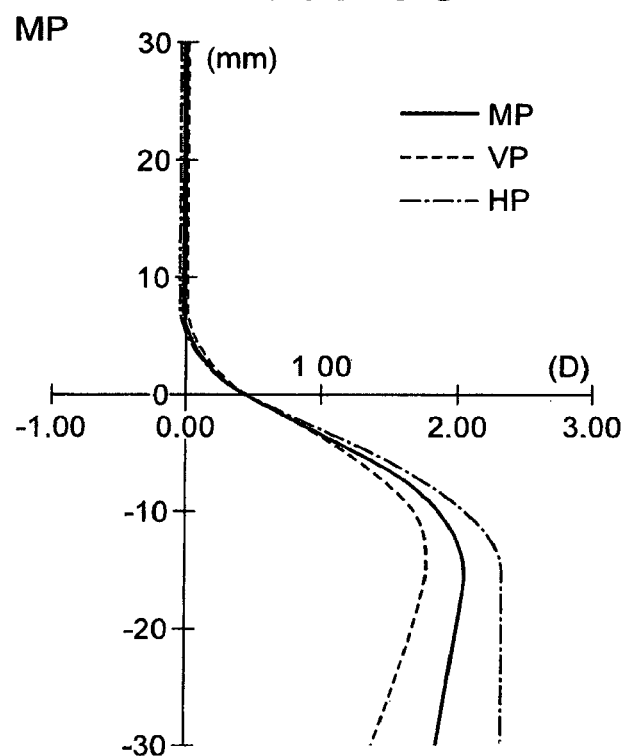
FIG. 19C: shows a transmitted power change along the meridian in vertical power, horizontal power, and mean power corresponding to the first implementation of the present invention.
Figure 19D:
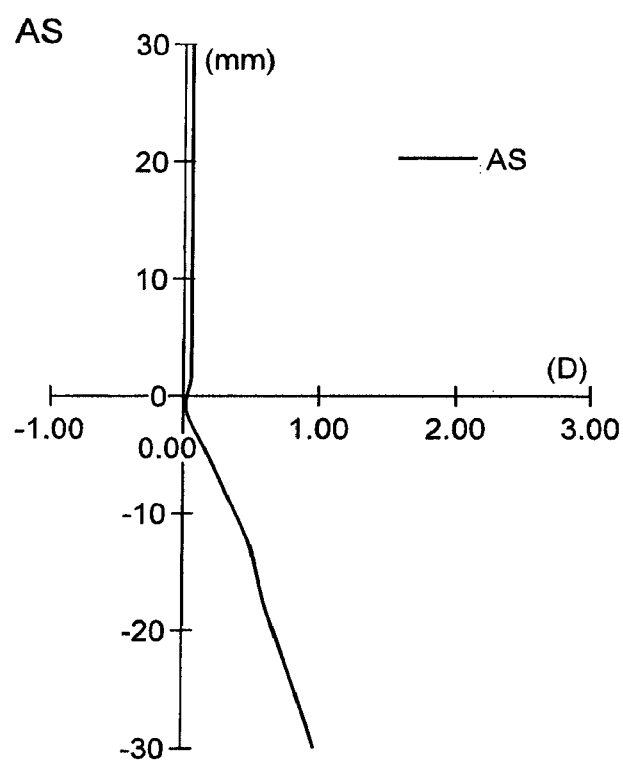
FIG. 19D: shows a transmitted inherent astigmatism change along the meridian corresponding to the first implementation of the present invention.
Figure 19E:
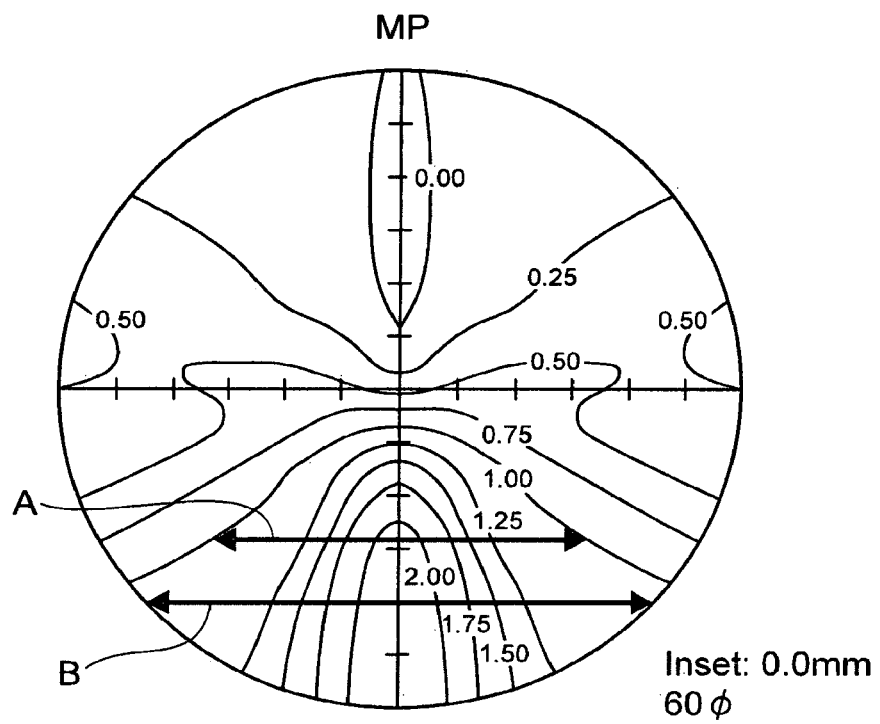
FIG. 19E: shows a transmitted mean power map corresponding to the first implementation of the present invention when power change in the intermediate and near vision regions is VP>HP.

FIG. 19E shows a transmitted mean power map corresponding to the first implementation of the present invention when power change in the intermediate and near vision regions is VP>HP. Diameter of the map is 60 mm and the inset is 0.0 mm.

When comparing for instance the area having the mean power (MP) is on and over 1.00D of FIG. 5A against FIG. 19E, it can be seen that such area has expanded, i.e. it is wider or larger, for lenses according to this embodiment. This is highlighted by the arrows in the transmitted inherent mean power maps. Arrow "A" at the y=−14.0 mm in FIG. 5A and FIG. 19E are 20.32 mm and 32.90 mm respectively. Arrow "B" at the y=−20.0 mm in FIG. 5A and FIG. 19E are 26.61 mm and 44.03 mm respectively. The figures of the widths are based on image measurement of the maps.

Figure 19F:
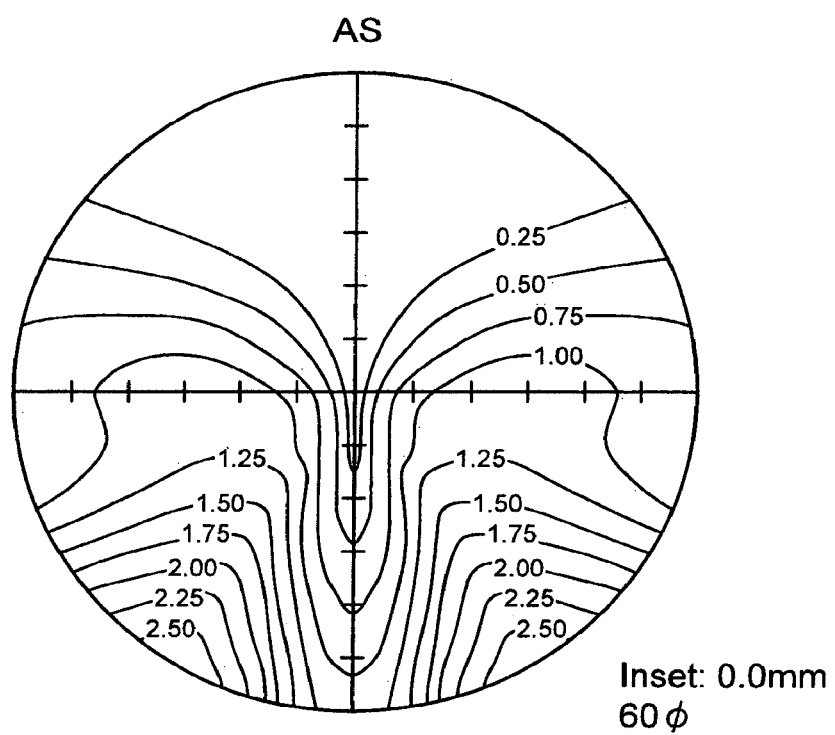
FIG. 19F: shows a transmitted inherent astigmatism map corresponding to the first implementation of the present invention when power change in the intermediate and near vision regions is VP>HP.

FIG. 19F shows a transmitted inherent astigmatism map corresponding to the first implementation of the present invention when power change in the intermediate and near vision regions is VP>HP. Diameter of the map is 60 mm and the inset is 0.0 mm.

Figure 19G:
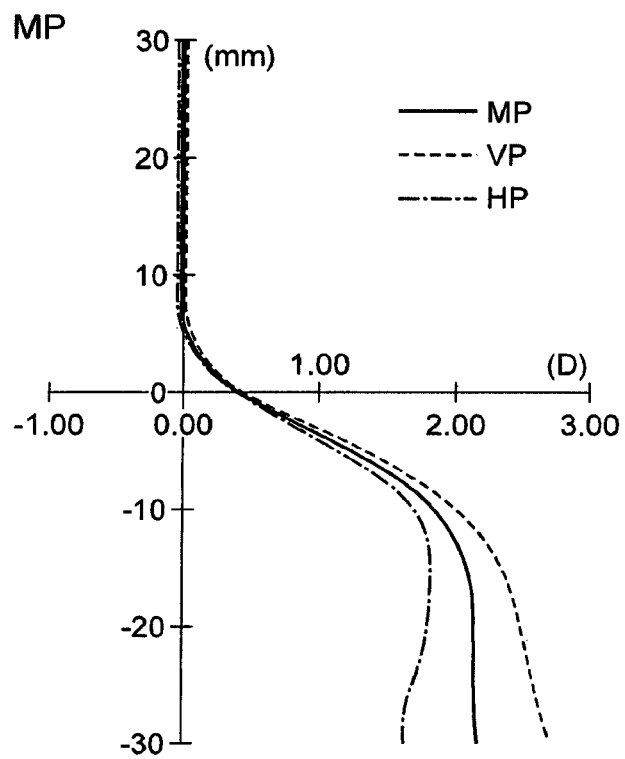
FIG. 19G: shows a transmitted power change along the meridian in vertical power, horizontal power, and mean power corresponding to the first implementation of the present invention.

FIG. 19C and FIG. 19G show a transmitted power change along the meridian in vertical power, horizontal power, and mean power corresponding to the first implementation of the present invention.

In FIG. 19C and FIG. 19G, vertical axis shows a position (mm) in y direction and horizontal axis shows addition power, ADD (D). Vertical power (VP) lines are in dotted, horizontal power (HP) lines are in dashed, and mean power (MP) lines are in solid. According the FIG. 19C, an amount of vertical power is lower than an amount of horizontal power and according the FIG. 19G, an amount of vertical power is higher than an amount of horizontal power.

Figure 19H:
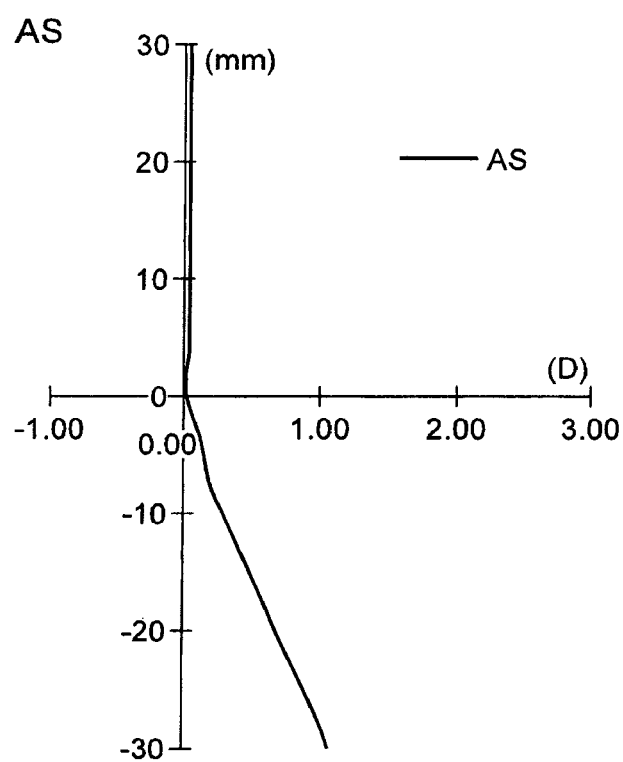
FIG. 19H: shows a transmitted inherent astigmatism change along the meridian corresponding to the first implementation of the present invention.

FIG. 19D and FIG. 19H show transmitted inherent astigmatism change along the meridian corresponding to the first implementation of the present invention. Vertical axis shows a position (mm) in y direction and horizontal axis shows the inherent astigmatism, AS (D). FIG. 19D and FIG. 19H also show the extra astigmatism is intentionally added along the meridian in the intermediate vision region and the near vision region in relation to FIG. 19C and FIG. 19G respectively.

(Pattern 2)

FIG. 20 shows the second implementation of the present invention in which an extra astigmatism is allocated on a specific area on a design surface. The second implementation corresponds to embodiment 1 and embodiment 2. In FIG. 20, the extra astigmatism is added in correspondence to one point NP, and as a result the extra astigmatism is provided the almost entire lower-half of the design surface. (See the right hand figure of FIG. 20.)

The left hand figure of FIG. 20 shows a design surface of 60 mm in diameter. FP means a fitting point (or eye point); GC means a geometric center; NP means a near point. The right hand figure of FIG. 20 shows the change of the transmitted inherent astigmatism along the meridian, and its positional correlation corresponds to the left hand figure. The vertical axis of the right hand figure of FIG. 20 shows position (mm) of the y direction, and the horizontal axis shows an amount of extra astigmatism (D). The extra astigmatism is not added to the area wherein y is positive.

The extra astigmatism is allocated to an area "AS_add" surrounded by arc g-d-h and line segment g-h. In the area "AS_add", the value of extra astigmatism is 0.50D. The extra astigmatism is not allocated to the area "AS_0" of a top half of the lens (semicircle surrounded by arc a-b-c and line segment a-c). Rectangle like area of "AS_int" surrounded by point a, point c, point h, and point g is an area that interpolate the area "AS_add" and the area "A_0".

FIG. 21A to FIG. 21D show results that the pattern 2 was applied to the condition of embodiment 1 (S101D of FIG. 25).

FIG. 21E to FIG. 21H show results that the pattern 2 was applied to the condition of embodiment 2 (S101E of FIG. 25).

Figure 21A:
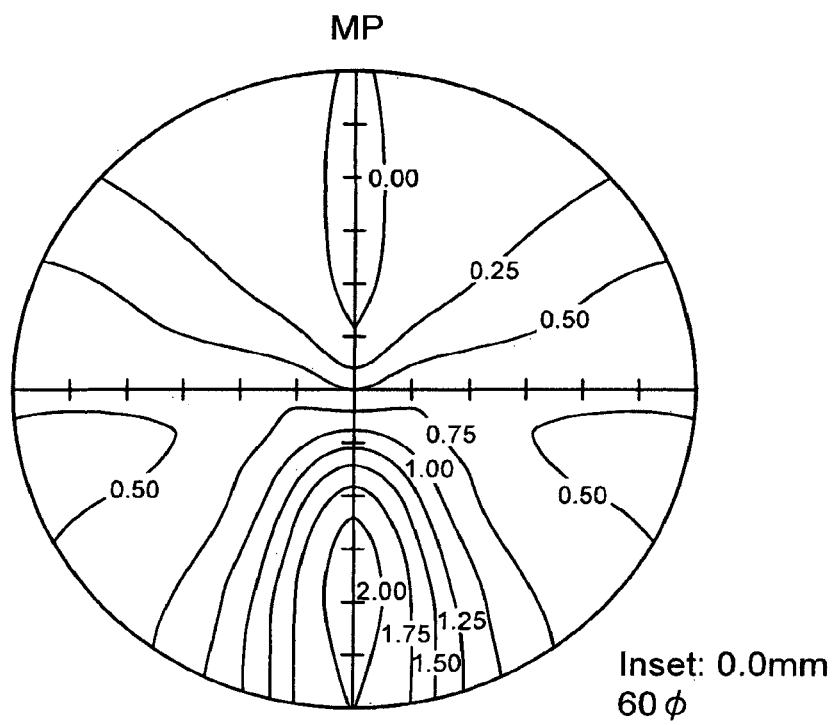
FIG. 21A: shows a transmitted mean power map corresponding to the second implementation of the present invention when power change in the intermediate and near vision regions is VP<HP.

FIG. 21A shows a transmitted mean power map corresponding to the second implementation of the present invention when power change in the intermediate and near vision regions is VP<HP. Diameter of the map is 60 mm and the inset is 0.0 mm.

Figure 21B:
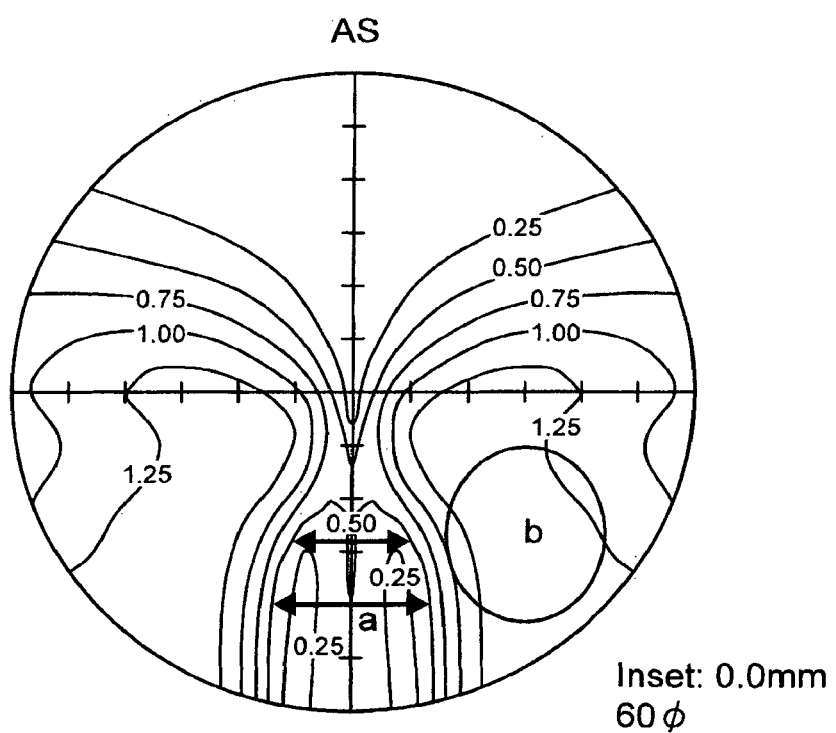
FIG. 21B: shows a transmitted inherent astigmatism map corresponding to the second implementation of the present invention when power change in the intermediate and near vision regions is VP<HP.

FIG. 21B shows a transmitted inherent astigmatism map corresponding to the second implementation of the present invention when power change in the intermediate and near vision regions is VP<HP. Diameter of the maps is 60 mm and the inset is 0.0 mm.

In FIG. 21B, an area "a" corresponds to a measure of a clear vision region. Two arrows are at y=−14.0 mm and y=−20.0 mm respectively. A circled area with sign "b" corresponds to an area where maximum inherent astigmatism exists and a value of the inherent astigmatism in the area "b" is maximum.

The comparison between a conventional design (FIG. 6A) and the present embodiment (FIG. 21B) shows that the clear vision region of the near vision region in the present embodiment is expanded than that of conventional design. See the area "a" on the both transmitted inherent astigmatism maps; and the inherent astigmatism on the peripheral decreases (region having astigmatism of 1.50D does not appear in the transmitted inherent astigmatism map of the present embodiment); see the circled area with sign "b" in both transmitted inherent astigmatism maps.

Widths of the clear vision region by image measurement in the transmitted inherent astigmatism map of the embodiment 1 are 10.65 mm and 13.55 mm at y=−14.0 mm (upper "a") and y=−20.0 mm (lower "a") respectively. For the conventional design, in the same manner, 8.71 mm and 10.64 mm at y=−14.0 mm (upper "a") and y=−20.0 mm (lower "a") respectively.

Figure 21C:
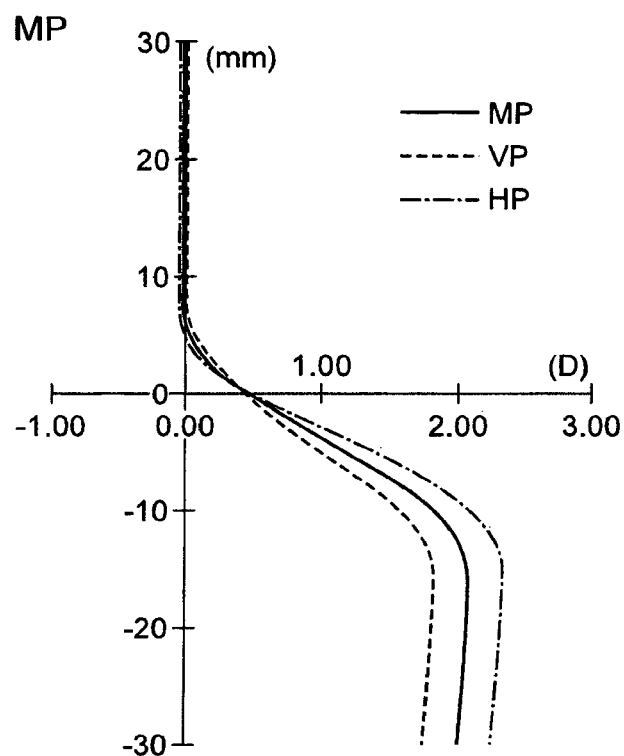
FIG. 21C: shows a transmitted power change along the meridian in vertical power, horizontal power, and mean power corresponding to the second implementation of the present invention.
Figure 21D:
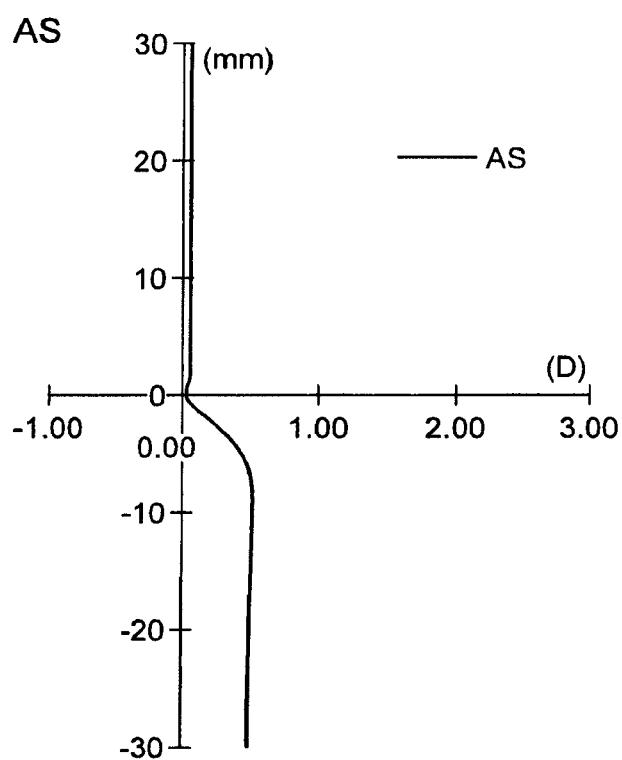
FIG. 21D: shows a transmitted inherent astigmatism change along the meridian corresponding to the second implementation of the present invention.
Figure 21E:
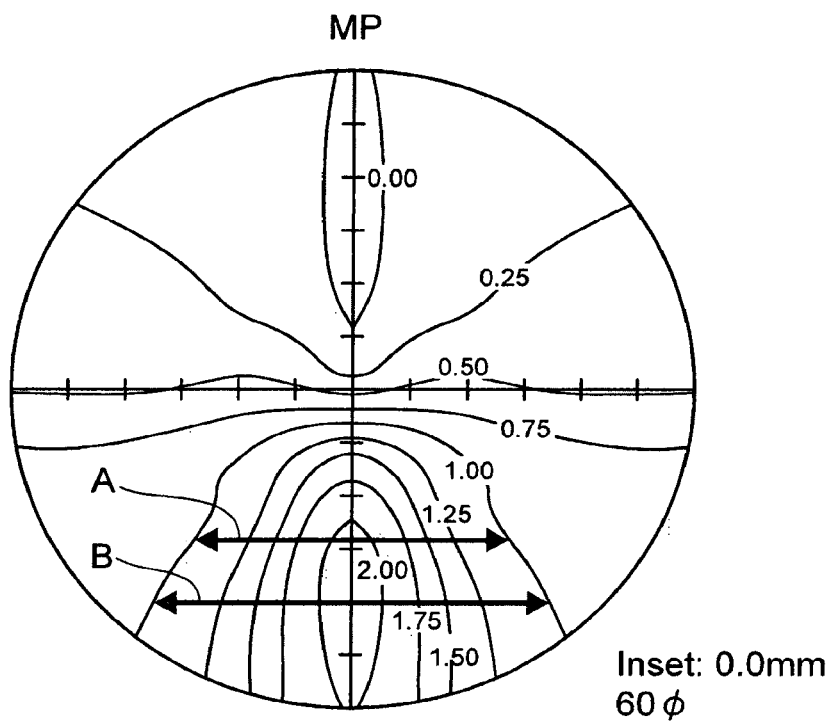
FIG. 21E: shows a transmitted mean power map corresponding to the second implementation of the present invention when power change in the intermediate and near vision regions is VP>HP.

FIG. 21E shows a transmitted mean power map corresponding to the second implementation of the present invention when power change in the intermediate and near vision regions is VP>HP. Diameter of the map is 60 mm and the inset is 0.0 mm.

When comparing for instance the area having the mean power (MP) is on and over 1.00D of FIG. 5A against FIG. 21E, it can be seen that such area has expanded, i.e. it is wider or larger, for lenses according to this embodiment. This is highlighted by the arrows in the transmitted inherent mean power maps. Arrow "A" at the y=−14 mm in FIG. 5A and FIG. 21E are 20.32 mm and 27.10 mm respectively. Arrow "B" at the y=−20 mm in FIG. 5A and FIG. 21E are 26.61 mm and 34.84 mm respectively. The figures of the widths are based on image measurement of the transmitted inherent mean power maps.

Figure 21F:
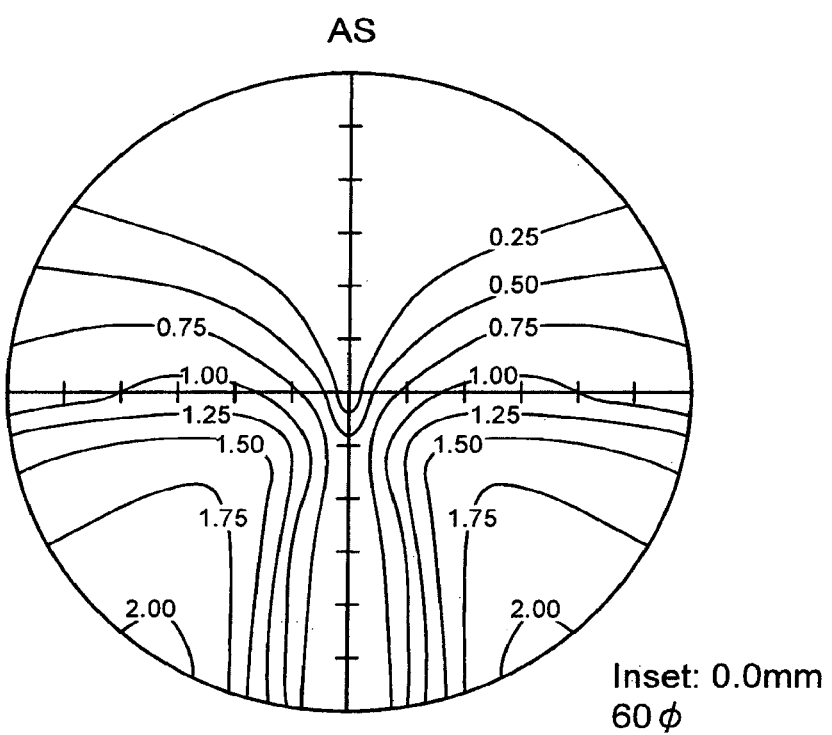
FIG. 21F: shows a transmitted inherent astigmatism map corresponding to the second implementation of the present invention when power change in the intermediate and near vision regions is VP>HP.

FIG. 21F shows a transmitted inherent astigmatism map corresponding to the second implementation of the present invention when power change in the intermediate and near vision regions is VP>HP. Diameter of the map is 60 mm and the inset is 0.0 mm.

Figure 21G:
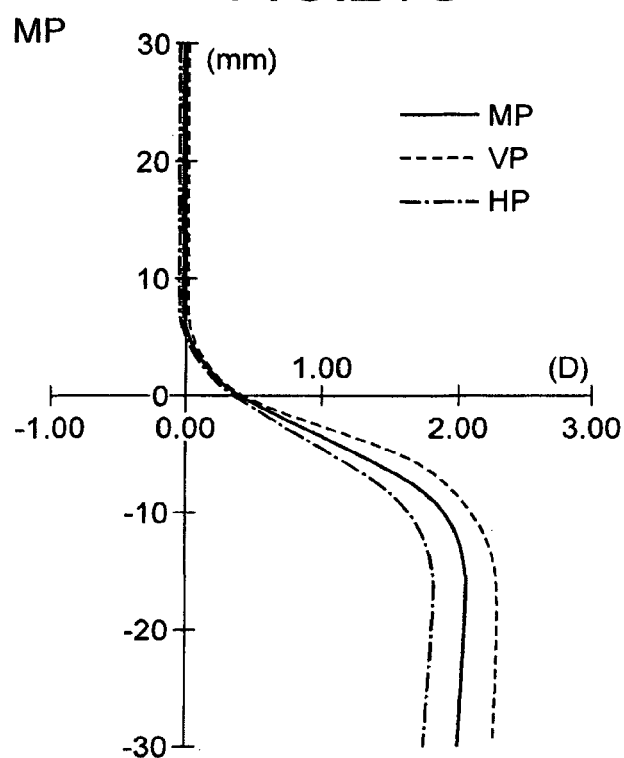
FIG. 21G: shows a transmitted power change along the meridian in vertical power, horizontal power, and mean power corresponding to the second implementation of the present invention.

FIG. 21C and FIG. 21G shows a transmitted power change along the meridian in vertical power, horizontal power, and mean power corresponding to the second implementation of the present invention.

In FIG. 21C and FIG. 21G, vertical axis shows a position (mm) in y direction and horizontal axis shows addition power, ADD (D). Vertical power (VP) lines are in dotted, horizontal power (HP) lines are in dashed, and mean power (MP) lines are in solid. According the FIG. 21C, an amount of vertical power is lower than an amount of horizontal power and according the FIG. 21G, an amount of vertical power is higher than an amount of horizontal power.

Figure 21H:
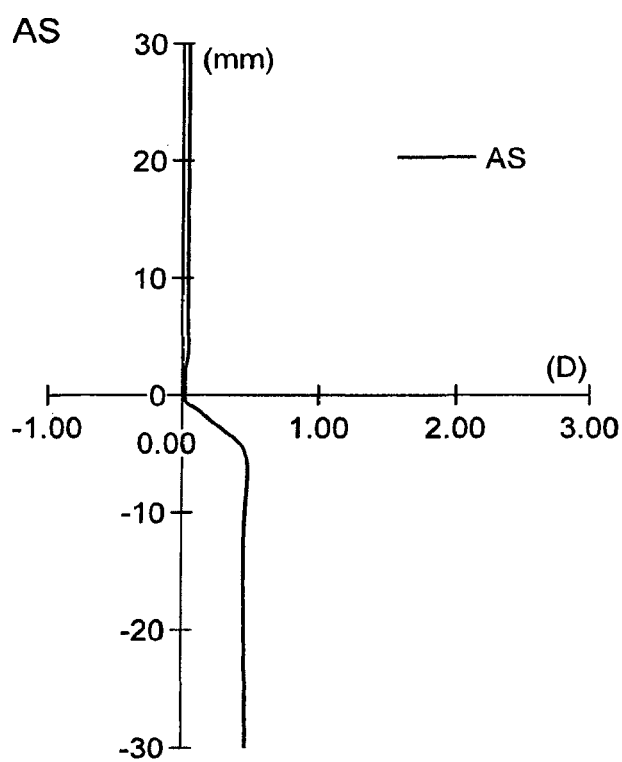
FIG. 21H: shows a transmitted inherent astigmatism change along the meridian corresponding to the second implementation of the present invention.

FIG. 21D and FIG. 21H shows a transmitted inherent astigmatism change along the meridian corresponding to the second implementation of the present invention. Vertical axis shows a position (mm) in y direction and horizontal axis shows the inherent astigmatism, AS (D).

In FIG. 21D and FIG. 21H also show the extra astigmatism is intentionally added along the meridian in the intermediate vision region and the near vision region in relation to FIG. 21C and FIG. 21G respectively.

(Pattern 3)

FIG. 22 shows the third implementation of the present invention in which an extra astigmatism is allocated on a specific area on a design surface. In FIG. 22, the extra astigmatism is expressed in a curvature basis and is added in correspondence to one point NP. As a result, extra astigmatism is provided to the specific area.

The left hand figure of FIG. 22 shows a design surface of 60 mm in diameter. FP means a fitting point (or eye point); GC means a geometric center; NP means a near point. The right hand figure of FIG. 22 shows the change of the difference between horizontal curvature (C-h) and vertical curvature (C-v) in transmission along the meridian, and its positional correlation corresponds to the left hand figure.

The right hand figure of FIG. 22, the vertical axis shows a position (mm) of y direction and the horizontal axis shows a difference of curvatures. In the area wherein y is positive, the difference between C-h and C-v is almost zero, i.e., the extra astigmatism is not added.

The extra astigmatism is allocated to an area "AS_add" surrounded by arc g-d-r and line segment r-s, line segment s-p, and line segment p-g. In the area "AS_add", the extra astigmatism can be achieved to just only one point NP (e.g. providing an extra astigmatism of 0.50D in correspondence of a point NP on the lens.)

In the pattern 3, the extra astigmatism is added by curvature control using a spline function. Small circles "cp" of the left hand figure of FIG. 22 are control points of the spline function. More of control points are set in the vicinity of the meridian. Also, in this pattern, control points are also placed at the tangential lines of point "a" and point "c".

FIG. 23A to FIG. 23D show results that the pattern 3 was applied to the condition of embodiment 1 (S101D of FIG. 25).

FIG. 23E to FIG. 23H show results that the pattern 3 was applied to the condition of embodiment 2 (S101E of FIG. 25).

Figure 23A:
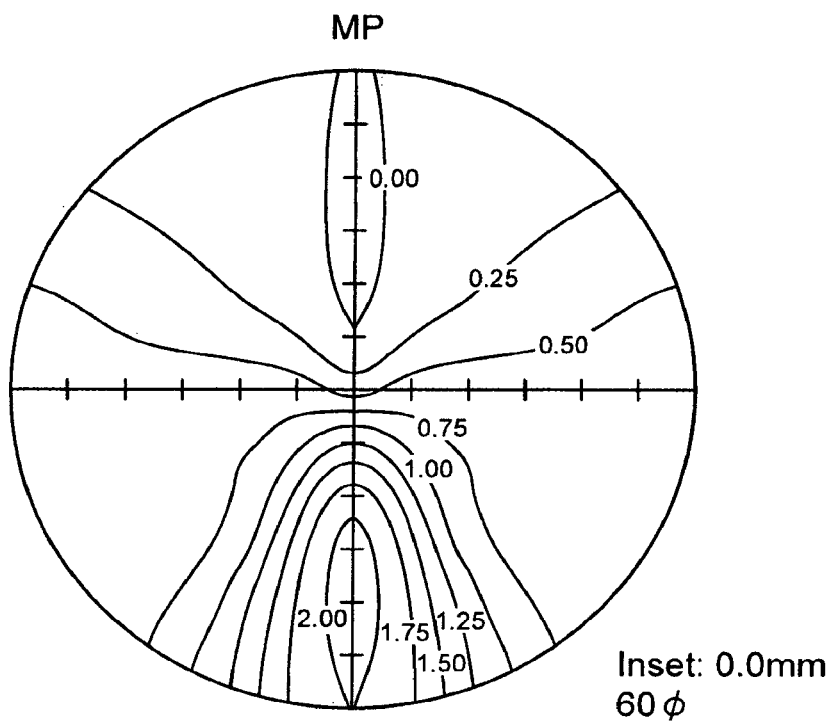
FIG. 23A: shows a transmitted mean power map corresponding to the third implementation of the present invention when power change in the intermediate and near vision regions is VP<HP.

FIG. 23A shows a transmitted mean power map corresponding to the third implementation of the present invention when power change in the intermediate and near vision regions is VP<HP. Diameter of the map is 60 mm and the inset is 0.0 mm.

Figure 23B:
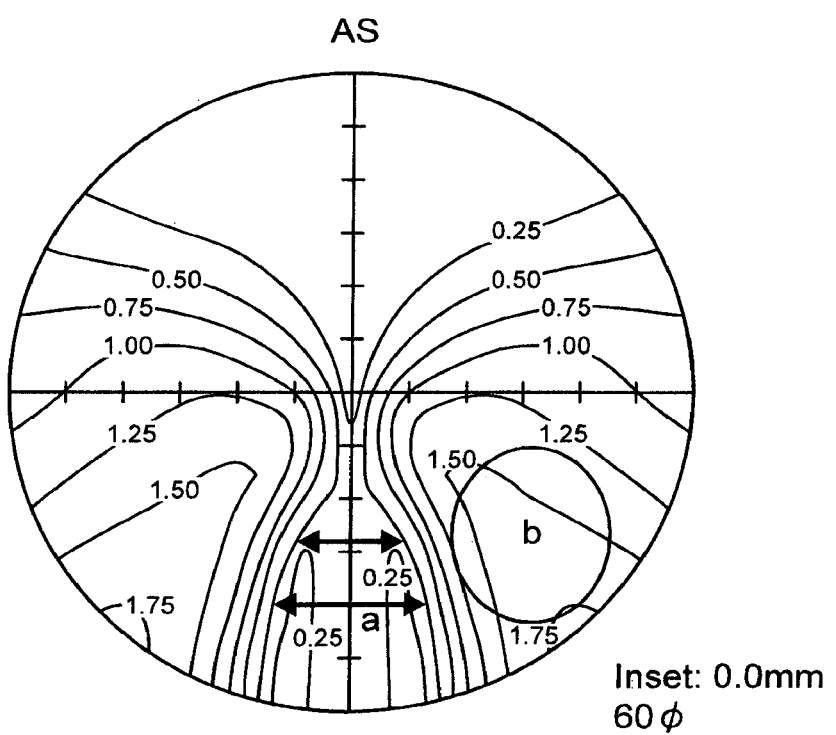
FIG. 23B: shows a transmitted inherent astigmatism map corresponding to the third implementation of the present invention when power change in the intermediate and near vision regions is VP<HP.

FIG. 23B shows a transmitted inherent astigmatism map corresponding to the third implementation of the present invention when power change in the intermediate and near vision regions is VP<HP. Diameter of the maps is 60 mm and the inset is 0.0 mm.

In FIG. 23B, an area "a" corresponds to a measure of a clear vision region. Two arrows are at y=−14.0 mm and y=−20.0 mm respectively. A circled area with sign "b" corresponds to an area where maximum inherent astigmatism exists and a value of the inherent astigmatism in the area "b" is maximum.

The comparison between a conventional design (FIG. 6A) and the present embodiment (FIG. 23B) shows that the clear vision region of the near vision region in the present embodiment is expanded than that of conventional design. See the area "a" on the both transmitted inherent astigmatism maps; and the inherent astigmatism on the peripheral decreases, although the region having an inherent astigmatism of 1.50D exists in the present embodiment transmitted inherent astigmatism map, however the proportion occupied by the region having the inherent astigmatism of 1.50D is smaller than that of conventional; see the circled area with sign "b" in both transmitted inherent astigmatism maps.

Widths of the clear vision region by image measurement in the transmitted inherent astigmatism map of the embodiment 1 are 9.91 mm and 13.55 mm at y=−14.0 mm (upper "a") and y=−20.0 mm (lower "a") respectively. For the conventional design, in the same manner, 9.97 mm and 11.13 mm at y=−14.0 mm (upper "a") and y=−20.0 mm (lower "a") respectively.

Figure 23C:
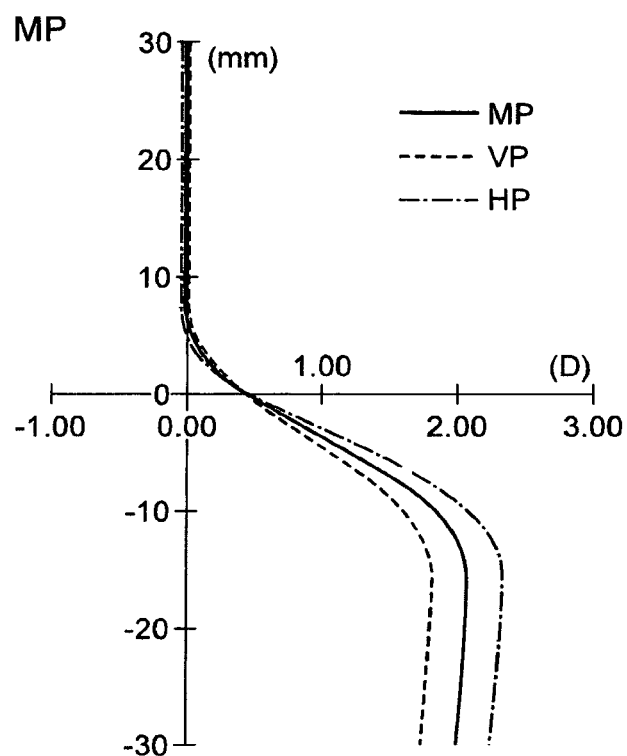
FIG. 23C: shows a transmitted power change along the meridian in vertical power, horizontal power, and mean power corresponding to the third implementation of the present invention.
Figure 23D:
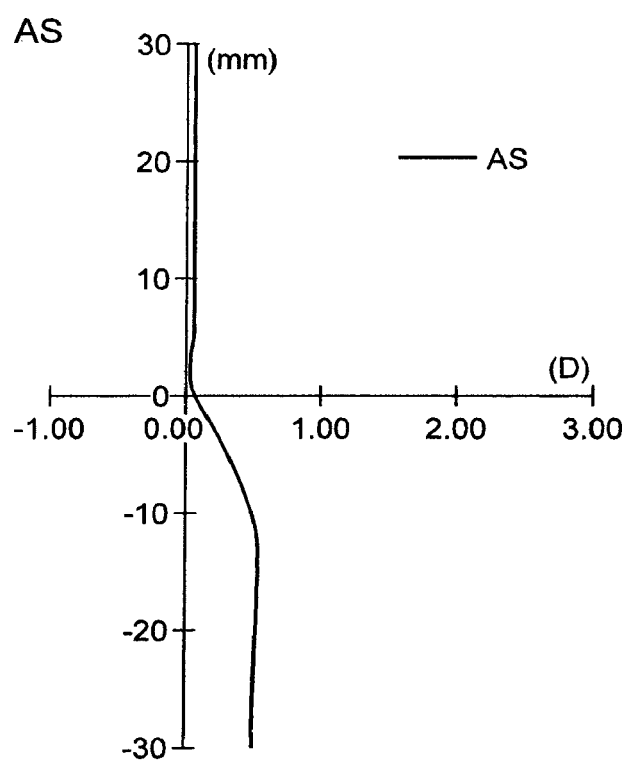
FIG. 23D: shows a transmitted inherent astigmatism change along the meridian corresponding to the third implementation of the present invention.
Figure 23E:
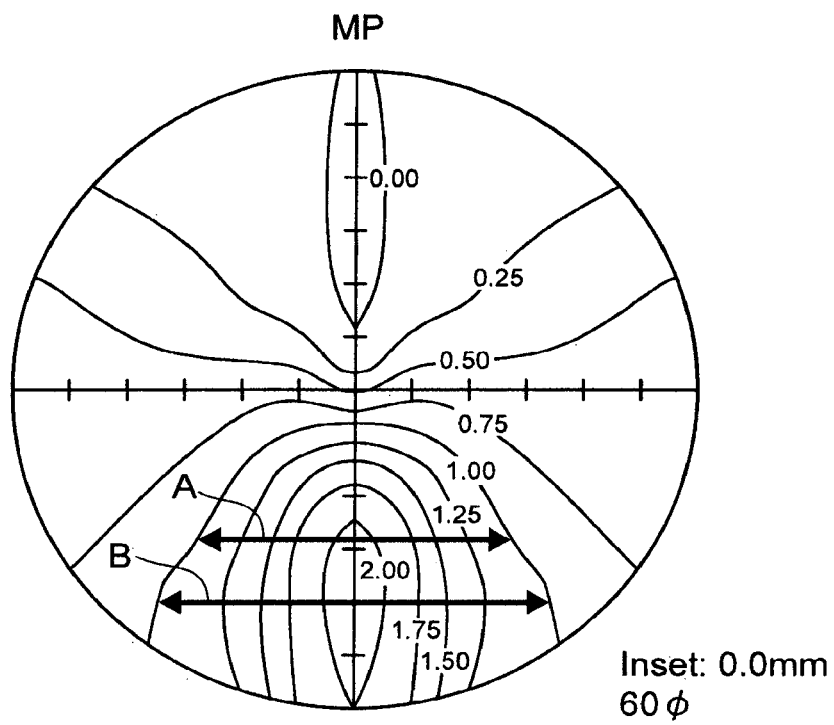
FIG. 23E: shows a transmitted mean power map corresponding to the third implementation of the present invention when power change in the intermediate and near vision regions is VP>HP.

FIG. 23E shows a transmitted mean power map corresponding to the third implementation of the present invention when power change in the intermediate and near vision regions is VP>HP. Diameter of the map is 60 mm and the inset is 0.0 mm.

When comparing for instance the area having the mean power (MP) is on and over 1.00D of FIG. 5A against FIG. 23E, it can be seen that such area has expanded, i.e. it is wider or larger, for lenses according to this embodiment.

This is highlighted by the arrows in the transmitted inherent mean power maps. Arrow "A" at the y=−14.0 mm in FIG. 5A and FIG. 23E are 20.32 mm and 27.58 mm respectively. Arrow "B" at the y=−20.0 mm in FIG. 5A and FIG. 23E are 26.61 mm and 34.65 mm respectively. The figures of the widths are based on image measurement of the maps.

Figure 23F:
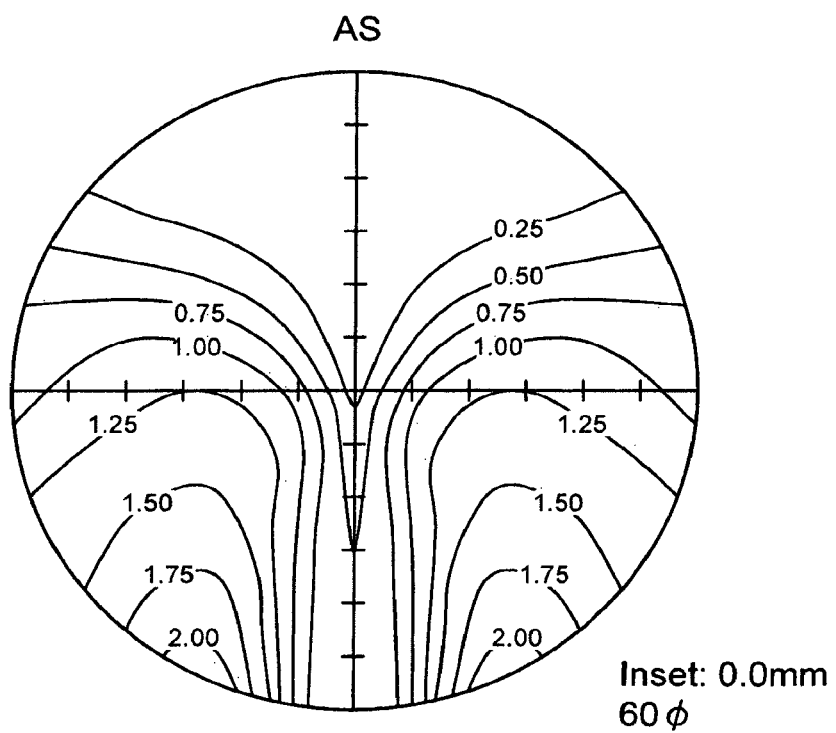
FIG. 23F: shows a transmitted inherent astigmatism map corresponding to the third implementation of the present invention when power change in the intermediate and near vision regions is VP>HP.

FIG. 23F shows a transmitted inherent astigmatism map corresponding to the third implementation of the present invention when power change in the intermediate and near vision regions is VP>HP. Diameter of the map is 60 mm and the inset is 0.0 mm.

Figure 23G:
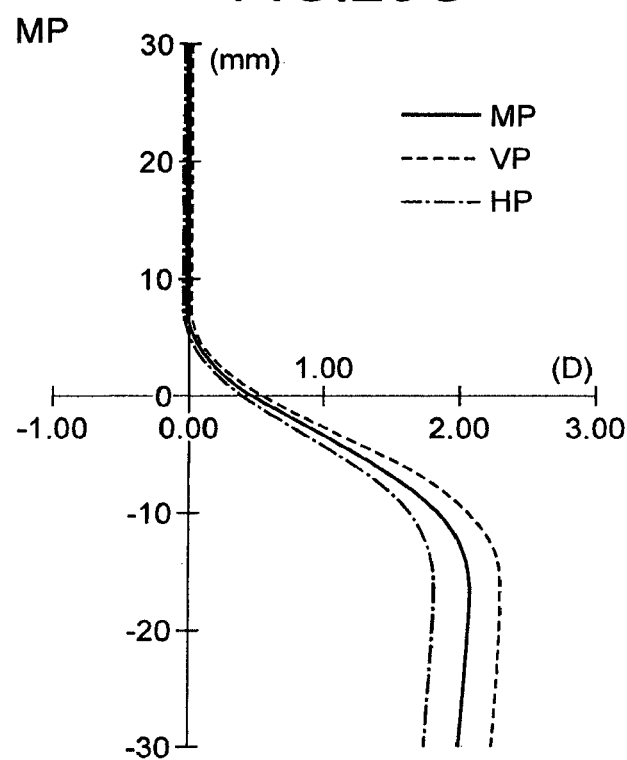
FIG. 23G: shows a transmitted power change along the meridian in vertical power, horizontal power, and mean power corresponding to the third implementation of the present invention.

FIG. 23C and FIG. 23G shows a transmitted power change along the meridian in vertical power, horizontal power, and mean power corresponding to the third implementation of the present invention.

In FIG. 23C and FIG. 23G, vertical axis shows a position (mm) in y direction and horizontal axis shows addition power, ADD (D). Vertical power (VP) lines are in dotted, horizontal power (HP) lines are in dashed, and mean power (MP) lines are in solid. According the FIG. 23C, an amount of vertical power is lower than an amount of horizontal power and according the FIG. 23G, an amount of vertical power is higher than an amount of horizontal power.

Figure 23H:
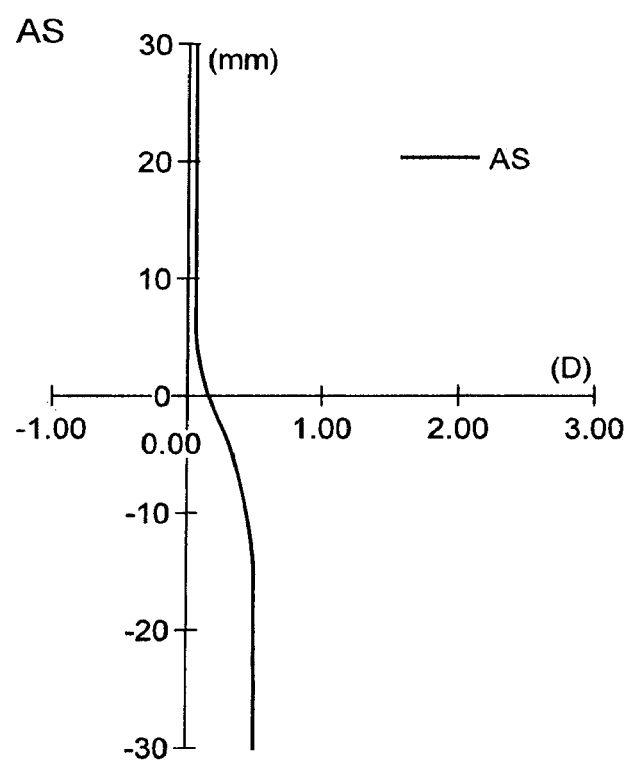
FIG. 23H: shows a transmitted inherent astigmatism change along the meridian corresponding to the third implementation of the present invention.

FIG. 23D and FIG. 23H show a transmitted inherent astigmatism change along the meridian corresponding to the third implementation of the present invention. Vertical axis shows a position (mm) in y direction and horizontal axis shows the inherent astigmatism, AS (D). FIG. 23D and FIG. 23H also show the extra astigmatism is intentionally added along the meridian in the intermediate vision region and the near vision region in relation to FIG. 23C and FIG. 23G respectively.

Embodiment 4

According to a first implementation of the embodiment 4 of the present invention, the near vision region and the intermediate vision region exhibit extra astigmatism values corresponding to the extra astigmatism, and exhibit an amount of vertical power that is lower than an amount of horizontal power in at least one point of the near vision region. Here, exhibit is used in the sense of produced on the eye, or as perceived by the eye, as transmitted through the lens, etc.

In one example, the extra astigmatism corresponds to an expansion of the clear vision region at the near vision region as exhibited by the lens. The expanded clear vision region is a clear vision region larger than a clear vision region corresponding to a zero extra astigmatism.

In another example, the clear vision region is a region being characterized by exhibiting an inherent astigmatism being below a predetermined threshold.

According to a second implementation of the embodiment 4 of the present invention, the near vision region and the intermediate vision region are regions exhibiting extra astigmatism values corresponding to the extra astigmatism, and an amount of vertical power is higher than an amount of horizontal power in correspondence of at least one point of the near vision region.

In one example, the extra astigmatism corresponds to a horizontal width, preferably of a near vision region having a mean power equal to or above a threshold.

In another example, the extra astigmatism corresponds to a widening of the horizontal width, wherein the widened horizontal width is a horizontal width being wider than a horizontal width corresponding to a zero extra astigmatism.

According to a third implementation of the embodiment 4 of the present invention, a meridian exhibits extra astigmatism values correspondent to the amount of extra astigmatism, and an amount of vertical power is different from an amount of horizontal power along the meridian. The meridian is a meridian line of the lens along which a spherical power increased in correspondence of a direction towards the bottom of the progressive addition lens.

In one example, the intermediate vision region along the meridian exhibits the extra astigmatism values correspond to the amount of extra astigmatism.

In another example, the amount of extra astigmatism is constant along the meridian in the intermediate vision region.

In one example, the amount of extra astigmatism corresponds to an inherent astigmatism change rate and preferably a skew distortion.

In another example, the amount of extra astigmatism corresponds to a reduction of the inherent astigmatism change rate and a skew distortion. The reduced inherent astigmatism change rate is an inherent astigmatism change rate being smaller than an inherent astigmatism change rate corresponding to a zero extra astigmatism and the reduced skew distortion is a skew distortion being smaller than a skew distortion corresponding to a zero extra astigmatism.

In another example, the amount of extra astigmatism is monotonically increasing along the meridian from the top to the bottom of the meridian.

In one example, the amount of extra astigmatism corresponds to an inherent astigmatism change rate, a maximum amount of inherent astigmatism, and preferably of the skew distortion.

In another example, the amount of extra astigmatism corresponds to a reduction of the inherent astigmatism change rate and of the maximum amount of inherent astigmatism, and preferably of the skew distortion. The reduced inherent astigmatism change rate is an inherent astigmatism change rate being smaller than an inherent astigmatism change rate corresponding to a zero extra astigmatism.

The reduced of the maximum amount of inherent astigmatism is a maximum amount of inherent astigmatism being smaller than a maximum amount of inherent astigmatism corresponding to a zero extra astigmatism, and the reduced skew distortion is a skew distortion being smaller than a skew distortion corresponding to a zero extra astigmatism.

According to a further example, the amount of extra astigmatism is monotonically decreasing along the meridian from the top to the center of the meridian and monotonically increasing from the center to the bottom of the meridian in the intermediate vision region. In this case, the center of the meridian corresponds to the center of the lens.

Preferably, in the progressive addition lens, the rate of at least one of monotonically decreasing and monotonically increasing is set to control the extent of the area with low aberration around the center of the lens.

According to the embodiment 1 of the present invention, a method for designing, by means of a computer, a progressive addition lens comprising a distance vision region, a near vision region, and an intermediate vision region, wherein a power gradually changes between the distance vision region and the near vision region, is provided. The progressive addition lens is based on prescription data.

The method comprises determining a transmission astigmatic performance parameter correspondent to a sum of a prescribed astigmatism included in the prescription data and of a predetermined amount of extra astigmatism; and determining lens surface data corresponding to the determined transmission performance parameter. The extra astigmatism is added in correspondence of the near vision region and the intermediate vision region and an amount of vertical power is lower than an amount of horizontal power in correspondence of at least one point of the near vision region.

According to the embodiment 1 of the present invention, a progressive addition lens comprising a distance vision region, a near vision region, and an intermediate vision region, wherein a power gradually changes between the distance vision region and the near vision region, is provided. The lens has a surface exhibiting transmission of astigmatic performance parameter values correspondent to prescription data and to extra astigmatism.

The near vision near vision region and the intermediate vision region exhibit extra astigmatism values corresponding to the extra astigmatism and an amount of vertical power is lower than an amount of horizontal power in at least one point of the near vision region.

According to an embodiment 2 of the present invention, a method for designing, by means of a computer, a progressive addition lens comprising a near vision region, distance vision region, and an intermediate-vision region, wherein a power gradually changes between the distance vision region and the near vision region, is provided. The progressive addition lens is based on prescription data.

The method comprises determining a transmission astigmatic performance parameter corresponding to a sum of a prescribed astigmatism including the prescription data and of a predetermined amount of extra astigmatism; and determining lens surface data corresponding to the determined transmission performance parameter. The extra astigmatism is added in correspondence of the near vision region and the intermediate vision region, and an amount of vertical power is higher than an amount of horizontal power in correspondence of at least one point of the near vision region.

According to an embodiment 2 of the present invention, a progressive addition lens comprises a near vision region, a distance vision region, and an intermediate vision region, wherein a power gradually changes between the distance vision region and the near vision region, is provided. The lens has a surface exhibiting transmission astigmatic performance parameter values corresponding to prescription data into an extra astigmatism. The near vision region and the intermediate vision region exhibits extra astigmatism values corresponding to the extra astigmatism, and an amount of vertical power is higher than an amount of horizontal power in correspondence of at least one point of the near vision region.

According to an embodiment 3 of the present invention, a method for designing, by means of a computer, a progressive addition lens comprising a near vision region, distance vision region, and an intermediate-vision region, wherein a power gradually changes between the distance vision region and the near vision region, is provided. The progressive addition lens is based on prescription data.

The method comprises determining a transmission astigmatic performance parameter corresponding to a sum of a prescribed astigmatism included in the prescription data and of a determined amount of extra astigmatism; and determining lens surface data corresponding to the determined transmission performance parameter. The amount of extra astigmatism is added in correspondence of a meridian and an amount of vertical power is different from an amount of horizontal power along the meridian. The meridian is a meridian line of the lens along which spherical power increases in correspondence of a direction towards the bottom of the progressive addition lens.

According to an embodiment 3 of the present invention, a progressive addition lens comprising a near vision region, distance vision region, and an intermediate vision region, wherein a power gradually changes between the distance vision region and the near vision region, is provided. The lens has a surface exhibiting transmission astigmatic performance parameter values corresponding to prescription data and to an extra astigmatism.

A meridian exhibits extra astigmatism value correspondent to the amount of extra astigmatism and an amount of vertical power is different from an amount of horizontal power along the meridian. The meridian is a meridian line of the lens along which spherical power increases in correspondence of a direction towards the bottom of the progressive addition lens.

Optionally in the present invention, the method further comprises setting the transmission astigmatic performance parameter. Setting the transmission astigmatic performance parameter comprises setting, in correspondence of one point of the lens, a first tangential transmittance and a first sagittal transmittance on the basis of the prescription data so as to obtain a prescription transmittance difference between the first tangential transmittance and the first sagittal transmittance.

The setting further comprises increasing the prescription transmittance difference by an amount corresponding to the predetermined amount of extra astigmatism.

The transmittance may be calculated in correspondence of at least one point of the surface of the lens. For example, it may be calculated on a point corresponding to (e.g. projected on the side of the eye) a near point along the meridian.

In addition to transmittance, other parameters which may be optionally used in the transmission-based design are pantoscopic angle, vertex distance, face form angle. It is noted that the present invention is applicable also in the case where the prescription data do not contain any cylindrical power.

The extra astigmatism is an astigmatism to be exhibited on the eye. Namely, it is not an inherent astigmatism to be given on a real surface of the lens, but it is an astigmatism that is intentionally added except prescribed astigmatism. The extra astigmatism is transmitted by the lens and thus perceived by the eye. As a consequence, the transmitted inherent astigmatism on an "imaginary" surface is such that the meridian is not umbilical. The word "imaginary" means that the surface is not real surface of the lens.

The extra astigmatism is provided in correspondence of at least one point of at least one of the near vision region and intermediate vision region. Here, "in correspondence of" may mean that the extra astigmatism artificially added is to be given on an area of the eye onto which the point of the near or intermediate vision regions of the lens is projected.

In other words, the extra astigmatism is given for a tangential and sagittal transmittance on an imaginary surface within the area, wherein the points of the imaginary surface are in correspondence with the lens surface via the light rays.

In an implementation of the present invention, determining a transmission astigmatic performance parameter comprises varying tangential and sagittal transmittance in correspondence of at least one point of the lens, so that the difference becomes bigger than the difference that such transmittance would have only on the basis of prescription data.

Furthermore, in a further implementation of the present invention, the sagittal transmittance is lower than the tangential transmittance in correspondence of at least one point of the near vision region of the lens.

In addition, in a further implementation of the present invention, the sagittal transmittance is higher than the tangential transmittance in correspondence of at least one point of the near vision region of the lens.

According to a further implementation of the present invention, the prescription data comprises parameters relating to a prescribed astigmatism, and the predetermined amount of extra astigmatism provides a value of an extra astigmatism over the value of prescription. All above considerations equally apply to the following, such that repetitions are avoided as far as possible.

A progressive addition lens according to a further embodiment of the present invention comprises a near vision region, a distance vision region, and an intermediate vision region, wherein a power gradually changes between the distance vision region and the near vision region. The lens has a surface exhibiting transmission astigmatic performance parameter values corresponding to prescription data and to an extra astigmatism. Thus, the surface has a structure (e.g. curvatures) configured to exhibit the extra astigmatism on the eye.

(Spectacle Lens Manufacturing System)

Figure 24:
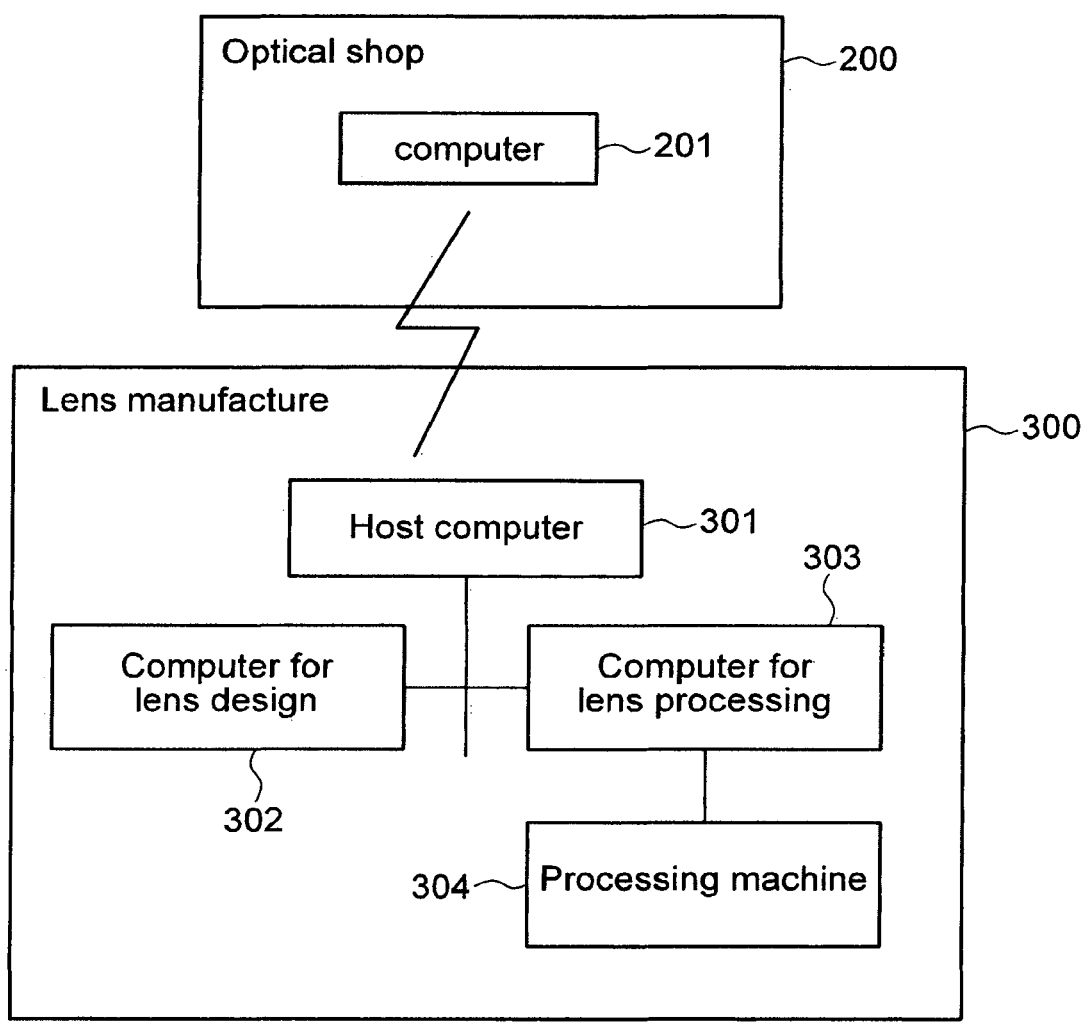
FIG. 24: shows a block diagram describing a structure of a manufacturing system of a spectacle lens for realizing a method for manufacturing a spectacle lens according to embodiments of the present invention.

FIG. 24 shows a block diagram describing a structure of a manufacturing system of a spectacle lens for realizing a method for manufacturing a spectacle lens according to embodiments of As shown in FIG. 24, the spectacle lens manufacturing system has an optical shop 200 for ordering a spectacle lens based on prescription data for a client (expected to be a wearer), and a lens manufacture 300 for manufacturing a spectacle lens under reception of an order from the optical shop 200.

Order to the lens manufacture 300 is performed through data transmission by a specific network such as Internet and FAX, etc. An ophthalmologist and a general consumer may be included in an orderer.

[Optical Shop 200]

A computer 201 is installed in the optical shop 200. The computer 201 is a general PC (Personal Computer) for example, and software is installed on the computer 201 for giving an order of a spectacle lens to the lens manufacture 300. Lens data and frame data are inputted in the computer 201 through an operation of a mouse and a keyboard, etc., by optical shop stuff.

The lens data includes for example, prescription data (spherical power, cylindrical power, cylindrical axis, prismatic power, prism base direction, addition power, pupillary distance (PD), near PD, base curve etc.), frame related wearing conditions of a spectacle lens (vertex distance, pantoscopic angle, face form angle), the type of a spectacle lens (spherical single vision lens, aspherical single vision lens, bifocal lens, and progressive addition lens), coating (dyeing, hard coat, antireflective film, UV-cut, etc.), and layout data according to a request of a client.

The frame data includes shape data of a frame selected by a client. The frame data is managed by a barcode tag for example, and can be available through reading the barcode tag attached to a frame, by a barcode reader. The computer 201 transmits ordering data (lens data and frame data) to the lens manufacture 300 through Internet for example.

[Lens Manufacture 300]

LAN (Local Area Network) with a host computer 200 as a center, is constructed in the lens manufacture 300, connected thereto are a plurality of terminal devices such as a computer for lens design 302 and a computer for lens processing 303. The computer for lens design 302 and the computer for lens processing 303, are general PCs, and a program for designing a spectacle lens and a program for processing a spectacle lens are installed thereon respectively.

Ordering data transmitted from the computer 201 through Internet, is inputted in the host computer 301. The host computer 301 transmits the inputted ordering data to the computer for lens design 302.

In the lens manufacture 300, after the ordering data is received, designing and processing of both surfaces of a convex surface (object side) and a concave surface (eyeball side), are applied to an unprocessed block piece, so as to satisfy a prescription of an expected wearer.

Note that in the lens manufacture 300, in order to improve productivity, powers in all fabrication range are divided into a plurality of groups, and a semi-finished blank having a convex curve shape (spherical shape or aspherical shape) and a lens diameter matching a power range of each group, may be previously prepared in preparation for the order of the spectacle lens.

In this case, in the lens manufacture 300, a spectacle lens based on the prescription of the expected wearer, can be manufactured only by performing the concave surface processing (and edging) or performing both the convex and the concave surfaces processing (and edging).

The computer for lens design 302 has a program installed thereon for designing a spectacle lens according to order or order reception, and is configured to prepare lens design data based on the ordering data (lens data), and prepare edging data based on the ordering data (frame data).

Designing of the spectacle lens by the computer for lens design 302, will be descried later in detail. The computer for lens design 302 transmits the prepared lens design data and edging data to the computer for lens processing 303.

An operator sets the block piece in a processing machine 304 such as a curve generator, etc., and inputs an instruction of starting the processing to the computer for lens processing 303. The computer for lens processing 303 reads the lens design data and the edging data transmitted from the computer for lens design 302, and controls to drive the processing machine 304.

The processing machine 304 grinds/polish both surfaces of the block piece based on the lens design data, to thereby create a convex shape and a concave shape of the spectacle lens. Further, the processing machine 304 processes an outer peripheral surface of an uncut lens after creating the convex shape and the concave shape into a circumference shape corresponding to a lens shape.

Each kind of coating such as dyeing, hard coat, antireflection film, and UV-cut, etc., is applied to the spectacle lens after edging. Thus, the spectacle lens is completed and delivered to the optical shop 200.

According to another embodiment of the present invention, there is provided a computer program comprising code, wherein the code, when executed on processing resources, instructs the processing resources to perform a method embodiment according to the present invention. Any computer is suitable for executing the method. For instance, a computer comprising a processor, a memory (for storing the code and/or data necessary for operating the code), an interface to exchange data with the operator, an interface for exchanging data with other devices, etc.

According to yet another embodiment of the present invention, there is provided an entity for designing lenses comprising: first determination means (or a processor) configured to determine a transmission astigmatic performance parameter corresponding to a sum of a prescribed astigmatism included in the prescription data and of a predetermined amount of extra astigmatism; second determination means (or the same processor) configured to determine lens surface data corresponding to the determined transmission performance parameter.

The entity can be realized in any combination of hardware and/or software, and can be distributed (e.g. client-server architecture, cloud, etc.) or concentrated into one device (the device can be any hardware and/or software combination).

FIG. 25 shows a flowchart of the steps of designing a spectacle lens for realizing a method for designing a spectacle lens according to embodiments of the present invention.

The present invention can also be applied to each kind of progressive addition lens such as a one-side progressive type (inner surface or outer surface) and both-sides progressive type including both-sides integrated type.)

[S101A Acquisition of Prescription Data and/or Optional Data]

In this step, wearer's prescription data and/or optional data are acquired from optical shop. Optional data is of his/her preferences like wearing style and/or frame shape etc. For example, frame shape related data such as pantoscopic angle, vertex distance, and face form angle are used for transmission calculation. When optional data is unknown, default values are used for transmission calculation.

Another optional data is wearer's preferences like wearing style, "clear near vision oriented" or "stable power distribution in horizontal direction oriented". In the case of an optician determines the wearing style and an amount of extra astigmatism, these data are acquired in S101A. If optional data of wearing style and/or the amount of extra astigmatism are not provided from the optician, a lens manufacture may determine these data.

Optional data are not limited to the above-mentioned ones. A physiological parameter can be also an optional data.

[S101B Determination of a Base Design]

In this step, a base design is determined. The basic design provides basic optical performance and design features of a progressive addition lens. These optical performance and design features are characterized by distributions of mean power and inherent astigmatism. The distributions are expressed in flat surfaces without curvature. (Curvatures for actual surfaces of a finally obtained progressive addition lens are provided in S102A.) The base design may be designed newly or selected from arbitral existing design line up of progressive addition lenses.

[S101C Determination of Target Distribution]

In this step, transmitted target distribution which reflects a predetermined amount of extra astigmatism and a variation of how to provide the extra astigmatism (also herein called "Extra AS"). The variations are shown from S101D to S101H.

[S101D Target Distribution. Extra AS: VP<HP]

In this step, Extra AS is caused at the certain amount, so that vertical power will be lower than horizontal power in the intermediate vision region and near vision region along the meridian.

[S101E Target Distribution. Extra AS: VP>HP]

In this step, Extra AS is caused at the certain amount, so that vertical power will be higher than horizontal power in the intermediate vision region and near vision region along the meridian.

[S101F Target Distribution. Extra AS: Constant]

In this step, a constant amount of extra astigmatism is added along the meridian in the intermediate vision region. This variation is preferable for a progressive addition lens with shorter corridor length.

[S101G Target Distribution. Extra AS: Monotonically Increasing]

In this step, a monotonically increasing amount of extra astigmatism is added along the meridian in the intermediate vision region. This variation is preferable for a progressive addition lens with shorter corridor length.

[S101H Target Distribution. Extra AS: Monotonically Decreasing and Increasing]

In this step, a monotonically decreasing and then monotonically increasing amount of extra astigmatism is added along the meridian in the intermediate vision region. This variation is preferable for a progressive addition lens with shorter corridor length.

[S102A Design Outer and Inner Surfaces]

In this step, an outer surface and an inner surface are designed so that a target distribution in transmission determined in S101C is actually obtained.

DESCRIPTION OF SIGNS

MP: mean power, AS: inherent astigmatism, VP: vertical power, HP: horizontal power, ADD: Addition power, AX: cylindrical axis, Tf: tangential transmittance (T) when viewing distance, Tn: tangential transmittance (T) when viewing near, Sf: sagittal transmittance (S) when viewing distance, Sn: sagittal transmittance (S) when viewing near, S101: step of determining a transmission astigmatic performance parameter, S102: step S102 of determining lens surface data, GC: geometric center, FP: fitting point, NP: near point, AS_0: an area where extra astigmatism is not allocated, AS_int: an area where interpolate the area of extra astigmatism and the area of zero extra astigmatism, AS_add: an area where extra astigmatism is allocated. 200: optical shop, 201: computer in the optical shop, 300: lens manufacture, 301: host computer in the lens manufacture, 302: computer for lens design, 303: computer for lens processing, 304: processing machine.

As evident from the figures and to the skilled reader, any of a combination of the above design methods (as well as other design methods) are suitable for implementing the present invention.

It will be apparent to those skilled in the art that various modifications and variations can be made in the entities, methods, systems, computer programs, medium and signals (carrying instructions for executing the program) of the invention as well as in the construction of this invention without departing from the scope or spirit of the invention. The invention has been described in relation to particular embodiments and examples which are intended in all aspects to be illustrative rather than restrictive. Those skilled in the art will appreciate that many different combinations of hardware, software and firmware will be suitable for practicing the present invention, which scope and spirit is defined by the following claims.

What is claimed is:

1. A method for designing, by means of a computer, a progressive addition lens comprising a distance vision region, a near vision region, and an intermediate vision region, wherein a power gradually changes between the distance vision region and the near vision region, and wherein the progressive addition lens is based on prescription data, the method comprising:

determining a transmission astigmatic performance parameter corresponding to a sum of a prescribed astigmatism included in the prescription data and a predetermined amount of extra astigmatism; and determining lens surface data corresponding to the determined transmission astigmatic performance parameter, wherein the amount of extra astigmatism is added in the intermediate vision region along a meridian so that an amount of vertical power is different from an amount of horizontal power along the meridian, the meridian being a meridian line of the lens along which a spherical power increases along a direction towards the bottom of the progressive addition lens, and wherein the amount of extra astigmatism monotonically increases along the meridian from a top of the meridian in the intermediate vision region to a bottom of the meridian in the intermediate vision region, or the amount of extra astigmatism monotonically decreases along the meridian from the top of the meridian in the intermediate vision region to a center of the meridian and monotonically increases from the center of the meridian to the bottom of the meridian in the intermediate vision region.

2. The method according to claim 1, wherein the amount of extra astigmatism corresponds to an inherent astigmatism change rate.

3. The method according to claim 1, wherein the amount of extra astigmatism corresponds to a reduction of an inherent astigmatism change rate, and the reduced inherent astigmatism change rate is smaller than an inherent astigmatism change rate corresponding to a zero amount of extra astigmatism.

4. The method according to claim 1, wherein the amount of extra astigmatism is monotonically increasing along the meridian in the intermediate vision region.

5. The method according to claim 1, wherein the amount of extra astigmatism corresponds to an inherent astigmatism change rate, a maximum amount of inherent astigmatism, and a skew distortion.

6. The method according to claim 1, wherein the amount of extra astigmatism reduces an inherent astigmatism change rate, a maximum amount of inherent astigmatism, and a skew distortion, wherein the reduced inherent astigmatism change rate is smaller than an inherent astigmatism change rate corresponding to a zero amount of extra astigmatism, the reduced maximum amount of inherent astigmatism is smaller than a maximum amount of inherent astigmatism corresponding to a zero amount of extra astigmatism, and the reduced skew distortion is smaller than a skew distortion corresponding to a zero amount of extra astigmatism.

7. The method according to claim 1, wherein the amount of extra astigmatism monotonically decreases along the meridian from the top of the meridian in the intermediate vision region to the center of the meridian and monotonically increases from the center of the meridian to the bottom of the meridian in the intermediate vision region.

8. The method according to claim 7, wherein at least one of (i) a rate of the monotonically increasing extra astigmatism and (ii) a rate of the monotonically decreasing extra astigmatism is set to control an extent of an area of low aberration around a center of the lens, the area of low aberration having an aberration lower than another area of the lens.

* * * * *